United States Patent [19]
McCann et al.

[11] Patent Number: 5,963,939
[45] Date of Patent: Oct. 5, 1999

[54] METHOD AND APPARATUS FOR AN INCREMENTAL EDITOR TECHNOLOGY

[75] Inventors: Paul H. McCann, Tomball; Gary L. Alose, Houston; Javier E. Chavez, The Woodlands; Scott M. Dawson, Tomball; Robert S. Brayton, Tomball; Paul E. Hiles, Tomball, all of Tex.

[73] Assignee: Compaq Computer Corp.

[21] Appl. No.: 08/941,789

[22] Filed: Sep. 30, 1997

[51] Int. Cl.$^6$ ........................................................ G06F 17/30
[52] U.S. Cl. ................................. 707/4; 707/1; 345/326; 345/336; 345/337; 705/26; 705/27
[58] Field of Search .......................... 707/1, 4; 345/326, 345/336, 337; 705/26, 27

[56] References Cited

U.S. PATENT DOCUMENTS

| | | | |
|---|---|---|---|
| 5,650,994 | 7/1997 | Daley | 370/259 |
| 5,784,539 | 7/1998 | Lenz | 395/50 |
| 5,806,060 | 9/1998 | Borgida et al. | 707/3 |
| 5,832,473 | 11/1998 | Lee et al. | 707/2 |
| 5,859,969 | 1/1999 | Oki et al. | 395/200.3 |

*Primary Examiner*—Paul R. Lintz
*Attorney, Agent, or Firm*—Aicin, Gump, Strauss, Hauer & Feld, LLP

[57] ABSTRACT

An object-driven application tool allows a Value Added Reseller (VAR) to access a large body of publicly available information about computing devices and to identify the needs of a particular customer or end user and to select an appropriate solution of equipment, hardware, and networking products to meet the customer's needs. Moreover, the tool includes capabilities allowing a VAR to demonstrate to the end user the appropriateness of the solution, for allowing information entry in high level, abstract business-oriented vocabulary rather than a highly technical low level jargon (thus facilitating data entry of information obtained from the end user) and allowing the tool to recognize whether, for example, a slight increase in memory capacity beyond the express needs of the end user may allow a dramatic reduction in requirements for processor speed or non-volatile data storage. The latter tools allow the exemplary embodiment of the present invention to suggest superior solutions over and beyond the express needs of the end user. Selection of a particular solution is generally decoupled from the needs of the end user, which are stored in a separate database; thereafter, as new equipment to obtain on-line information relating to new products and services. Information in the database also includes retrofit information, so that new products can be installed into existing networks.

14 Claims, 81 Drawing Sheets

| Guideline | Scale | Description |
|---|---|---|
| Overall Guideline | 1 to 3 | Low-End, Best Value, High-End overall product ranking. Use in place of the other detailed guidelines below. |
| Lowest Cost | 0 to 100 | Suggested sales price, with higher rankings meaning "lower cost" |
| Performance | " | Overall speed of the product |
| Features | " | # of features |
| Expandability | " | How expandable it is (# of spare slots, # of internal disks, external expansion capability, etc.) |
| Scaleability | " | How scaleable it is (faster processors, additional processors, total disk space internal/external, I/O bandwidth on internal bus(es) etc.) |
| Fault Tolerance | " | # and type of FT features |
| Security | " | How secure it is |
| Availability Ranking | " | Level of product availability (this is not product availability in the channel. It is used to "push" or "hold" product recommendations from Solutions Wizard. |

| Object Class | Attribute | Notes |
|---|---|---|
| All | PN | Part Number |
| All | Class | Class Name |
| [1] | Family | Product Family |
| [1] | Model | Model |
| | | The following rankings are related to User-Specified Guidelines. |
| [1] | Overall Ranking | None(0), 1..3 (low, best value, high) |
| [1] | Lowest Cost Ranking | None(0), 1..n ('n' <= 100) |
| [1] | Performance Ranking | None(0), 1..n ('n' <= 100) |
| [1] | Features Ranking | None(0), 1..n ('n' <= 100) |
| [1] | Expandability Ranking | None(0), 1..n ('n' <= 100) |
| [1] | Scaleability Ranking | None(0), 1..n ('n' <= 100) |
| [1] | Security Ranking | None(0), 1..n ('n' <= 100) |
| [1] | Fault Tolerance Ranking | None(0), 1..n ('n' <= 100) |
| [1] | Availability Ranking | None(0), Low(1), Mid(2), High(3) |

| Component | Parameters | Data Source (for selection) |
|---|---|---|
| Monitor | size, resolution, refresh | Apps, personal preference, industry norm |
| CPU | family, speed | OS, apps, industry norm |
| Memory | size | OS, apps |
| Bus | type | Apps |
| HD Controller | interface | Apps, future trends |
| HD | size, speed, interface | Apps, |
| Graphics | speed, features | Apps, future trends |
| Multimedia | basic, intermediate, adv. | Apps, personal preference |
| CD ROM | speed | Apps |

| Class | Property | Ranking | Internal Representation (maps to Calibration table) | Notes |
|---|---|---|---|---|
| DeskBase | Overall Ranking | 1 | DeskOverallRanking1 | Low-End desktops, overall |
| DeskBase | Overall Ranking | 2 | DeskOverallRanking2 | Best Value desktops, overall |
| DeskBase | Overall Ranking | 3 | DeskOverallRanking3 | High-End desktops, overall |
| DeskBase | Lowest Cost | 1 | DeskCost1 | Highest cost desktops |
| DeskBase | Lowest Cost | 2 | DeskCost2 | Mid-Range cost desktops |
| DeskBase | Lowest Cost | 3 | DeskCost3 | Lowest cost desktops |
| DeskBase | Performance | 1 | DeskPerformance1 | Lowest performance desktops |
| DeskBase | Performance | 2 | DeskPerformance2 | Mid-Range performance desktops |
| DeskBase | Performance | 3 | DeskPerformance3 | Highest performance desktops |
| DeskBase | Features | 1 | DeskFeatures1 | Lowest feature desktops |
| DeskBase | Features | 2 | DeskFeatures2 | Mid-Range feature desktops |
| DeskBase | Features | 3 | DeskFeatures3 | Highest feature desktops |
| DeskBase | Expandability | 1 | DeskExpandability1 | Lowest expandability desktops |
| DeskBase | Expandability | 2 | DeskExpandability2 | Mid-Range expandability desktops |
| DeskBase | Expandability | 3 | DeskExpandability3 | Highest expandability desktops |
| DeskBase | Scaleability | 1 | DeskScalability1 | Lowest scaleability desktops (desktops aren't that scaleable) |
| DeskBase | Scaleability | 2 | DeskScalability2 | Highest scaleability desktops (desktops aren't that scaleable) |
| DeskBase | Fault Tolerance | 1 | DeskFT1 | Lowest fault tolerance desktops (not much optional fault tolerance) |
| DeskBase | Fault Tolerance | 2 | DeskFT2 | Highest fault tolerance desktops (not much optional fault tolerance) |
| DeskBase | Security | N/A | N/A | Not applicable to desktops... so don't populate in Requirements Translation table |

*FIG. 10*

| Class | Property | Ranking | Internal Representation (maps to Calibration table) | Notes |
|---|---|---|---|---|
| DeskOptionMonitor | Size | 1 | DeskOptionMonitorSize1 | Lowest size of monitor for a desktop |
| DeskOptionMonitor | Size | 2 | DeskOptionMonitorSize2 | Mid-Range size of monitor for a desktop |
| DeskOptionMonitor | Size | 3 | DeskOptionMonitorSize3 | Highest size of monitor for a desktop |
| DeskOptionMonitor | Performance | 1 | DeskOptionMonitorPerformance1 | Lowest performance monitor for a desktop |
| DeskOptionMonitor | Performance | 2 | DeskOptionMonitorPerformance2 | Mid-Range performance monitor for a desktop |
| DeskOptionMonitor | Performance | 3 | DeskOptionMonitorPerformance3 | Highest performance monitor for a desktop |
| DeskOptionMonitor | Lowest Cost | 1 | DeskOptionMonitor1 | Lowest cost monitors for a desktop |
| DeskOptionMonitor | Lowest Cost | 2 | DeskOptionMonitor2 | Highest cost monitors for a desktop |
| DeskOptionNic | Performance | 1 | DeskOptionNicPerformance1 | Lowest speed NIC for a desktop |
| DeskOptionNic | Performance | 2 | DeskOptionNicPerformance2 | Highest speed NIC for a desktop |
| DeskOptionHD | Size | 1 | DeskOptionHDSize1 | Smallest size HD for a desktop |
| DeskOptionHD | Size | 2 | DeskOptionHDSize2 | Mid-Range size HD for a desktop |
| DeskOptionHD | Size | 3 | DeskOptionHDSize3 | Largest size HD for a desktop |
| DeskOptionHD | Lowest Cost | 1 | DeskOptionHDCost1 | Highest cost HD for a desktop |
| DeskOptionHD | Lowest Cost | 2 | DeskOptionHDCost2 | Lowest cost HD for a desktop |
| DeskOptionHD | Performance | 1 | DeskOptionHDPerformance1 | Lowest performance HD for a desktop |
| DeskOptionHD | Performance | 2 | DeskOptionHDPerformance2 | Highest performance HD for a desktop |
| DeskOptionScanKB | Lowest Cost | 1 | DeskOptionScanKBCost1 | Only 1 scanning KB for a desktop |
| DeskOptionScanKB | Performance | 1 | DeskOptionScanKBPerformance1 | Only 1 scanning KB for a desktop |
| DeskOptionGraphics | Lowest Cost | 1 | DeskOptionGraphicsCost1 | Highest cost graphics accelerator for a desktop |
| DeskOptionGraphics | Lowest Cost | 2 | DeskOptionGraphicsCost2 | Lowest cost graphics accelerator for a desktop |
| DeskOptionGraphics | Performance | 1 | DeskOptionGraphicsPerformance1 | Lowest performance graphics accelerator for a desktop |
| DeskOptionGraphics | Performance | 2 | DeskOptionGraphicsPerformance2 | Highest performance graphics accelerator for a desktop |
| DeskOptionCDROM | Lowest Cost | 1 | DeskOptionCDROMCost1 | Highest cost CDROM for a desktop |
| DeskOptionCDROM | Lowest Cost | 2 | DeskOptionCDROMCost2 | Lowest cost CDROM for a desktop |
| DeskOptionCDROM | Performance | 1 | DeskOptionCDROMPerformance1 | Lowest performance CDROM for a desktop |

*FIG. 11A*

| Class | Property | Ranking | Internal Representation (maps to Calibration table) | Notes |
|---|---|---|---|---|
| DeskOptionCDROM | Performance | 2 | DeskOptionCDROMPerformance2 | Highest performance CDROM for a desktop |
| DeskOptionCDROM | NrOfDisks | 1 | DeskOptionCDROMNrOfDisks1 | Lowest number of disks supported for a desktop CDROM unit. |
| DeskOptionCDROM | NrOfDisks | 2 | DeskOptionCDROMNrOfDisks2 | Highest number of disks supported for a desktop CDROM unit. |
| DeskOptionPDCD | Lowest Cost | 1 | DeskOptionPDCDCost1 | Highest cost PDCD for a desktop |
| DeskOptionPDCD | Lowest Cost | 2 | DeskOptionPDCDCost2 | Lowest cost PDCD for a desktop |
| DeskOptionPDCD | Performance | 1 | DeskOptionPDCDPerformance1 | Lowest performance PDCD for a desktop |
| DeskOptionPDCD | Performance | 2 | DeskOptionPDCDPerformance2 | Highest performance PDCD for a desktop |
| DeskOption | | | | |

*FIG. 11B*

| Class | Property | Ranking | Internal Representation (maps to Calibration table) | Notes |
|---|---|---|---|---|
| ServBase | Overall Ranking | 1 | ServOverallRanking1 | Low-End Servers, overall |
| ServBase | Overall Ranking | 2 | ServOverallRanking2 | Best Value Servers, overall |
| ServBase | Overall Ranking | 3 | ServOverallRanking3 | High-End Servers, overall |
| ServBase | Lowest Cost | 1 | ServCost1 | Highest cost Servers |
| ServBase | Lowest Cost | 2 | ServCost2 | Mid-Range cost Servers |
| ServBase | Lowest Cost | 3 | ServCost3 | Lowest cost Servers |
| ServBase | Performance | 1 | ServPerformance1 | Lowest performance Servers |
| ServBase | Performance | 2 | ServPerformance2 | Mid-Range performance Servers |
| ServBase | Performance | 3 | ServPerformance3 | Highest performance Servers |
| ServBase | Features | 1 | ServFeatures1 | Lowest feature Servers |
| ServBase | Features | 2 | ServFeatures2 | Mid-Range feature Servers |
| ServBase | Features | 3 | ServFeatures3 | Highest feature Servers |
| ServBase | Expandability | 1 | ServExpandability1 | Lowest expandability Servers |
| ServBase | Expandability | 2 | ServExpandability2 | Mid-Range expandability Servers |
| ServBase | Expandability | 3 | ServExpandability3 | Highest expandability Servers |
| ServBase | Scaleability | 1 | ServScalability1 | Lowest scaleability |
| ServBase | Scaleability | 2 | ServScalability2 | Mid-range scaleability |
| ServBase | Scaleability | 3 | ServScalability3 | Highest scaleability |
| ServBase | Fault Tolerance | 1 | ServFT1 | Lowest fault tolerance |
| ServBase | Fault Tolerance | 2 | ServFT2 | ... |
| ServBase | Fault Tolerance | 3 | ServFT3 | ... |
| ServBase | Fault Tolerance | 4 | ServFT4 | |
| ServBase | Fault Tolerance | 5 | ServFT5 | Highest fault tolerance |
| ServBase | Security | 1 | ServSecurity1 | Lowest security |
| ServBase | Security | 2 | ServSecurity2 | Highest security |

FIG. 12

| Class | Property | Ranking | Internal Representation (maps to Calibration table) | Notes |
|---|---|---|---|---|
| ServOptionMonitor | Size | 1 | ServOptionMonitorSize1 | Lowest size of monitor for a Server |
| ServOptionMonitor | Size | 2 | ServOptionMonitorSize2 | Mid-Range size of monitor for a Server |
| ServOptionMonitor | Size | 3 | ServOptionMonitorSize3 | Highest size of monitor for a Server |
| ServOptionMonitor | Performance | 1 | ServOptionMonitorPerformance1 | Lowest performance monitor for a Server |
| ServOptionMonitor | Performance | 2 | ServOptionMonitorPerformance2 | Mid-Range performance monitor for a Server |
| ServOptionMonitor | Performance | 3 | ServOptionMonitorPerformance3 | Highest performance monitor for a Server |
| ServOptionMonitor | Lowest Cost | 1 | ServOptionMonitor1 | Lowest cost monitors for a Server |
| ServOptionMonitor | Lowest Cost | 2 | ServOptionMonitor2 | Highest cost monitors for a Server |
| ServOptionNic | Performance | 1 | ServOptionNicPerformance1 | Lowest speed NIC for a Server |
| ServOptionNic | Performance | 2 | ServOptionNicPerformance2 | Highest speed NIC for a Server |
| ServOptionHD | Size | 1 | ServOptionHDSize1 | Smallest size HD for a Server |
| ServOptionHD | Size | 2 | ServOptionHDSize2 | Mid-Range size HD for a Server |
| ServOptionHD | Size | 3 | ServOptionHDSize3 | Largest size HD for a Server |
| ServOptionHD | Lowest Cost | 1 | ServOptionHDCost1 | Highest cost HD for a Server |
| ServOptionHD | Lowest Cost | 2 | ServOptionHDCost2 | Lowest cost HD for a Server |
| ServOptionHD | Performance | 1 | ServOptionHDPerformance1 | Lowest performance HD for a Server |
| ServOptionHD | Performance | 2 | ServOptionHDPerformance2 | Highest performance HD for a Server |
| ServOptionGraphics | Lowest Cost | 1 | ServOptionGraphicsCost1 | Highest cost graphics accelerator for a Server |
| ServOptionGraphics | Lowest Cost | 2 | ServOptionGraphicsCost2 | Lowest cost graphics accelerator for a Server |
| ServOptionGraphics | Performance | 1 | ServOptionGraphicsPerformance1 | Lowest performance graphics accelerator for a Server |
| ServOptionGraphics | Performance | 2 | ServOptionGraphicsPerformance2 | Highest performance graphics accelerator for a Server |
| ServOptionCDROM | Lowest Cost | 1 | ServOptionCDROMCost1 | Highest cost CDROM for a Server |
| ServOptionCDROM | Lowest Cost | 2 | ServOptionCDROMCost2 | Lowest cost CDROM for a Server |
| ServOptionCDROM | Performance | 1 | ServOptionCDROMPerformance1 | Lowest performance CDROM for a Server |
| ServOptionCDROM | Performance | 2 | ServOptionCDROMPerformance2 | Highest performance CDROM for a Server |
| ServOptionCDROM | NrOfDisks | 1 | ServOptionCDROMNrOfDisks1 | Lowest number of disks supported for a Server CDROM unit. |
| ServOptionCDROM | NrOfDisks | 2 | ServOptionCDROMNrOfDisks2 | Highest number of disks supported for a Server CDROM unit. |
| ServOptionPDCD | Lowest Cost | 1 | ServOptionPDCDCost1 | Highest cost PDCD for a Server |
| ServOptionPDCD | Lowest Cost | 2 | ServOptionPDCDCost2 | Lowest cost PDCD for a Server |
| ServOptionPDCD | Performance | 1 | ServOptionPDCDPerformance1 | Lowest performance PDCD for a Server |
| ServOptionPDCD | Performance | 2 | ServOptionPDCDPerformance2 | Highest performance PDCD for a Server |

FIG. 13

| Class | Property | Ranking | Internal Representation (maps to Calibration table) | Notes |
|---|---|---|---|---|
| DeskOs | Scaleability | 1 | DeskOsScalability1 | Lowest scaleability desktop OS (its ability to scale under higher workloads) |
| DeskOs | Scaleability | 2 | DeskOsScalability2 | Highest scaleability desktop OS (its ability to scale under higher workloads) |
| DeskOs | Security | 1 | DeskOsSecurity1 | Lowest security desktop OS |
| DeskOs | Security | 2 | DeskOsSecurity2 | Highest security desktop OS |
| DeskOs | Fault Tolerance | 1 | DeskOsFT1 | Lowest fault tolerance desktop OS (its stability and resistance to failed software) |
| DeskOs | Fault Tolerance | 2 | DeskOsFT2 | Highest fault tolerance desktop OS (its stability and resistance to failed software) |
| DeskOs | Performance | 1 | DeskOsPerformance1 | Lowest performance desktop OS (its speed and efficiency) |
| DeskOs | Performance | 2 | DeskOsPerformance2 | Highest performance desktop OS (its speed and efficiency) |
| DeskOs | Compatibility | 1 | DeskOsCompatibility1 | Lowest compatibility desktop OS (its capability to utilize different hardware) |
| DeskOs | Compatibility | 2 | DeskOsCompatibility2 | Highest compatibility desktop OS (its capability to utilize different hardware) |
| ServOs | Scaleability | 1 | ServOsScalability1 | Lowest scaleability Server OS (its ability to scale under higher workloads) |
| ServOs | Scaleability | 2 | ServOsScalability2 | Highest scaleability Server OS (its ability to scale under higher workloads) |
| ServOs | Security | 1 | ServOsSecurity1 | Lowest security Server OS |
| ServOs | Security | 2 | ServOsSecurity2 | Highest security Server OS |
| ServOs | Fault Tolerance | 1 | ServOsFT1 | Lowest fault tolerance Server OS (its stability and resistance to failed software) |
| ServOs | Fault Tolerance | 2 | ServOsFT2 | Highest fault tolerance Server OS (its stability and resistance to failed software) |
| ServOs | Performance | 1 | ServOsPerformance1 | Lowest performance Server OS (its speed and efficiency) |
| ServOs | Performance | 2 | ServOsPerformance2 | Highest performance Server OS (its speed and efficiency) |
| ServOs | Compatibility | 1 | ServOsCompatibility1 | Lowest compatibility Server OS (its capability to utilize different hardware) |
| ServOs | Compatibility | 2 | ServOsCompatibility2 | Highest compatibility Server OS (its capability to utilize different hardware) |

FIG. 14

| Class | Product | Resource | Recommendation Internal Representation | Notes |
|---|---|---|---|---|
| DeskOs | Win95 | CPU | DeskCpu2 | |
| DeskOs | Win95 | Memory | DeskMemory2 | |
| DeskOs | Win95 | HD | DeskHD1 | |
| DeskOs | NT 4.0 Workstation | CPU | DeskCpu3 | |
| DeskOs | NT 4.0 Workstation | Memory | DeskMemory3 | |
| DeskOs | NT 4.0 Workstation | HD | DeskHD2 | |
| ServOs | NT 4.0 Server | CPU | ServCPU2 | |
| ServOs | NT 4.0 Server | Memory | ServMemory2 | |
| ServOs | NT 4.0 Server | HD | ServHD1 | |
| ServOs | Netware 4.x | CPU | | |
| ServOs | Netware 4.x | Memory | | |
| ServOs | Netware 4.x | HD | | |
| PortOs | Win95 | CPU | PortCpu3 | |
| PortOs | Win95 | Memory | PortMemory2 | |
| PortOs | Win95 | HD | PortHD1 | |

| Class | Product | Resource | Recommendation Internal Representation | Notes |
|---|---|---|---|---|
| DeskApp | Office Suites Category | CPU | | |
| DeskApp | Office Suites Category | Memory | | |
| DeskApp | Office Suites Category | HD | | |
| DeskApp | MSOffice 95 | CPU | | |
| DeskApp | MSOffice 95 | Memory | | |
| DeskApp | MSOffice 95 | HD | | |
| DeskApp | MSOffice 97 | CPU | | |
| DeskApp | MSOffice 97 | Memory | | |
| DeskApp | MSOffice 97 | HD | | |

| Internal Representation | Real World Value | Notes |
|---|---|---|
| DeskCost1 | Deskpro 2000 Family | highest cost |
| DeskCost2 | Deskpro 4000 Family | mid-cost |
| DeskCost3 | Deskpro 6000 Family | lowest cost |
| DeskCpu1 | P5-133 | Lowest CPU |
| DeskCpu2 | P5-166 | ... |
| DeskCpu3 | P5-200 | ... |
| DeskCpu4 | P6-200 | Highest CPU |
| DeskExpandability1 | | lowest expandability |
| DeskExpandability2 | | mid expandability |
| DeskExpandability3 | | highest expandability |
| DeskFeatures1 | | lowest feature |
| DeskFeatures2 | | mid feature |
| DeskFeatures3 | | highest feature desktops |
| DeskFT1 | | Lowest level of fault tolerance |
| DeskFT2 | | Highest level of fault tolerance |
| DeskHD1 | | Smallest size hard disk |
| DeskHD2 | | Mid-size hard disk |
| DeskHD3 | | Largest size hard disk |
| DeskMemory1 | 8MB | Smallest memory configuration |
| DeskMemory2 | 16MB | ... |
| DeskMemory3 | 32MB | ... |
| DeskMemory4 | 64MB | ... |
| DeskMemory5 | 128MB | ... |
| DeskMemory6 | 256MB | Largest memory configuration |
| DeskOptionCDROMCost1 | | Lowest cost |
| DeskOptionCDROMCost2 | | Highest cost |
| DeskOptionCDROMNrOfDisks1 | | CDROM holding the smallest nr. of CDs |
| DeskOptionCDROMNrOfDisks2 | | CDROM holding the largest nr. of CDs |
| DeskOptionCDROMPerformance1 | | Slowest |
| DeskOptionCDROMPerformance2 | | Fastest |
| DeskOptionGraphicsCost1 | | Lowest cost |
| DeskOptionGraphicsCost2 | | Highest cost |
| DeskOptionGraphicsPerformance1 | | |
| DeskOptionGraphicsPerformance2 | | |
| DeskOptionHDCost1 | | |
| DeskOptionHDCost2 | | |
| DeskOptionHDPerformance1 | | |
| DeskOptionHDPerformance2 | | |
| DeskOptionHDSize1 | | |
| DeskOptionHDSize2 | | |
| DeskOptionHDSize3 | | |

FIG. 17A

| Internal Representation | Real World Value | Notes |
|---|---|---|
| DeskOptionMonitor1 | | |
| DeskOptionMonitor2 | | |
| DeskOptionMonitorPerformance1 | | |
| DeskOptionMonitorPerformance2 | | |
| DeskOptionMonitorPerformance3 | | |
| DeskOptionMonitorSize1 | | |
| DeskOptionMonitorSize2 | | |
| DeskOptionMonitorSize3 | | |
| DeskOptionNicPerformance1 | | |
| DeskOptionNicPerformance2 | | |
| DeskOptionPDCDCost1 | | |
| DeskOptionPDCDCost2 | | |
| DeskOptionPDCDPerformance1 | | |
| DeskOptionPDCDPerformance2 | | |
| DeskOptionScanKBCost1 | | |
| DeskOptionScanKBPerformance1 | | |
| DeskOsCompatibility1 | | |
| DeskOsCompatibility2 | | |
| DeskOsFT1 | | |
| DeskOsFT2 | | |
| DeskOsPerformance1 | | |
| DeskOsPerformance2 | | |
| DeskOsScalability1 | | |
| DeskOsScalability2 | | |
| DeskOsSecurity1 | | |
| DeskOsSecurity2 | | |
| DeskOverallRanking1 | | |
| DeskOverallRanking2 | | |
| DeskOverallRanking3 | | |
| DeskPerformance1 | | |
| DeskPerformance2 | | |
| DeskPerformance3 | | |
| DeskScalability1 | | |
| DeskScalability2 | | |
| ServCost1 | | |
| ServCost2 | | |
| ServCost3 | | |
| ServCpu1 | | |
| ServCpu2 | | |
| ServCpu3 | | |

FIG. 17B

| Internal Representation | Real World Value | Notes |
|---|---|---|
| ServExpandability1 | | |
| ServExpandability2 | | |
| ServExpandability3 | | |
| ServFeatures1 | | |
| ServFeatures2 | | |
| ServFeatures3 | | |
| ServHD1 | | |
| ServHD2 | | |
| ServHD3 | | |
| ServMemory1 | 16MB | |
| ServMemory2 | 32MB | |
| ServMemory3 | 64MB | |
| ServMemory4 | 128MB | |
| ServMemory5 | 256MB | |
| ServMemory6 | 512MB | |
| ServMemory7 | 1024MB | |
| ServMemory8 | 1536MB | |
| ServMemory9 | 2048MB | |
| ServOptionCDROMCost1 | | |
| ServOptionCDROMCost2 | | |
| ServOptionCDROMNrOfDisks1 | | |
| ServOptionCDROMNrOfDisks2 | | |
| ServOptionCDROMPerformance1 | | |
| ServOptionCDROMPerformance2 | | |
| ServOptionDiskArray1 | | |
| ServOptionDiskArray2 | | |
| ServOptionDiskArray3 | | |
| ServOptionGraphicsCost1 | | |
| ServOptionGraphicsCost2 | | |
| ServOptionGraphicsPerformance1 | | |
| ServOptionGraphicsPerformance2 | | |
| ServOptionHDCost1 | | |
| ServOptionHDCost2 | | |
| ServOptionHDPerformance1 | | |
| ServOptionHDPerformance2 | | |
| ServOptionHDSize1 | | |
| ServOptionHDSize2 | | |
| ServOptionHDSize3 | | |

FIG. 17C

| Internal Representation | Real World Value | Notes |
|---|---|---|
| ServOptionMonitor1 | | |
| ServOptionMonitor2 | | |
| ServOptionMonitorPerformance1 | | |
| ServOptionMonitorPerformance2 | | |
| ServOptionMonitorPerformance3 | | |
| ServOptionMonitorSize1 | | |
| ServOptionMonitorSize2 | | |
| ServOptionMonitorSize3 | | |
| ServOptionNicPerformance1 | | |
| ServOptionNicPerformance2 | | |
| ServOptionPDCDCost1 | | |
| ServOptionPDCDCost2 | | |
| ServOptionPDCDPerformance1 | | |
| ServOptionPDCDPerformance2 | | |
| ServOptionServArray1 | | |
| ServOptionServArray2 | | |
| ServOptionTape1 | | |
| ServOptionTape2 | | |
| ServOptionTape3 | | |
| ServOsCompatibility1 | | |
| ServOsCompatibility2 | | |
| ServOsFT1 | | |
| ServOsFT2 | | |
| ServOsPerformance1 | | |
| ServOsPerformance2 | | |
| ServOsScalability1 | | |
| ServOsScalability2 | | |
| ServOsSecurity1 | | |
| ServOsSecurity2 | | |

FIG. 17D

| Class | Attribute (non-common) | Notes |
|---|---|---|
| Base Products | | |
| Server (a node) | User | Administrator's name |
| | CPU | Processor family and speed |
| | NrCPUs | Number of CPUs |
| | MemorySize | Memory size |
| | HDController | Type of hard disk controller |
| | NrHDs | Number of hard disks |
| | HDSizeList | Sizes of all hard disks installed |
| | CDROMSpeed | Speed of CD-ROM |
| | NrUSBPorts | Number of USB ports |
| | NIC | Type of network adapter |
| | OS | Operating System |
| | RAIDlevel | Hardware RAID level (SMART controller) |
| | DriveArray | External cabinet of hard disks |
| | HotSwapDrives | Yes/No |
| | DynamicSectorRepair | Yes/No |
| | RecoveryServerSupport | Yes/No |
| | ServerArraySupport | Yes/No |
| | RedundantCPU | Yes/No |
| | RedundantPowerSupply | Yes/No |
| | RedundantNIC | Yes/No |
| Desktop (a node) | User | User's name |
| | CPU | Processor family and speed |
| | MemorySize | Base memory size |
| | NrHDs | Number of hard disks |
| | HDSizeList | Sizes of hard disks installed |
| | CDROMSpeed | Speed of CD-ROM |
| | MultimediaLevel | Multimedia quality |
| | Chassis | Case style |
| | NrUSBPorts | Number of USB ports |
| | Communications | Type of communications device |
| | NIC | Type of network adapter |
| | Graphics | Type of graphics adapter |
| | OS | Operating System |
| Portable (a node) | User | User's name |
| | CPU | Family and speed |
| | MemorySize | Base memory size |
| | NrHDs | Number of hard disks |
| | HDSizeList | Sizes of all hard disks |
| | CDROMSpeed | Speed of CD-ROM |
| | MultimediaLevel | Low, Mid, High |
| | NrPCMCIASlots | Number of PCMCIA slots |
| | NrUSBPorts | Number of USB ports |
| | NrIRPorts | Number of IR ports |
| | OS | Operating System |

FIG. 18A

| Class | Attribute (non-common) | Notes |
|---|---|---|
| Repeater/Hub | NrPorts<br>Speed<br>Cascade Speed<br>Max Length of Cascade<br>Max Length to Desktop | |
| Switch | Nr of Ports<br>Port Speed<br>Uplink Speed<br>VLAN Capable?<br>Max Length of Uplink<br>Max Length of a segment | |
| Router | Nr of 10BaseT Ports<br>Nr of 100BaseT Ports<br>Nr ISDN Ports<br>Nr POTs Ports<br>Nr Serial Ports<br>Sophistication Level | |
| Configuration | | |
| LAN | Nr of Workgroups<br>List of Workgroups<br>Nr of Routers<br>List of Routers<br>Nr of Switches<br>List of Switches<br>Nr of Hubs<br>List of Hubs<br>Internal Security<br>External Security | Workgroup objects<br><br>Router objects<br><br>Switch objects<br><br>Hub objects<br>Low, Medium, High<br>Low, Medium, High |
| Workgroup | Nr of Nodes<br>List of Nodes<br>Nr of Hubs<br>List of Hubs<br>Internal Security | Server, Desktop, Portable objects<br><br>Hub objects<br>Low, Medium, High |
| WAN | Connection<br>Connection Device<br>External Security | Dial-up, Persistent<br>Modem, ISDN, CSU/DSU object<br>Low, Medium, High |
| Internet | Connection<br>Connection Device<br>External Security | Dial-up, Persistent<br>Modem, ISDN, CSU/DSU object<br>Low, Medium, High |
| Remote Access | Connection Device<br>External Security | Modem, ISDN object<br>Low, Medium, High |

FIG. 18B

| Class | Attribute (non-common) | Notes |
|---|---|---|
| Options | | |
| Memory | Size | In MB |
| Hard Disk | Speed<br>Size<br>Interface<br>SMART | Low, Medium, High<br>In MB<br>EIDE, SCSI-2, SCSI-2UW<br>Yes or No |
| HD Intelligent Controller (I2O) | Type | SMART-2, Fast SCSI-2, Ultra SCSI-2 |
| Graphics | Max Resolution<br>Refresh Rate<br>Colors<br>Speed | <br>At Max Resolution<br>At Max Resolution<br>Low, Medium, High |
| Monitor | Screen Size<br>Dot Pitch | In inches<br>In mm |
| Floppy Disk | Speed<br>Size<br>Interface | |
| Tape Backup | Speed<br>Size<br>Interface | |
| CDROM | Speed<br>Interface | |
| PDCD | Speed<br>Interface | |
| Multimedia | Level | Low, Medium, High |
| NIC | Type<br>Speed<br>Interface | |
| Modem | Speed<br>Fax<br>Voice | |
| Printer | Speed<br>Resolution<br>Paper Trays<br>Color | |
| Scanner Keyboard | Speed<br>Resolution<br>Interface | |
| Scanner | Speed<br>Resolution<br>Interface<br>Type | |
| | | |
| SOFTWARE | | |
| Operating System | Version # | |
| Application | Version # | |
| CIM | Version # | |

FIG. 18C

| Component | Parameters | Data Source (for selection) |
| --- | --- | --- |
| Monitor | size, resolution | Apps, personal preference, industry norm |
| CPU | family, speed | OS, apps, services, # concurrent users |
| Memory | size | OS, apps, services, # concurrent users |
| Bus | type | Apps |
| HD Controller | interface | Apps, # concurrent users, future trends |
| HD | size, speed | Apps, # users data areas |
| CD ROM | speed | Apps |
| PDCD | speed | Apps, personal preference |
| Tape Backup | speed, capacity | HD size |
| Networking | speed, multi-homed | # concurrent users, growth forecast, traffic volume, server function |

FIG. 19

| Component | Parameters | Data Source (for selection) |
| --- | --- | --- |
| Display | size, resolution, color | Apps, personal preference, industry norm |
| CPU | family, speed | OS, apps, industry norm |
| Memory | size | OS, apps |
| HD | size, speed | Apps, |
| Multimedia | basic, intermediate, adv. | Apps, personal preference |
| CD ROM | speed | Apps |
| Modem | speed, features | Apps, personal preference |
| Docking Stn. | Features | Apps, personal preference |
| NIC | speed, form factor | Apps |

FIG. 20

| Component | Parameters | Data Source (for selection) |
| --- | --- | --- |
| Repeater/Hub | # ports, speed, features | Apps, # of nodes, personal preference |
| Switch | # ports, speed, features | Apps, # of nodes, traffic volume, personal preference |
| Router | speed, features | Apps, traffic volume, personal preference |
| Cabling | speed, distance | Apps, traffic volume, network config, personal preference |

FIG. 21

| | | |
|---|---|---|
| AnswerCollection & | | 622  624  626 |
| Collections | ObjID(PK) —620 | Object ID, Primary Key, Auto Increment: |
| | 630 — ClassID(FK) | 632 — Class ID, Foreign Key to Class Table: —634 |
| | 640 — SubClassID(FK) | 642 — Sub Class ID, Foreign Key to Subclass Table: —644 |
| | 650 — PropertyID(FK) | 628 — Property ID, Foreign Key to Property Table: —638 |
| | Value | Property Value —648 |
| | Static | Flag —614 |
| | Discarded | Flag —616 |
| | TimeStamp | Auto time & date stamp field —618 |
| 852 | | |
| Class | ClassID(PK) | Class ID, Primary Key, Auto Increment: |
| | Class | Class Name (Indexed) |
| SubClass | SubClassID(PK) | SubClass ID, Primary Key, Auto Increment: |
| | SubClass | SubClass Name (Indexed) |
| 854 | | |
| Properties | PropertyID(PK) | Property ID, Primary Key Auto Increment: |
| | Property | Property Name (Indexed) |

| Answers | SessionID(PK) | Session ID PK(SessionID + ObjID + MachineId) |
|---|---|---|
| | ObjID(FK) | Object ID Foreign Key to AnswerCollection |
| | MachineID | Machine ID |
| | DateStamp | Auto time & date stamp field |

| Calibration | ClassId (FK) | Class ID, Foreign Key to the Class Table |
|---|---|---|
| | Geo | Geo Key |
| | ProductFamily | Product Family Identifier |

| Products | ClassID(FK) | Class ID, Foreign Key to the Class Table |
|---|---|---|
| | Geo | Geo Key |
| | ProductFamily | Product Family Key |
| | PartNumber | PartNumber (Indexed) |
| | IntroDate | Introduction date |
| | EndOfLife | End of Life date |
| | AvailFlag | Availability Flag |

| Applications | ClassID(FK) | Class ID Foreign Key to the Class Table |
|---|---|---|
| | Geo | Geo Key |
| | AppFamily | Application Family |
| | AppName | Application Name |

| Solution: | SessionID(PK) | Session ID PK(SessionID + ObjID + MachineId) |
|---|---|---|
| | ObjID(FK) | Object ID Foreign Key to AnswerCollection |
| | MachineID | Machine ID |
| | PartNumber | Part Number |

| Main Logic: | MainSeq (PK) | Primary Key |
| --- | --- | --- |
| | CountryCode (FK) | Foreign Key to Country table |
| | Process | Process Block Id |
| | PreProcess | PreProcess Key |
| | PostProcess | PostProcess Key |
| | Previous | Prior Step |
| | Post | Next Step |

*FIG. 22G*

| QuestionProc: | Process(PK) | Process Block Primary Key |
| --- | --- | --- |
| | QuestSeq | Question Sequence |
| | AnswerType(FK) | Answer Type Foreign key to AnsTypes |
| | ObjId | Object ID for the Answer |
| | QuestionKey | Link to Question Table |
| | HelpKey | Link to Help Table |
| | AnswerSize | Answer field size |
| | Format | Format String |

*FIG. 22H*

| Questions: | QuestionKey | Indexed, dups allowed |
| --- | --- | --- |
| | LanguageKey (FK) | Foreign key to Language Table |
| | Question | Question (varchar(255)) |

*FIG. 22I*

| Client: | ID(PK) | Client ID Primary Key |
| --- | --- | --- |
| | LanguageCode(FK) | Foreign Key to the Language table |
| | CountryCode(FK) | Foreign Key to Country Table |
| | SessionId | Auto Date Time |
| | AccessTime | Date Time |
| | MainSeq | ForeignKey to MainLogic |
| | MachineId | Machine Identifier |
| | Next | Next Step |
| | Prev | Previous Step |

*FIG. 22J*

| Client History Table: | ID(PK) | Client ID Primary Key |
| --- | --- | --- |
| | SessionID | Client Session ID |

*FIG. 22K*

| | | ~750 |
|---|---|---|
| Country Table: | CountryCode | Country ID (Indexed) |
| | LanguageCode | Language Code Foreign Key to the Language Table |
| | Geo | Geographic Unit |

*FIG. 23A*

| | | ~700 |
|---|---|---|
| Language Table: | LanguageCode(PK) | Language Code Primary Key |
| | Language | Descriptive name |
| | SizeFactor | integer |

*FIG. 23B*

| | |
|---|---|
| ValidAnsType Table | Used to enforce referential integrity |
| CalScale Table | Used to enforce referential integrity |

*FIG. 23C*

| Class | Properties | Description |
|---|---|---|
| Baseline Products | | |
| DeskBase | Overall Ranking, Lowest Cost, Performance, Features, Expandability, Scaleability, Fault Tolerance, Security | Desktop base product selection (before options added) |
| ServBase | Overall Ranking, Lowest Cost, Performance, Features, Expandability, Scaleability, Fault Tolerance, Security | Server base product selection (before options added) |
| PortBase | Overall Ranking, Lowest Cost, Performance, Features, Expandability, Scaleability, Fault Tolerance, Security | Portable base product selection (before options added) |
| Desktop Features | | |
| DeskBaseCPU | Performance | CPU in desktop base product |
| DeskBaseMemory | Size | Memory in desktop base product |
| DeskBaseHD | Size, Performance | HD in desktop base product |
| DeskBaseCDROM | Performance, NrOfDisks | CDROM in desktop base product |
| DeskBaseGraphics | Performance | Graphics in desktop base product |
| DeskBasePDCD | Performance | PDCD in desktop base product |
| Desktop Options | | |
| DeskOptionMonitor | Lowest Cost, Performance, Size | Monitor |
| DeskOptionNic | Lowest Cost, Performance | NIC |
| DeskOptionHD | Lowest Cost, Performance, Size | Hard disk |
| DeskOptionScanKB | Lowest Cost, Performance | Scanner keyboard |
| DeskOptionGraphics | Lowest Cost, Performance | Graphics accelerator |
| DeskOptionCDROM | Lowest Cost, Performance, NrOfDisks | CDROM |
| DeskOptionPDCD | Lowest Cost, Performance | PDCD in desktop base product |

FIG. 24A

| Class | Properties | Description |
|---|---|---|
| Server Features | | |
| ServBaseCPU | Performance | CPU in server base product |
| ServBaseMemory | Size | Memory in server base product |
| ServBaseHD | Size, Performance | HD in server base product |
| ServBaseCDROM | Performance, NrOfDisks | CDROM in server base product |
| ServBaseGraphics | Performance | Graphics in server base product |
| ServBasePDCD | Performance | PDCD in server base product |
| Server Options | | |
| ServOptionMonitor | Lowest Cost, Performance, Size | Monitor |
| ServOptionNic | Lowest Cost, Performance | NIC |
| ServOptionHD | Lowest Cost, Performance, Size | Internal hard disk |
| ServOptionDiskArray | | External hard disk in disk array cabinet |
| ServOptionSmartCtrl | | Smart controller for h/w based RAID solution and disk array support |
| ServOptionTapeBkup | | Tape backup |
| ServOptionRemoteIM | | Remote intelligent manageability |
| ServOptionServArray | | Clustering options, server arrays, multi-node |
| ServOptionRecoveryServ | | Recovery server options |
| ServOptionCDROM | Lowest Cost, Performance, NrOfDisks | CDROM |
| ServOptionPDCD | Lowest Cost, Performance | PDCD |

*FIG. 24B*

| Class | Properties | Description |
|---|---|---|
| Operating Systems | | |
| DeskOS | Lowest Cost, Performance, Security, Fault Tolerance | Desktop operating system |
| ServOS | Lowest Cost, Performance, Security, Fault Tolerance | Server operating system |
| PortOS | Lowest Cost, Performance, Security, Fault Tolerance | Portable operating system |
| DeskOS | SuggestedCPU, SuggestedMemorySize, SuggestedHDSize, SuggestedCDROMSpeed | Desktop operating system, product requirements. These requirements are stored in the Product Requirements table, not the Requirements Translation table. |
| ServOS | SuggestedCPU, SuggestedMemorySize, SuggestedHDSize, SuggestedCDROMSpeed | Server operating system, product requirements. These requirements are stored in the Product Requirements table, not the Requirements Translation table. |
| PortOS | SuggestedCPU, SuggestedMemorySize, SuggestedHDSize, SuggestedCDROMSpeed | Portable operating system, product requirements. These requirements are stored in the Product Requirements table, not the Requirements Translation table. |
| Applications | | |
| DeskApp | SuggestedCPU, SuggestedMemorySize, SuggestedHDSize, SuggestedCDROMSpeed | Desktop applications, product requirements. These requirements are stored in the Product Requirements table, not the Requirements Translation table. |
| ServApp | SuggestedCPU, SuggestedMemorySize, SuggestedHDSize, SuggestedCDROMSpeed | Server applications, product requirements. These requirements are stored in the Product Requirements table, not the Requirements Translation table. |
| PortApp | SuggestedCPU, SuggestedMemorySize, SuggestedHDSize, SuggestedCDROMSpeed | Portable applications, product requirements. These requirements are stored in the Product Requirements table, not the Requirements Translation table. |

Purchase Order Form

`http://www.xxxxxx.com/`

FROM:
TELCOMT Company
6473 185th Ave
P.O. Box 773
Redmond VA, 77336

BILL TO:
NCC Construction Company
6574 177th Street
P.O. Box 449
Redmond VA, 77733

| QTY | Description | Unit Price | Extended Price |
|---|---|---|---|
| 1 | DeskTop 3000 PC 133MHz | $1,400.00 | |
| 1 | DeskTop 3100 PC 166MHz | $1,800.00 | |
| 1 | DeskTop 3110 PC 2166MHz | $1,900.00 | |
| 1 | Server Model MTC 200MHz | $3,000.00 | |
| 1 | 10Tbase Hub | $500.00 | |
| 3 | Ethernet Cards | $199.00 | |
| 1 | Laser Printer Model 56 | $3,000.00 | |
| 3 | MS Office 97 | $695.00 | |
| 1 | MS Windows NT 4.0 | $100.00 | |
| 3 | MS WIN95 | $99.00 | |
| | TOTAL | | $14,679.00 |

Add Equipment
Configuration Layout

Save Purchase Order
Customer Service

[Edit Purchase Order]  [Submit Purchase Order]  [View Receipt]

FIG. 57

| QB 20000 | | |
|---|---|---|
| Name: | | |
| Purpose: | Determine the number of computers needed their types and a growth projection | |
| Ask: | If this is a new network or they are adding another network or they are adding equipment | |
| | QID: | 1 |
| | Question: | How many computers are you looking to purchase? |
| | Prompt: | |
| | Answers: | |
| | QID: | 2 |
| | Question: | How many of these computers will be servers? |
| | Prompt: | |
| | Answers: | |
| | QID: | 3 |
| | Question: | How many of these computers will be portables? |
| | Prompt: | |
| | Answers: | |
| | QID: | 4 |
| | Question: | How many computers do you anticipate adding over the next year? |
| | Prompt: | |
| | Answers: | |
| | QID: | 5 |
| | Question: | How many printers are you looking to purchase? |
| | Prompt: | |
| | Answers: | |
| | QID: | 6 |
| | Question: | How many of these printers will be shared on the network? |
| | Prompt: | |
| | Answers: | |
| Analysis, Actions | | |

| 10.5.2 QB 20001 (Determine type of additional services needed) | |
|---|---|
| Name: | |
| Purpose: | Determine the number of computers needed their types and a growth projection |
| Ask: | If this is a new network, adding a network, or adding services |

| | |
|---|---|
| QID: | 7 |
| Question: | Do you need shared Fax send/receive? |
| Prompt: | |
| Answers: | |
| QID: | 8 |
| Question: | Will multiple employees need to access the Internet or other online service at any time? |
| Prompt: | |
| Answers: | |
| QID: | 9 |
| Question: | Will any employee need to access the LAN while out of the office? |
| Prompt: | |
| Answers: | |
| QID: | 10 |
| Question: | Will multiple employees need to access a Wide-Area Network for the purposes of communicating with another LAN at another location? |
| Prompt: | |
| Answers: | |
| QID: | 11 |
| Question: | What types of email service do you require? |
| Prompt: | check all that apply |
| Answers: | internal (Office), external (Internet) |

| Analysis, Actions | |
|---|---|

| 10.5.3 QB 20002 (Determine brand preferences) | |
|---|---|
| Name: | |
| Purpose: | Determine the user's brand preferences for certain types of products. |
| Ask: | Always |

| | |
|---|---|
| QID: | 1 |
| Question: | Do you have any brand preferences for the following product types? |
| Prompt: | Please check all that apply |
| Answers: | networking, communications |

| Analysis, Actions | If networking is checked, ask QB 20003. If communications is checked, ask QB 20004. |
|---|---|

FIG. 58B

10.5.4 QB 20003 (Determine networking brand preferences)

| | |
|---|---|
| Name: | |
| Purpose: | Determine the user's brand preferences for networking products. |
| Ask: | If checked in QB 20002 |

| | |
|---|---|
| QID: | 1 |
| Question: | Which brands do you prefer for the product types listed below |
| Prompt: | Please check one per product type |
| Answers: | routers: None, 3COM, CISCO, Bay Area, etc. |
| | hubs: None, 3COM, CISCO, Bay Area, etc. |
| | switches: None, 3COM, CISCO, Bay Area, etc. |

| | |
|---|---|
| Analysis, Actions | Record brand preferences (if any) |

10.5.5 QB 20004 (Determine communications brand preferences)

| | |
|---|---|
| Name: | |
| Purpose: | Determine the user's brand preferences for communications products. |
| Ask: | If checked in QB 20002 |

| | |
|---|---|
| QID: | 1 |
| Question: | Which brands do you prefer for the product types listed below |
| Prompt: | Please check one per product type |
| Answers: | Modems: None, Hayes, USR, Practical Peripherals |
| | ISDN TA: None, IBM, Motorola, Hayes, USR. |

| | |
|---|---|
| Analysis, Actions | Record brand preferences (if any) |

10.6 QB 30000 (Determine general guidelines for the solution)

| | |
|---|---|
| Name: | |
| Purpose: | Determine general guidelines for the solution |
| Ask: | Always |

| | |
|---|---|
| QID: | 1 |
| Question: | Please enter your budget constraint |
| Prompt: | |
| Answers: | Max value in budget |
| QID: | 2 |
| Question: | Please indicate how you would like us to balance performance vs. cost |
| Prompt: | |
| Answers: | lowest cost, low cost, balance cost vs. performance, high performance, highest performance |

| | |
|---|---|
| Analysis, Actions | Set all guidelines to the same value specified for cost vs. performance |

FIG. 58C

| 10.6.2 QB 30001 (Determine desktop OS preference) | | *172 |
|---|---|---|
| Name:<br>Purpose:<br>Ask: | Determine desktop OS preferences<br>Only if desktops are required | *174 |
| QID:<br>Question:<br>Prompt:<br>Answers: | 1<br>Please specify your preference for desktop Operating Systems<br>Please select one (this question is optional)<br>Windows 95, Windows NT 4.x | *176 |
| Analysis,<br>Actions | Pre-select Windows 95, then based on the user's answer drive toward the preferred OS if possible. If they select an old OS, warn them about lack of future support and recommend a more modern OS. | *178 |

| 10.6.3 QB 30002 (Determine server OS preference) | | *172 |
|---|---|---|
| Name:<br>Purpose:<br>Ask: | Determine server OS preferences<br>Only if servers are required | *174 |
| QID:<br>Question:<br>Prompt:<br>Answers: | 1<br>Please specify your preference for server Operating Systems<br>Please select one (this question is optional)<br>Windows 95 (peer/peer), Windows NT 4.x, Netware 4.x | *176 |
| Analysis,<br>Actions | Pre-select Windows NT 4.x, then based on the user's answer drive toward the preferred OS if possible. If they select an old OS, warn them about lack of future support and recommend a more modern OS. | *178 |

| 10.6.4 QB 30003 (Determine portable OS preference) | | *172 |
|---|---|---|
| Name:<br>Purpose:<br>Ask: | Determine portable OS preferences<br>Only if portables are required | *174 |
| QID:<br>Question:<br>Prompt:<br>Answers: | 1<br>Please specify your preference for portable Operating Systems<br>Please select one (this question is optional)<br>Windows 95, Windows NT 4.x | *176 |
| Analysis,<br>Actions | Pre-select Windows 95, then based on the user's answer drive toward the preferred OS if possible. If they select an old OS, warn them about lack of future support and recommend a more modern OS. | *178 |

| 10.7.1.1 QB 40000 (Identify user and their expectations) | |
|---|---|
| Name:<br>Purpose:<br>Ask: | <br>Identify user and their expectations<br>Always for each desktop |
| QID:<br>Question:<br>Prompt:<br>Answers: | 1<br>Who will be the primary user of this desktop?<br><br>(name) |
| QID:<br>Question:<br>Prompt:<br>Answers: | 2<br>How would you classify this primary user?<br>They are a:<br>power user, intermediate user, entry-level user |
| Analysis,<br>Actions | |

| 10.7.1.2 QB 40001 (Identify the primary application categories for this desktop) | |
|---|---|
| Name:<br>Purpose:<br>Ask: | <br>Identify the primary application categories for this desktop<br>Always for each desktop |
| QID:<br>Question:<br>Prompt:<br>Answers: | 1<br>What categories of applications do you intend to run on this desktop?<br><br>Contact Manager, Calendar/Scheduling, Email, Word Processing, Spreadsheet, Database, Presentation, Project Management, Faxing, Accounting, Online Service, Internet, Drawing Tools, Programming, |
| Analysis,<br>Actions | Based on what the user checked, present appropriate QB's to determine the application(s) within each category (use leaf QB's) |

| 10.7.1.3 QB 40002 (Identify the need for Fax send/receive at this desktop) | |
|---|---|
| Name:<br>Purpose:<br>Ask: | <br>Identify the need for Fax send/receive at this desktop<br>Always for each desktop provided a centralized fax solution has not been identified |
| QID:<br>Question:<br>Prompt:<br>Answers: | 1<br>Will you need to send/receive Faxes from this desktop?<br><br> |
| Analysis,<br>Actions | If YES then recommend a modem and a scanner, by presenting the appropriate QB's. |

FIG. 58E

10.7.1.4 QB 40003 (Select multimedia capability)

| | |
|---|---|
| Name: | |
| Purpose: | Select multimedia capability |
| Ask: | Never - it's been deactivated at this time due to no MM requirement. |

| | |
|---|---|
| QID: | 1 |
| Question: | What quality of multimedia do you need? |
| Prompt: | |
| Answers: | none, low, moderate, high |

| | |
|---|---|
| Analysis, Actions | Select closest kit |

10.7.1.5 QB 40004 (Determine access needs to online services or Internet for this desktop)

| | |
|---|---|
| Name: | |
| Purpose: | Determine access needs to online services or Internet for this desktop |
| Ask: | Always for each desktop provided that a centralized Internet or online service access has not been identified |

| | |
|---|---|
| QID: | 1 |
| Question: | Do you need to access an online service or the Internet from this desktop? |
| Prompt: | |
| Answers: | |

| | |
|---|---|
| Analysis, Actions | If YES then recommend communications device, and service account |

10.7.1.6 QB 40005 (Determine need for a local printer)

| | |
|---|---|
| Name: | |
| Purpose: | Determine need for a local printer |
| Ask: | Always for each desktop |

| | |
|---|---|
| QID: | 1 |
| Question: | Will there be a local printer connected to this desktop? |
| Prompt: | |
| Answers: | |

| | |
|---|---|
| Analysis, Actions | Only ask if there are printers to be assigned. |

FIG. 58F

| 10.7.1.4 QB 400xx | —172 |
|---|---|
| Name:<br>Purpose:<br>Ask: | —174 |
|     QID:<br>    Question:<br>    Prompt:<br>    Answers: | —176 |
| Analysis,<br>Actions | —178 |

| 10.7.2.1 QB 41000 (Determine the type of services a server must support) | | —172 |
|---|---|---|
| Name:<br>Purpose:<br>Ask: | Determine the type of services the server will be required to support.<br>Always | —174 |
|     QID:<br>    Question:<br>    Prompt:<br>    Answers: | 1<br>Please identify all of the functions that this server will perform<br>Check all that apply<br>File Server, Email Server, Groupware server, Database Server, Print Server, Fax Server, Internet Server, Communications Server | —176 |
| Analysis,<br>Actions | For each class of service that the server will provide, we can have some base figures for memory, CPU bandwidth, HD sizes, that generally represent a good starting point. | —178 |

| | | |
|---|---|---|
| 10.7.2.2 QB 41001 (Determine factors that impact server performance sizing) | | _—172 |
| Name: <br> Purpose: <br> Ask: | <br> Determine the factors that affect server sizing with respect to throughput/performance. <br> Always | _—174 |
| QID: <br> Question: <br><br> Prompt: <br> Answers: <br><br><br><br><br> QID: <br> Question: <br><br> Prompt: <br> Answers: <br><br><br><br><br><br><br> QID: <br> Question: <br><br> Prompt: <br> Answers: <br><br> QID: <br> Question: <br><br> Prompt: <br> Answers: <br><br> QID: <br> Question: <br><br> Prompt: <br> Answers: | 1 <br> What is the maximum number of concurrent users for each of the services this server will provide (in the foreseeable future)? <br> Enter a value for all that apply <br> File Server Concurrent Users, Email Server Concurrent Users, Groupware Server Concurrent Users, <br> Database Server Concurrent Users, Print Server Concurrent Users, <br> Fax Server Concurrent Users, Internet Server Concurrent Users , <br> Communications Server Concurrent Users <br><br> 2 <br> What is the average number of concurrent users for each of the services this server will provide (in the foreseeable future)? <br> Enter a value for all that apply <br> File Server Average Concurrent Users, <br> Email Server Average Concurrent Users, <br> Groupware Server Average Concurrent Users, <br> Database Server Average Concurrent Users, <br> Print Server Average Concurrent Users, <br> Fax Server Average Concurrent Users, <br> Internet Server Average Concurrent Users, <br> Communications Server Average Concurrent Users <br><br> 3 <br> How would you classify the operations these users perform on the server, in any of the server service areas? <br> Select one <br> Light Usage, Moderate Usage, Heavy Usage <br><br> 4 <br> What amount of server processing delay can you accept, in the average server loading case? <br><br> Average service time (in seconds) <br><br> 5 <br> What amount of server processing delay can you accept, in the heaviest server loading case? <br><br> Worst service time (in seconds) | _—176 |
| Analysis, Actions | The maximum number of concurrent users, coupled with the level of loading each user represents and the worst allowable server processing delay are inputs to size the peak performance requirement. <br><br> The average number of concurrent users, coupled with the level of loading each user represents and the average allowable server processing delay are inputs to size the sustained performance requirement. | _—178 |

| | |
|---|---|
| 10.7.2.3 QB 41002 (Determine factors that impact HD sizing) | —172 |
| Name:<br>Purpose: Determine the amount of HD space for server sizing<br>Ask: Always | —174 |
| QID: 1<br>Question: Please estimate the amount of server disk space that each user will maximally require, in each of the service areas that the server supports<br>Prompt: Enter a value for all services that apply<br>Answers: Email Server, Groupware Server, Print Server, Fax Server, Internet Server, Communications Server | —176 |
| Analysis,<br>Actions Multiply these HD estimates with the number worst case number of concurrent users, per service. | —178 |

| | |
|---|---|
| 10.7.2.4 QB 41003 (Determine disk quotas for file server role) | —172 |
| Name:<br>Purpose: Determine the maximum server disk space quota per user, when using the server in its File Server role<br>Ask: Only if the user specified that File Server is one of the services supported by the server. | —174 |
| QID: 1<br>Question: How many users will have a disk quota on this File Server (in the foreseeable future)?<br>Prompt:<br>Answers: File Server Users<br><br>QID: 2<br>Question: How large a disk quota would you like to reserve for each user of the File Server?<br>Prompt:<br>Answers: File Server User Quota | —176 |
| Analysis,<br>Actions Multiply File Server User Quota, by File Server Users | —178 |

| 10.7.2.5 QB 41004 (Determine level of fault tolerance required) | | 172 |
|---|---|---|
| Name:<br>Purpose:<br>Ask: | Determine the level of fault tolerance for the server.<br>Always | 174 |
| QID:<br>Question:<br><br>Prompt:<br>Answers: | 1<br>Considering mission criticality for this server, how much downtime are you prepared to endure if the server were to fail?<br>Select one.<br>None, A few seconds, A few minutes, Longer still | 176 |
| Analysis,<br>Actions | "None"  maps to Server Array (highest level)<br>"Seconds" maps to Online Recovery Server<br>"Minutes" maps to Standby Recovery Server and potentially,<br>    redundant hardware in the server.<br>"Longer" maps to traditional service call and potentially,<br>    redundant hardware in the server | 178 |

| 10.7.2.6 QB 4100x | 172 |
|---|---|
| Name:<br>Purpose:<br>Ask: | 174 |
| QID:<br>Question:<br>Prompt:<br>Answers: | 176 |
| Analysis,<br>Actions | 178 |

| 10.7.3.1 QB 42000 (Identify user and their expectations) | —172 |
|---|---|
| Name:<br>Purpose:  Identify user and their expectations<br>Ask:  Always for each portable | —174 |
|     QID:  1<br>    Question:  Who will be the primary user of this desktop?<br>    Prompt:<br>    Answers:  (name)<br><br>    QID:  2<br>    Question:  How would you classify this primary user?<br>    Prompt:  They are a:<br>    Answers:  power user, intermediate user, entry-level user | —176 |
| Analysis,<br>Actions | —178 |

| 10.7.3.2 QB 42001 (Identify the primary application categories for this portable) | —172 |
|---|---|
| Name:<br>Purpose:  Identify the primary application categories for this portable<br>Ask:  Always for each portable | —174 |
|     QID:  1<br>    Question:  What categories of applications do you intend to run on this portable?<br>    Prompt:<br>    Answers:  Contact Manager, Calendar/Scheduling, Email, Word Processing, Spreadsheet, Database, Presentation, Project Management, Faxing, Accounting, Online Service, Internet, Drawing Tools, Programming, Remote Access | —176 |
| Analysis,  Based on what the user checked, present appropriate QB's to<br>Actions  determine the application(s) within each category (use leaf QB's) | —178 |

10.7.3.3 QB 42002 (Determine need for a SmartStation) — 172

| | | |
|---|---|---|
| Name: | | |
| Purpose: | Determine need for a smartstation | — 174 |
| Ask: | Always for each portable | |
| QID: | 1 | |
| Question: | Will this portable be the user's primary computer? | — 176 |
| Prompt: | | |
| Answers: | | |
| Analysis, Actions | If YES, recommend smartstation, monitor, keyboard, mouse, NIC for office | — 178 |

10.7.3.4 QB 42003 (Determine need for a NIC) — 172

| | | |
|---|---|---|
| Name: | | |
| Purpose: | Determine need for a NIC | — 174 |
| Ask: | Always for each portable | |
| QID: | 1 | |
| Question: | Will you need to connect this portable to the LAN without using a SmartStation? | — 176 |
| Prompt: | | |
| Answers: | | |
| Analysis, Actions | If YES then allow selection of PC card NIC's. | — 178 |

10.7.3.5 QB 42004 (Determine need for a local printer)

Name:
Purpose: Determine need for a local printer
Ask: Always for each portable

QID: 1
    Question: Will there be a local printer connected to the portable?
    Prompt:
    Answers:

Analysis, Actions Only ask if there are printers to be assigned.

10.7.3.6 QB 42005 (Identify the need for Fax send/receive at this portable)

Name:
Purpose: Identify the need for Fax send/receive at this portable
Ask: Always for each portable

QID: 1
    Question: Will you need to send/receive Faxes from this portable?
    Prompt:
    Answers:

Analysis, Actions If YES then recommend a PC card modem by presenting the appropriate QB's.

FIG. 58M

| 10.7.3.7 QB 42006 (Select multimedia capability) | |
|---|---|
| Name: | |
| Purpose: | Select multimedia capability |
| Ask: | Always for each portable |
| QID: | 1 |
| Question: | What quality of multimedia do you need? |
| Prompt: | |
| Answers: | none, low, moderate, high |
| Analysis, Actions | Select closest kit |

| 10.7.3.8 QB 42007 (Determine need for Remote Access) | |
|---|---|
| Name: | |
| Purpose: | Determine need for remote access |
| Ask: | Always for each portable |
| QID: | 1 |
| Question: | Will this portable be used to remotely access the LAN |
| Prompt: | |
| Answers: | |
| Analysis, Actions | If YES, recommend PC card modem |

| 10.7.3.9 QB 42008 (Determine access needs to online services or Internet for this portable) | |
|---|---|
| Name: | |
| Purpose: | Determine access needs to online services or Internet for this portable |
| Ask: | Always for each portable |
| QID: | 1 |
| Question: | Do you need to access an online service or the Internet from this portable? |
| Prompt: | |
| Answers: | |
| Analysis, Actions | If YES then recommend PC card modem, and service account |

Name:
Purpose:
Ask:       Always

QID:
    Question:
    Prompt:
    Answers:

Analysis,
Actions

10.8.3 Remote Access

10.8.4 Internet

10.8.4.1 QB 62000

Name:
Purpose:
Ask:       Always

QID:
    Question:
    Prompt:
    Answers:

Analysis,
Actions

FIG. 58P

| 10.9.1 QB 80000 (Select Contact Manager Application) | —172 |
|---|---|
| Name:<br>Purpose: Select Contact Manager Application<br>Ask: Only when directed | —174 |
| QID 1<br>Question: Please select your contact manager application(s)<br>Prompt: check all that apply<br>Answers: ACT, ... | —176 |
| Analysis,<br>Actions | —178 |

| 10.9.2 QB 80001 (Select Calendar/Scheduling Application) | —172 |
|---|---|
| Name:<br>Purpose: Select Calendar/Scheduling Application<br>Ask: Only when directed | —174 |
| QID: 1<br>Question: Please select your calendar/scheduling application(s)<br>Prompt: Check all that apply<br>Answers: | —176 |
| Analysis,<br>Actions | —178 |

| 10.9.3 QB 80002 (Select Email Application) | —172 |
|---|---|
| Name:<br>Purpose: Select Email Application<br>Ask: Only when directed | —174 |
| QID: 1<br>Question: Please select your email application<br>Prompt:<br>Answers: | —176 |
| Analysis,<br>Actions | —178 |

| 10.9.4 QB 80003 (Select Word Processing Application) | |
|---|---|
| Name: | |
| Purpose: | Select Word Processing Application |
| Ask: | Only when directed |
| QID: | 1 |
| Question: | Please select your word-processing application(s) |
| Prompt: | check all that apply |
| Answers: | Winword, AMI Pro, Wordperfect |
| Analysis, Actions | |

| 10.9.5 QB 80004 (Select a modem) | |
|---|---|
| Name: | |
| Purpose: | Select a modem |
| Ask: | Only when directed |
| QID: | 1 |
| Question: | Please select one of the following modems |
| Prompt: | |
| Answers: | a modem |
| Analysis, Actions | User is asked this once the need for a modem has been determined at the local desktop. Recommend separate dial line to the desktop |

| 10.9.6 QB 80005 (Select a scanner) | |
|---|---|
| Name: | |
| Purpose: | Select a scanner |
| Ask: | Only when directed |
| QID: | 1 |
| Question: | Please select one of the following scanners |
| Prompt: | |
| Answers: | a scanner |
| Analysis, Actions | User is asked this once the need for a scanner has been determined at the local desktop |

*FIG. 58R*

| 10.9.7 QB 80006 (Select a removal storage option) | |
|---|---|
| Name: | |
| Purpose: | Select a removal storage option |
| Ask: | Only when directed |
| QID: | 1 |
| Question: | Please select one of the following removal storage options |
| Prompt: | |
| Answers: | Zip, Jazz, LS120, PDCD |
| Analysis, Actions | |

| 10.9.8 QB 80007 (Select a local printer) | |
|---|---|
| Name: | |
| Purpose: | Select a local printer |
| Ask: | Only when directed |
| QID: | 1 |
| Question: | Please select one of the following printers |
| Prompt: | |
| Answers: | none, printer list |
| Analysis, Actions | |

FIG. 58S

| 10.9.9 QB 80008 (Select special input devices) | —172 |
|---|---|
| Name:<br>Purpose: Select special input devices<br>Ask: Only when directed | —174 |
|     QID: 1<br>    Question: Please select your special input devices<br>    Prompt: Check all that apply<br>    Answers: input devices | —176 |
| Analysis,<br>Actions | —178 |

| 10.9.10 QB 800xx | —172 |
|---|---|
| Name:<br>Purpose:<br>Ask: Only when directed | —174 |
|     QID:<br>    Question:<br>    Prompt:<br>    Answers: | —176 |
| Analysis,<br>Actions | —178 |

| 10.3.1 QB 00000 (To gather company contact and address information) | | |
|---|---|---|
| Name: | | |
| Purpose: | To gather company contact and address information | |
| Ask: | If this is the first time the user has used Solutions Wizard | |
| | QID: | 1 |
| | Question: | Company Name |
| | Prompt: | |
| | Answers: | |
| | QID: | 2 |
| | Question: | Company Address |
| | Prompt: | |
| | Answers: | |
| | QID: | 3 |
| | Question: | Company Phone Number |
| | Prompt: | |
| | Answers: | |
| | QID: | 4 |
| | Question: | Company Fax Number |
| | Prompt: | |
| | Answers: | |
| | QID: | 5 |
| | Question: | Company Email Address |
| | Prompt: | |
| | Answers: | |
| | QID: | 6 |
| | Question: | Company Web Site |
| | Prompt: | |
| | Answers: | |
| | QID: | 7 |
| | Question: | Type of Business |
| | Prompt: | |
| | Answers: | |
| | QID: | 8 |
| | Question: | Primary Contact Name |
| | Prompt: | |
| | Answers: | |
| | QID: | 9 |
| | Question: | Primary Contact Phone Number |
| | Prompt: | |
| | Answers: | |

|  |  |  |
|---|---|---|
| QID: | 10 | |
| Question: | Primary Contact Fax Number | |
| Prompt: | | |
| Answers: | | — 176 |
| QID: | 11 | |
| Question: | Primary Contact Email Address | |
| Prompt: | | |
| Answers: | | |
| Analysis, Actions | Store. | — 178 |

10.4.1 QB 10000 (Determine what the user is trying to accomplish with Solutions Wizard) — 172

| | | |
|---|---|---|
| Name: | | |
| Purpose: | Determine what the user is trying to accomplish with Solutions Wizard | — 174 |
| Ask: | Always | |
| QID: | 1 | |
| Question: | What would you like to accomplish with this tool? | — 176 |
| Prompt: | | |
| Answers: | New Network, Add Another Network, Add Services, Add Equipment | |
| Analysis, Actions | The answer here, guide the questions in the Requirements section. | — 178 |

10.4.2 QB 10001 — 172

| | | |
|---|---|---|
| Name: | | |
| Purpose: | | — 174 |
| Ask: | Always | |
| QID: | | |
| Question: | | — 176 |
| Prompt: | | |
| Answers: | | |
| Analysis, Actions | | — 178 |

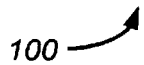

METHOD AND APPARATUS FOR AN INCREMENTAL EDITOR TECHNOLOGY

BACKGROUND OF THE INVENTION

1. Field of the Invention

The present invention relates to a system for providing product selection and, more specifically, to interactive object-driven database product selection.

2. Description of the Related Art

Technological development is constantly producing an ever-growing array of increasingly sophisticated, less expensive, and more useful products for use in a typical business environment. New networking products, Internet related services, storage and data retrieval methodologies, as well as video and telecommunication products can make selecting products and services appropriate for a particular business a very difficult task. Not only must the business user attempt to keep up with the evolving technological capabilities of modern devices, but that user must also attempt to anticipate the future growth of the business and allow for future business needs. The complexity of the technology, coupled with the high ticket price of many business information solutions, can give the most astute business executive pause.

Value added resellers (VAR's) attempt to fill the need by discussing business needs with business personnel, and attempt to customize information technology solutions to the needs of the particular business. However, although VAR's are typically extremely knowledgeable about the available products, identifying customer needs and translating the business user's description of an ideal information or communication solution from a business world to a technology world calls for creative thinking. Businesses typically do not know to the nearest megabyte how much memory they need, nor the baud rate of communication lines that are needed, nor which type of server or network related hardware or software is appropriate. Furthermore, from the technology side, new products and services cannot find the market for which they are most appropriate if customers are not aware that the products exist and the VAR's do not realize the business has a particular need.

As businesses that have ever purchased computer or communication equipment know, selecting the appropriate hardware, software, and network configuration is only part of the problem. Individual desktop and notebook computers compatible with the network, printers, and other equipment must be selected based upon human consideration such as user familiarity and technical background, training, time, previously purchased embedded equipment, budget considerations and technological needs. Selecting a particular processor speed or the number of pixels per inch of resolution on a desktop computer monitor, for example, are technological considerations that an end-user or a customer in a non-computer business may find difficult to express. Evaluating the trade-offs between slight increases in processor speed and slight decreases in communication bandwidth, for example, are frequently decisions businesses prefer to leave to the technical consultants. Customers often would prefer to communicate their business needs in non-technical language, including what trade-offs the business would be willing to make from a business perspective, if there were some assurance that the technical consultant could optimize a solution to those business needs.

The VAR or technical consultant, of course, must be familiar with products and services currently available. However, these products and services change over time as new products are introduced or are discontinued or are available in only limited geographical locations. Often price or availability can vary drastically from region to region, let alone country to country, adding complexity to the consultant's task. Local and wide area network standards, linguistic considerations, and even power supply compatibility requirements impose severe external constraints on a solution. Software must be selected that has a user interface and a human user interface language that the employees of the customer's business can understand, and must be interconnectable with other products related to the customer's business.

If the difficulties inherent in keeping current with new product availability factors were not enough, the technical consultant is often further relied upon for installation and configuration of the equipment pertinent to the solution. Although computer equipment often includes a set of "instructions" for installation, the instructions included are often written at a single level of technical sophistication and often require some previous familiarity with the product family. Configuring products from various manufacturers can create interoperability problems, calling for some creative implementation on the part of the technical consultant. Not only are the implementation or installation instructions typically written at a single level of technological familiarity, often without a telephone number or other means of acquiring additional information about the product necessary for installation, but the changing technological landscape frequently requires retrofitting new devices into pre-existing systems. Equipment previously installed in a network may need to be reconfigured slightly, as new equipment is also installed into the network, yet implementation instructions for such retrofitting are difficult to develop.

Finally, while the technical consultant and the customer may be able to reduce the set of possible solutions to a relatively small class of possibilities, some considerations may not seem particularly relevant at the time. Selecting a solution based upon limited information requires more than a straight-forward algebraic function, since there may be a large number of "don't care" parameters. Rather, a solution may be required based upon only a very limited amount of information. Alternately, a business may not know which of a small number of alternatives may evolve; for example, the business may not know whether it will win a particular contract or expand, and therefore a baseline solution expandable in a number of directions may be needed. Solving problems based on a limited amount of information, while allowing for later introduction of additional constraints, is a science referred to as "fuzzy logic," involving a complex set of determinations.

SUMMARY OF THE INVENTION

The exemplary embodiment of the present invention is an object-driven application tool that gathers information on a user's computing equipment requirements through a series of questions and then suggests a solution that meets or exceeds those requirements. Although the exemplary embodiment of the present invention is largely a data driven application or collection of applications, creative information handling also allows selection of an optimum solution based upon limited information.

The exemplary embodiment of the present invention, in one implementation, includes a maintained database that incorporates a large body of publicly available information about computing devices. The exemplary embodiment of the present invention also includes a variety of tools to help a VAR identify the needs of a particular customer or end user, and select an appropriate solution of equipment, software, and networking products to meet the customer's needs. Moreover, the exemplary embodiment of the present invention includes tools for allowing a VAR to demonstrate to the end user the appropriateness of the solution. Still other tools allow information entry in a high level, abstract, business-oriented vocabulary rather than a highly technical, low level jargon, facilitating data entry of information obtained from the end user. Still other tools allow the exemplary embodiment of the present invention to recognize whether, for example, a slight increase in memory capacity beyond the express needs of the end user may allow a dramatic reduction in requirements for processor speed or non-volatile data storage. The latter tools allow the exemplary embodiment of the present invention to suggest superior solutions over and beyond the express needs of the end user. Although departing slightly from the limits imposed by the input information, such a tool allows the exemplary embodiment of the present invention to suggest products and services, networking configuration, and other solution attributes that perhaps the VAR or end user might not have considered.

Calibration, or selection of a particular solution, is generally decoupled from the needs of the end user, which is stored in a separate database; thereafter, as new equipment to obtain on-line information relating to new products and services. Information in the database also includes retrofit information, so that new products can be installed into existing networks.

The exemplary embodiment of the present invention also includes a very high level set of software objects for obtaining information from a user and searching the database of products and services to provide the optimum solution. Rather than a hard-coded software tree for branching among a fixed set of questions, the exemplary embodiment of the present invention is driven by the data objects, which themselves invoke other objects that adjust a solution according to the available product information and user responses to previous questions. Therefore, as the user provides information to the various question blocks, the exemplary embodiment of the present invention dynamically searches the database for possible solutions. The search for solutions among the database drives further question blocks (contained in QuestionProcs 100*a*) for obtaining still more information from the user, to narrow down the selection of possible solutions. Rather than obtaining information in technical jargon, the exemplary embodiment of the present invention uses question blocks which prompt the user for information in the user's own vocabulary. This high level, data-driven, object oriented approach allows tremendous expandability and flexibility on the part of the exemplary embodiment of the present invention.

An exemplary QuestionProc 100*a* is shown in FIG. 22H (also shown in FIG. 3). Identified by a process block identifier, an identifier indicating the question sequence to which the QuestionProc100*a* belongs, an Answer Type providing a link to an Answers Base Class 140 (FIG. 22B), and an object ID corresponding to the appropriate subclass of the Answers Base Class 140 to which the user's response is to be written are also included. The object ID allows processes corresponding to the Answers Base Class 140 to find the user's response and incorporate the response such that analytical processes of a User Guidelines Base Class 160 and a Requirements Base Class 180 can find and analyze the responses.

The QuestionProc 100*a* includes a list of questions. The questions are extensions or subclasses of the QuestionProc 100*a*, identified by question key, language key providing a link to the Language Base Class 700, and a question. The question may be limited in length, for example to 255 characters. The Language Base Class 700 is illustrated in FIG. 23B.

The tool may be operated in expert mode 400*c*, as an alternative to the novice mode. Novice mode allows a user to observe much of the power of the tool, as the tool prompts the user for questions in easy-to-understand vocabulary. Expert mode 400*c*, on the other hand, allows a user who is familiar with specific products or groups of products to access the particular product or group of products directly. It should be noted, however, that the two modes are not mutually exclusive. For example, if a user is familiar with desktops and insists on a Deskpro 2000, for example, but wants to use the system to configure the remainder of the solutions, the expert mode 400*c*, allows the user to enter the expert mode 400*c* to identify desktops and then access novice mode to configure the remainder of the system.

The expert mode 400*c* has an "Assist Me" feature. The "Assist Me" feature has a number of uses. For example, the "Assist Me" feature can be used in conjunction with the incremental editor to provide a powerful resource for rapid solution determination. As will be explained, each product known to the tool is assigned a rank. The rank is determined by comparing the product to other products on the market; a product that is the best of ten products on the market, for example, is assigned a rank of 10, while a similar product of only median quality is assigned a rank of 5.

The incremental editor allows a user to substitute another product of slightly higher or lower rank for a product already defined as part of the solution. When the incremental editor is used, the tool automatically re-analyzes the solution, and recomputes the cost, speed, and other characteristics of the solution. The user may then reaccess the incremental editor, for the newly-substituted product or for any other product that is part of the solution. The incremental editor is available in either expert or novice mode. The incremental editor thus allows a user to identify a particular product in expert mode 400*c*, and then access the incremental editor to substitute a different product for the product identified.

Various features and tools in the exemplary embodiment of the present invention allow the selection of an appropriate server, inter-networking components, local area network, as well as pricing and product shipping information.

BRIEF DESCRIPTION OF THE DRAWINGS

A better understanding of the present invention can be obtained when the following detailed description of the preferred embodiment is considered in conjunction with the following drawings, in which:

FIG. 6 shows user specified guidelines having ranges of 1–3 and 0–100;

FIG. 8 shows attributes common to all object classes;

FIG. 9 shows attributes for each class, including properties and requirements;

FIG. 10 shows base requirements translation (subjective to rank translation) regarding desktop base;

FIGS. 11A and 11B show base requirements translation (subjective to rank) regarding desktop option (type of network interface controller, HD, graphics, etc);

FIG. 12 shows server base requirements;

FIG. 13 shows server option requirements;

FIG. 14 shows OS option requirements;

FIG. 15 shows OS products requirements;

FIG. 16 shows application requirements;

FIGS. 17A–17D show initial content of calibration base class;

FIGS. 18A–18C show object classes (Phase I);

FIG. 19 shows object subclass pertaining to servers;

FIG. 20 shows object subclass pertaining to portables;

FIG. 21 shows object subclass pertaining to networking equipment;

FIGS. 22A–22K and FIGS. 23A–C show relationships among the base object base classes, base class view, and object extension tables, and auxiliary base classes;

FIGS. 24A–24C show the requirements translation table of FIG. 7 in greater detail;

FIG. 46 shows a visual graphic display of a question block entry belonging to the informational question block category, seeking information regarding the user's personal record;

FIG. 57 shows a Purchase Order form useful for on-line product ordering; and.

DETAILED DESCRIPTION OF THE PREFERRED EMBODIMENT

Figure 1:
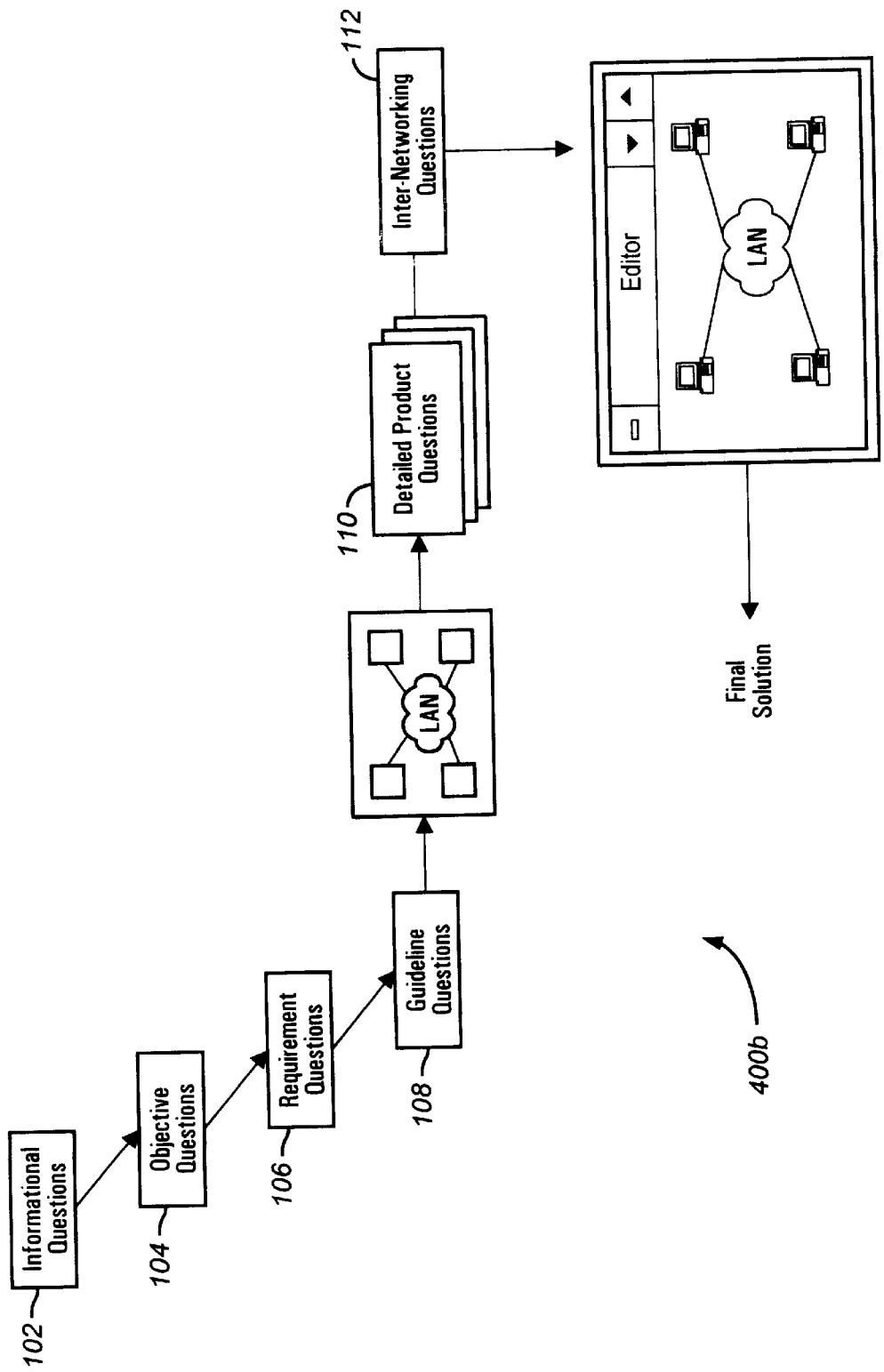
FIG. 1 shows the novice mode high level flow.

The exemplary embodiment of the present invention includes the ability to decouple various structures and thereby provide greater abstraction. For example, avoiding the hard-coding of pointers to the physical storage locations of the question blocks allows the exemplary embodiment of the present invention to share the question blocks among many clients, providing simultaneous interactive capacity. To accomplish this, the exemplary embodiment of the present invention provides each session with a view (i.e., a pseudo-table or temporary table) that can be run at the client's browser or elsewhere on the server. The view includes a number of object classes, including a number of base classes and subclasses, and related procedures. Each view is identified by a client session identifier (client session ID) and a machine identifier (machine ID).

To arrive at a solution to the customer's computing needs, the tool according to the invention employs four phases. In "Phase I" [the first phase], a Solution Framework is generated based on answers to very general questions. The Solution Framework provides an overview of the types of products and their inter-relationships that will be needed.

This framework is "fleshed out" in phase two, in which specific products fulfill various requirements for each particular product. Then, in phase three, these products are tied together with specific networking products. Finally, in phase four, this tool determines the configuration of the various selected products.

This process is an object driven process, in which the various levels of the solution are represented by objects which drive each other in asking questions and refining the actual chosen solution.

As each process is called or entered, a list of processes is maintained. An exemplary list 400*f* is illustrated in FIG. 22G. The list, residing in the view corresponding to the session, is identified by a primary key, and may be regarded as a queue of processes to be executed. A county code is included, as well as a list of processes that have recently been executed, and a list of processes to be executed. Also, a pointer to the prior (i.e., most recent) step executed, and to the next steps to be executed, in the current process are also maintained.

A. GENERAL OVERVIEW OF THE PROCESSES INVOLVED IN THE TOOL

A Products Base Class 240 (FIG. 22D), a Questions Block Base Class 100 (FIGS. 58A–58V), and an Object Base Class 600 (FIGS. 18A–18C) are maintained by manufacturers or other specialists, and are not alterable by a typical user. The Products Base Class 240 and Question Block Base Class 100 are analyzed by the other processes of the tool. A Client Table corresponding to a Client Base Class 120 (FIG. 3) for each client and machine is also maintained, defining a particular client's determined configuration, so that a user can choose merely to update a current configuration rather than devise an entire new system, and so that the various processes associated with the tool can develop a solution that makes appropriate use of the products the user has previously purchased. Generally, machines are considered separately; although a user can move products from one machine to another, typically the tool does not recommend solutions requiring such a move.

The structure of the Client Base Class 120 is shown in FIG. 22J. Each client table is identified by an identifier, and contains a language and country code identifier as well. Also, the session ID is provided, to facilitate (among other features) a history-tracking feature that allows a user to "undo" changes to the system before actually purchasing any products. Also, the date and time stamp allow the tool to store several versions of the implemented system, so that the system may be analyzed over time. For example, customer's client history may be reconstructed as part of an analysis to determine whether and how the customer's needs have changed over time, and whether the customer typically experiences rapid growth in computing meeds. A foreign key to main logic, a machine identifier, and a next and previous step field are also in the initial Client Base Class 120a. A Client History Table 120b, within the Client Base Class 120, is shown in FIG. 22K.

The Products Base Class 240 begins as a Products Base Class 240a, shown in FIG. 22D. The Products Base Class 240a contains a Class ID, a geo (geography) key, a product family key, a part number, an introduction data, and end of life date, and an availability flag. All of these attributes are relevant to a determination of whether a product may be included in a solution. The Class ID indicates the category of the product. For example, desktops are in a different category than servers. Each product also has a geo. The geo indicates the language (English, French, Japanese, etc.) and the geographical region of the world in which the product is available. The part number, introduction date, end of life data, and availability flag all help determine whether a product of limited availability is available for inclusion in the solution.

The geo is determined by a Language Base Class 700 (FIG. 23B) and a Country Base Class 750 (FIG. 23A) in response to questions from the user or as a function of information obtained from the Client Base Class 120.

As will become apparent on reference to the disclosure, a Solution Framework Base Class 400 contains the solution that is to be recommended to the user. However, during various stages of analysis performed by processes corresponding to the Solutions Framework Base Class 400, different instances of the base class are found. A Login Procedure for the Client Session creates a view, which is to say that the Login Procedure allocates a region of memory to the client session.

To create a Solution Framework Base Class 400 at the beginning of a session, processes generate a Solutions Object 400a containing a session ID, an Object ID, a Machine ID, and a part number, as shown in FIG. 22F. The Login Procedure then calls an initial Informational Question Block belonging to the Question Block Base Class 100. The Question Blocks are discussed in depth below, in reference to FIGS. 58A–58V. The initial Informational Question Block contains processes that examine various regions in an Answers Tables of an Answers Base Class 140 (FIG. 22B).

The Answers Base Class 400 begins the session as an Answers Base Class 140a, shown in FIG. 22C. The Answers Base Class 140a contains a session ID (PK), an Object ID, a Machine ID, and a time and date stamp. As discussed below in reference to FIGS. 58A–58V, the Question Blocks are each linked to particular regions in the Answers Base Class, and are driven by the invalidity or absence of data in the Answers Base Class region. The initial Informational Question Block also creates an initial instance of the Solution Framework Base Class 400, initially consisting of a list of pointers to other empty or invalid memory regions. The initial Information Question Block, however, places pointers to other Informational Question Blocks into a queue within the view, and spawns an independent process that continually searches the queue and calls other question blocks. As long as a pointer to a question block remains in the queue, the independent process calls the corresponding question block. Alternately, the independent process searches the Answers Base Class 140 tables for invalid or empty data locations, identifies the question block linked to the memory region containing the invalid or empty data locations, and calls the corresponding question block. Each Question Block obtains information from the user, and places the information in the Answers Base Class 140 tables.

The initial Login procedure, or one of the Informational Question Blocks, creates a Solution Framework within the view. The Solution Framework as created merely contains a list of pointers to various regions in memory. However, as various informational question blocks obtain more information about the desired result, the Solution Framework begins to take shape. Extensions are created, and information is inserted into the extensions. Each extension is a subclass of the Solution Framework Base Class. Thus, the informational question blocks may be said to create a first instance of the Solution Framework Base Class.

Either the initial Login procedure or the informational questions identify a Client Base Class 120 in the database, if a Client Base Class 120 exists, corresponding to the client and the machine ID provided by the user. The Client Base Class 120 is analyzed for elements that are to be included in the solution, and information is placed either in the Answers Base Class 140 or directly into the Solutions Framework 400 extensions.

Figure 44:
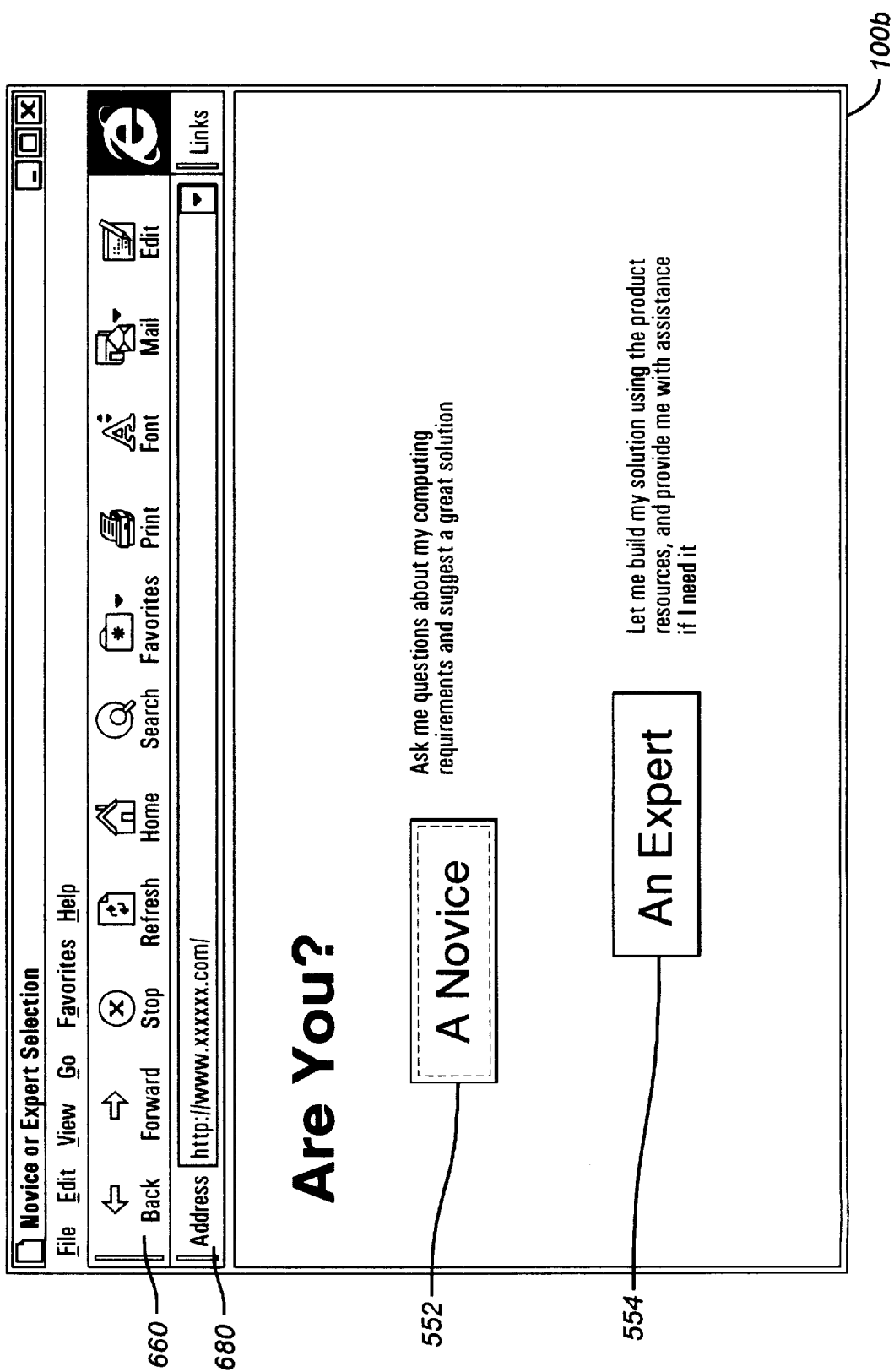
FIG. 44 shows a visual graphic display of a question block entry, inquiring as to the mode of operation of the tool.

Referring now to FIG. 44, a user interface screen 100b showing an example of a question presentation from a question block is shown. The information necessary to generate the screen display of FIG. 44 is stored in the corresponding question block. The particular question has two radio buttons, to allow a user to indicate an appropriate level of technical expertise in using the tool. One radio button 552 allows a novice to indicate a level of knowledge and expertise, while the other radio button 554 allows an expert to indicate a level of knowledge and expertise. A row of control buttons 660 and an Internet or web page URL or other address indicator 680 are placed at the top of the screen, to allow the user to control the entry of information more easily and to control how the information is presented. A row of radio buttons 682 allows the user to control the entry of information by allowing the user to branch to other question blocks within the question procedures.

Figure 45:
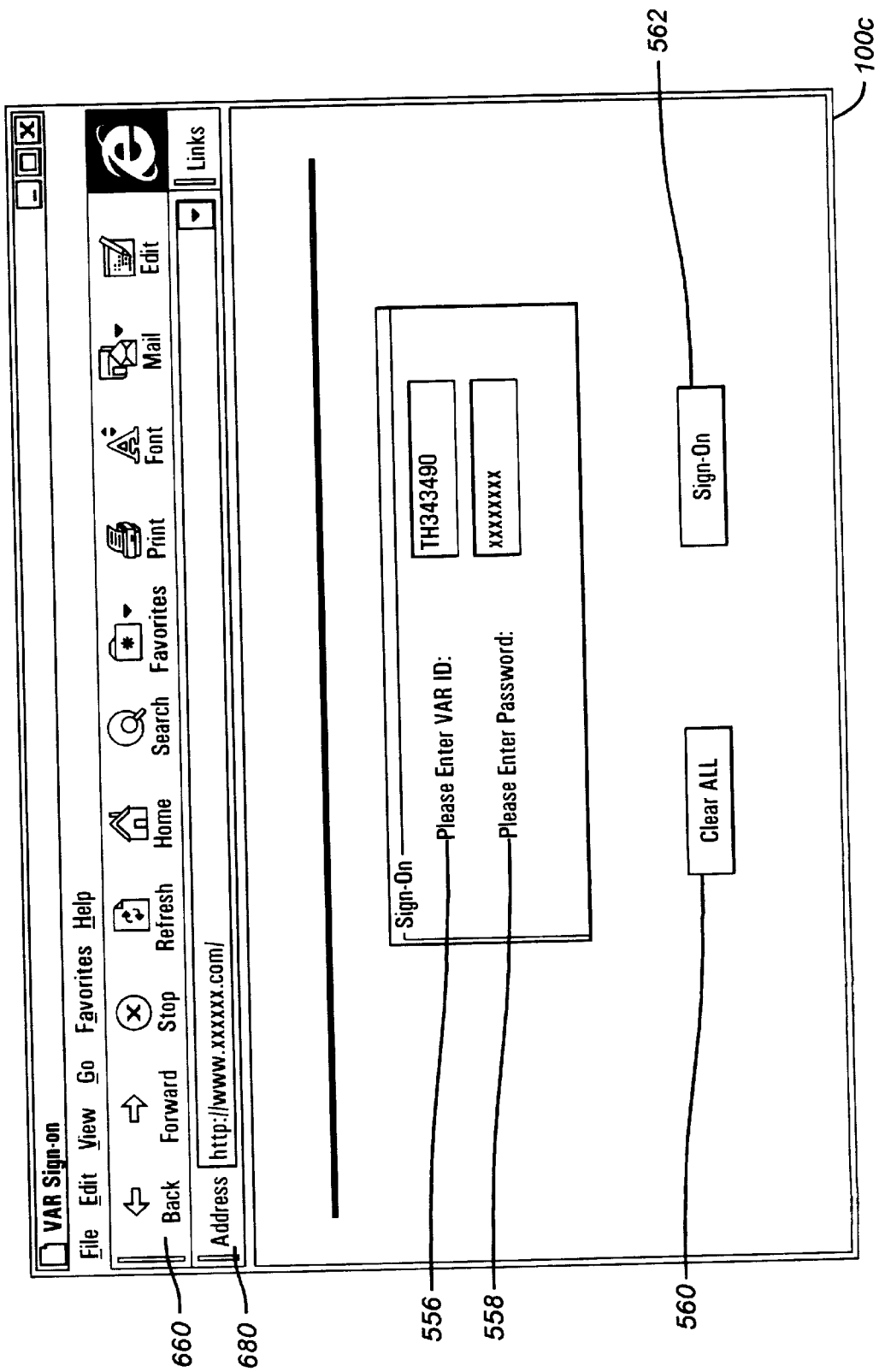
FIG. 45 shows a visual graphic display of a question block entry, inquiring as to the user's identity and seeking a password.

Referring now to FIG. 45, another user interface screen 100c showing another example of a question presentation from a question block is shown. The particular question shown in FIG. 45 has two interactive entry windows 556 and 558, to allow a user to indicate the user's ID and password. The embodiment of the tool associated with the question procedure of FIG. 45 is a more secure system, in that access is restricted. The particular question also has two radio buttons, to allow a user to clear all of the windows and erase information entered into the windows 556 and 558 and to sign-on to the system. A row of control buttons 660 and an Internet or web page URL or other address indicator 680 are placed at the top of the screen, to allow the user to control the entry of information more easily and to control how the information is presented. A row of radio buttons 682 allows the user to control the entry of information by allowing the user to branch to other question blocks within the question procedures.

Figure 46:
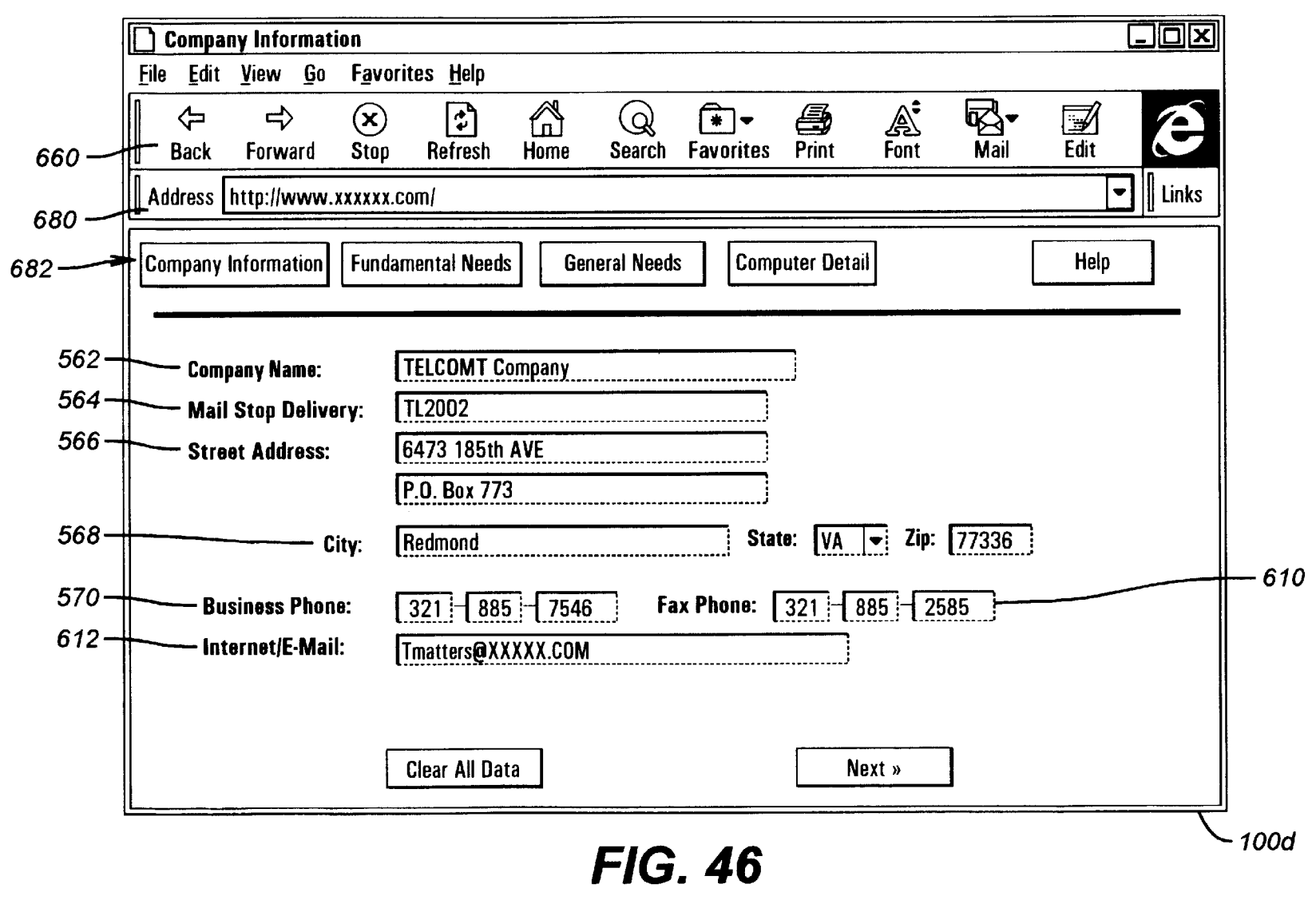

Referring now to FIG. 46, another user interface screen 100d showing additional information being requested from the user. The company name 562, mail stop delivery 564, street address 566, city 568, business phone 570, fax phone 610, and Internet address 612 are all recorded. The information thus collected is stored in both the Answers Base Class 140 (FIG. 22B) and the Client Base Class 120, and is used to build the client Base Classes. Various facilities of the same company, or different departments within the same company, may have different needs, and the tool allows the particular needs to be addressed in different client Base Classes. Also, if a user indicates an interest in connecting together multiple facilities or departments of the same company, the information is already stored and the tool can be used to analyze the various files and Base Classes to produce a unified solution and a corresponding set of installation/implementation instructions. A row of control buttons 660 and an Internet or web page URL or other address indicator 680 are placed at the top of the screen, to allow the user to control the entry of information more easily and to control how the information is presented. A row of radio buttons 682 allows the user to control the entry of information by allowing the user to branch to other question blocks within the question procedures.

Figure 47:
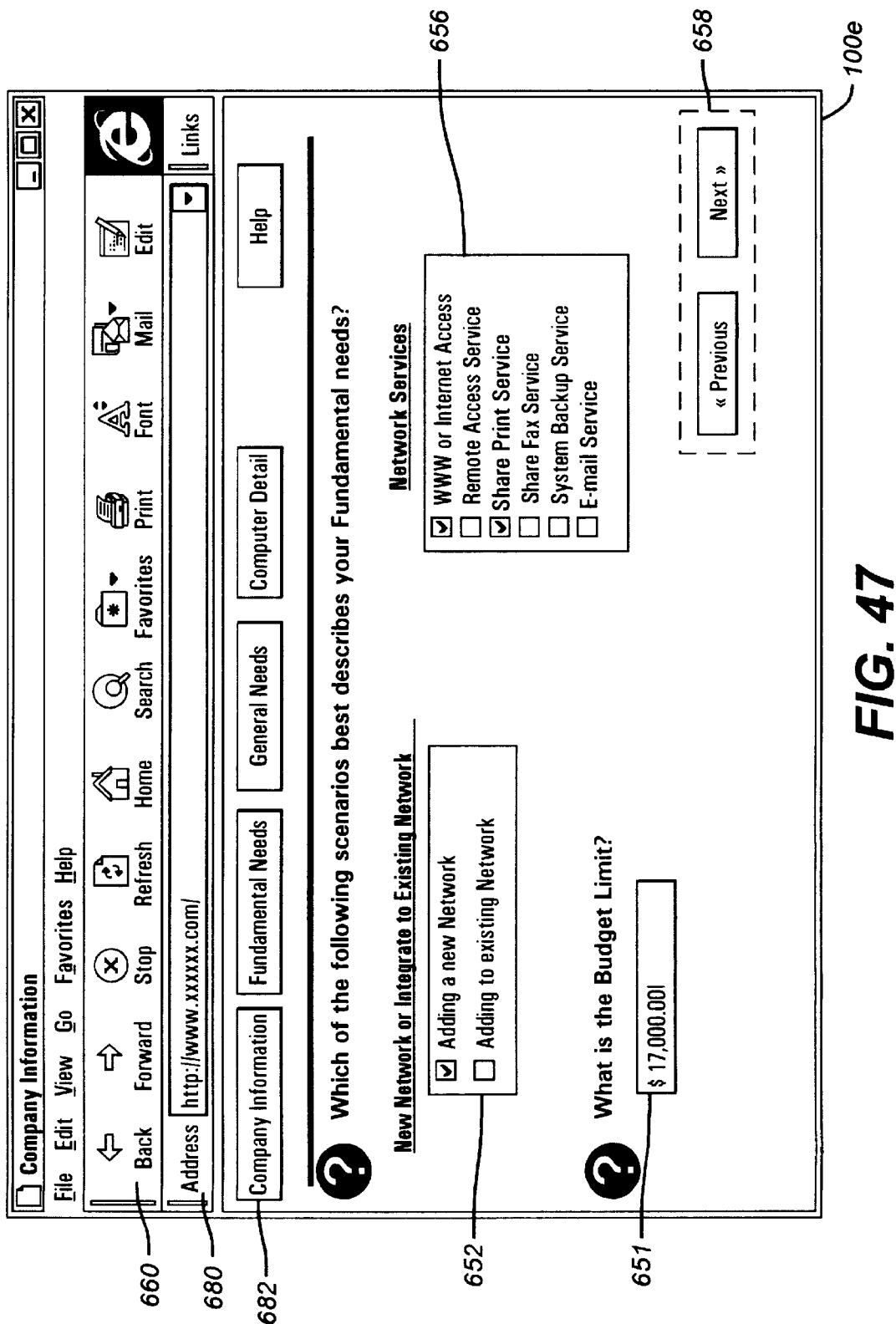
FIG. 47 shows a visual graphic display of a question block entry, inquiring as to the user's purpose for using the tool.

Referring now to FIG. 47, another user interface screen 100e showing additional information is obtained through another question in another question block. The Question Blocks include procedures for presenting check boxes, as well as radio buttons, text entry boxes, and other user interfaces. The first question 652 shown in FIG. 47 seeks information regarding the user's purpose; i.e. whether the user intends to add a new network or to add to an existing network. The tool uses the information thus obtained to determine whether to access client information already in the system or whether to allocate memory for the additional client/machine Client Base Class 120. The second question 654 shown in FIG. 47 seeks information regarding the user's budget constraints. The tool uses the information thus obtained to determine overall guidelines, and balances costs of different products against the costs of the products. A pair of buttons 656 allows the user to step through the different questions in the question block, forward and backward. A row of control buttons 660 and an Internet or web page URL or other address indicator 680 are placed at the top of the screen, to allow the user to control the entry of information more easily and to control how the information is presented. A row of radio buttons 682 allows the user to control the entry of information by allowing the user to branch to other question blocks within the question procedures.

Figure 48:
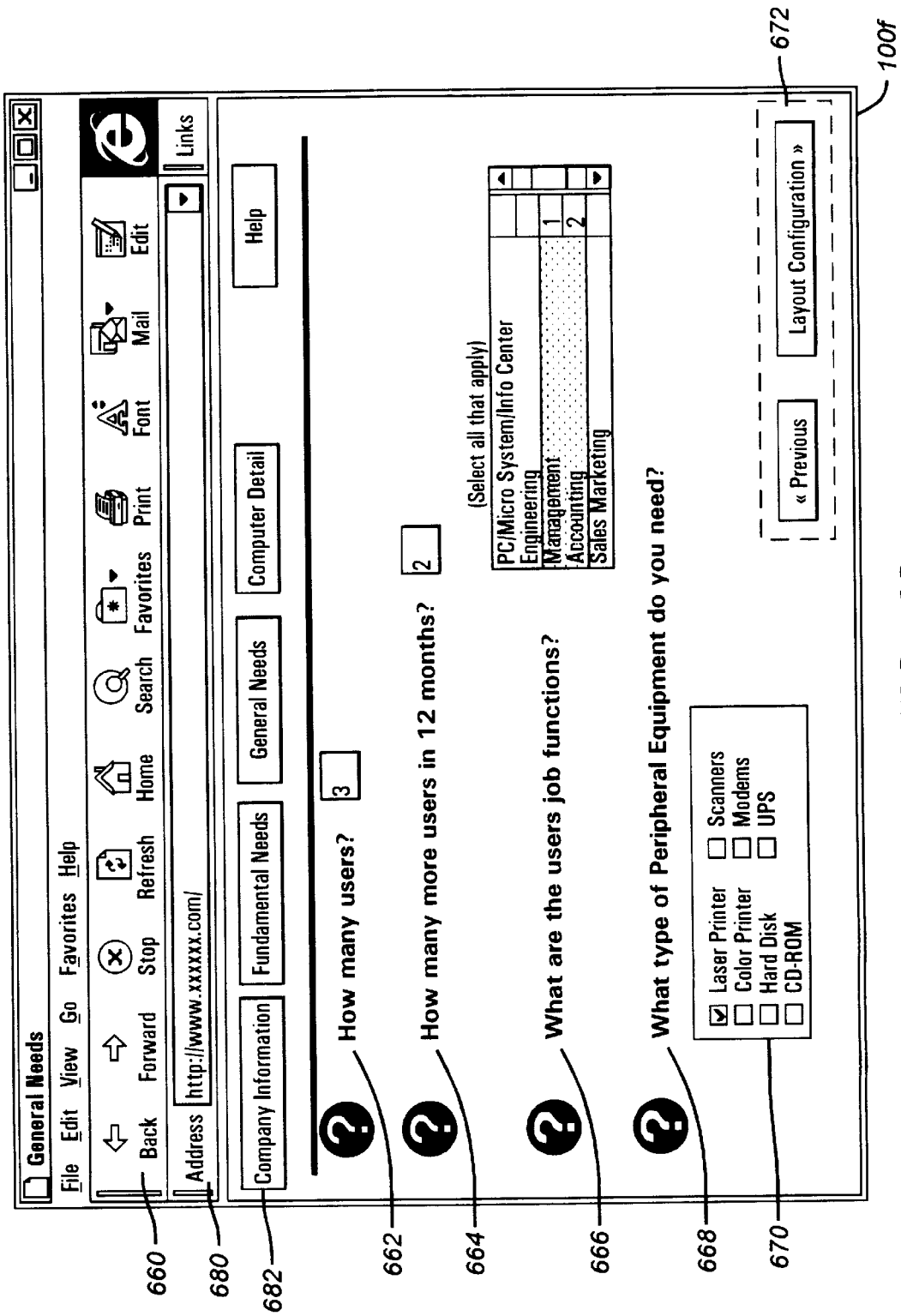
FIG. 48 shows a visual graphic display of a question block entry, inquiring as to the user's enterprise or network requirements.

Referring now to FIG. 48, another user interface screen 100f showing additional information is obtained through another question in another question block. The first question 662 shown in FIG. 48 allows the user to indicate the number of users of the system. The number of users is used to determine both the complexity of the recommended solution and installation/implementation instructions, and also number of subclasses to the solutions framework base class 400 Desktop 406 Subclass within the tool itself. The second question 664 shown in FIG. 48 seeks information regarding the rate of growth of the recommended solution. In the example, the user has indicated two additional users will be added within the next 12 months. The growth rate determines the number of additional expansion connections that must be allowed for. The third question 666 shown in FIG. 48 seeks information regarding the job functions of the various users. The information thus obtained is useful in allocating workgroups and local networks within the overall networks, and, if servers are needed, to allocate the various servers to accommodate security concerns. The fourth question 668 shown in FIG. 48 seeks information regarding the peripheral equipment needed by the system user. The peripheral equipment is entered as a series of check boxes 670, and each check box enables an additional question block relating to the products within the category of peripheral equipment. Some peripheral equipment may be shared, while other peripheral equipment may be segmented for security or high-traffic demands. Again, a pair of buttons 672 allows the user to step through the different questions in the question block, forward and backward. A row of control buttons 660 and an Internet or web page URL or other address indicator 680 are placed at the top of the screen, to allow the user to control the entry of information more easily and to control how the information is presented. A row of radio buttons 682 allows the user to control the entry of information by allowing the user to branch to other question blocks within the question procedures.

Figure 49:
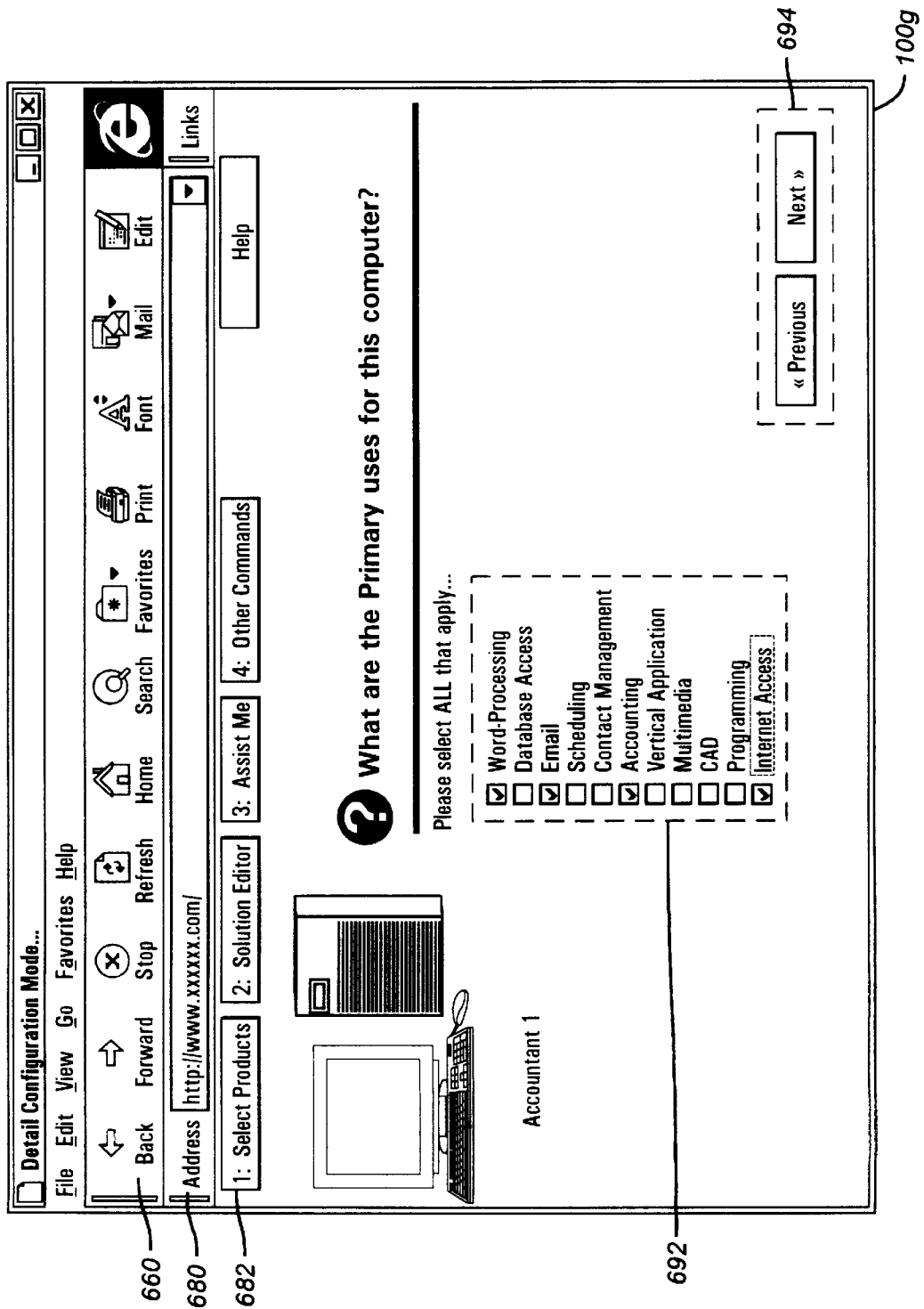
FIG. 49 shows a visual graphic display of a question block entry, inquiring as to the user's networking and other software and hardware requirements.

Referring now to FIG. 49, a desktop user information question block 100g is shown. Various information is collected through the use of check boxes. Each check box in the group of check boxes 692 indicates a group of applications that can be used to indicate a particular set of question blocks corresponding to a particular subclass within the Applications Base Class. Again, a pair of buttons 694 allows the user to step through the different questions in the question block, forward and backward. A row of control buttons 660 and an Internet or web page URL or other address indicator 680 are placed at the top of the screen, to allow the user to control the entry of information more easily and to control how the information is presented. A row of radio buttons 682 allows the user to control the entry of information by allowing the user to branch to other question blocks within the question procedures.

The informational questions are followed by guidelines questions used during Phase I to create a User Guidelines Base Class 160, and a Requirements Base Class 180. The User Guidelines Base Class 160 contains information derived the Answers Base Class 140 (FIG. 22B), to which it is linked. The User Guidelines Base Class 160 contains overall system or network requirements applicable to the entire solution; overall considerations such as cost, performance, expandability, fault tolerance and security are represented. It may be that some solutions do not have such requirements; requirements and other constraints may be the only limitations on the solution recommended produced by the tool. When desired by the user, guidelines can provide a useful limitation of the scope of possible solutions the tool might otherwise recommend.

Requirements are typically specific to one portion of the solution. For example, a desktop may be required to have at least a given processor speed, a local area network may be required to have at least a minimum data rate or fault tolerance, and a server may be required to run a particular operating system. Such requirements are determined by analysis of responses in the Answers Base Class 140 provided by the user in response to questions posed by the question blocks.

It is important to note the relationship between the question blocks of the Questions Block Base Class 100, the language facility of processes within the Questions Block Base Class 100 and the Answers Base Class 140. All of these base classes, and related processes, are structured to allow a user to provide information in a format with which the user is comfortable, but which is useful in performing subsequent analysis.

It is also important to note the relationship between the Answers Base Class 140, the Users Guidelines Base Class 160 and the Requirements Base Class 180. All of these base classes, and related processes, are structured to allow the processes associated with the User Guidelines Base Class 160 and with the Requirements Base Class 180 to read information from the Answers Base Class 140 (FIG. 22B) and analyze the information.

A User Guidelines Base Class 160 (FIG. 6) and a Requirements Base Class 180 (FIGS. 12–16) each are linked to the Solution Framework Base Class 400 and to the Answers Base Class 140. The User Guidelines Base Class 160 and the Requirements Base Class 180 determine whether guidelines and requirements have been provided in the responses from the user, and if so store (during Phase I) an analysis of the responses in the Solutions Framework Base Class 400. As the Solutions Framework Base Class 400 begins to gather information, processes corresponding to these two other base classes read, process, and replace the information with more useful information. For example, the Requirements Base Class 180 may identify that a particular desktop needs a highly-secure memory device. The User-Guidelines processes may identify that the operating system on the desktop is preferably the same as the operating system on a particular server. These processes, corresponding to the User Guidelines Base Class 160 and a Requirements Base Class 180, are referred to as Phase I.

As shown in FIG. 6, the User Guidelines Base Class 160 contains attributes that may be represented as a guidelines column 602, a scale or ranking column 604, and a description column 606. In response to the user's responses obtained by the Question Block Base Class 100 and stored in the Answers Base Class 140, the tool develops the User Guidelines in the guidelines column 602. The guidelines are converted to a ranking within the range of the scale indicated in the scale or ranking column 604. For example, the lowest cost may be converted to 0 of 100, whereas a median cost would be converted to 50 of 100. A description column 606 allows maintenance processes to identify the meaning of an entry.

The informational questions, user guidelines, and requirements are used during Phase I to develop a skeletal Solutions Framework Base Class 400. The Solutions Framework Base Class 400 initially contains merely a number of regions of memory, containing only pointers to other regions of memory and some header information. As farther processes perform subsequent analysis, the solution represented in the Solutions Framework Base Class 400 is refined, and subsequent instances of the base class and its extensions and subclasses replace the skeletal instance.

The processes of Phase I insert into the Solutions Framework Base Class 400 certain general information regard the overall solution, and also regarding particular products within the solution. Some of the general information is then translated into rankings. The rankings are based on the preferences defined by the user in response to the question block processes, and are also based on the number of items found on the market. For example, if there are three speeds of microprocessor, the median speed is referred to as ranking-two. Information that is not translated into rankings is translated into weights. Weights refer to the relative importance of various considerations. For example, if a user demands high speed processors, full color high resolution graphic monitor, and many other features that can raise the price of the overall solution, but also specifies a low budget, then the weights can become important. If the user places great weight on the budget constraint, a somewhat lesser weight to the microprocessor speed, and a still lesser weight to the color monitor, for example, then a lower-ranked monitor will be specified. Requirements Translation 210, however, can operate purely from the information already found in the Solutions Framework Base Class 400 extensions, though, since the processes corresponding to the User-Guidelines Base Class 160 and the Requirements Base Class 180 put the necessary information there, and the informational blocks reserved enough space in the view.

Once the rankings and weights are established for a given product, the product is calibrated. Calibration operates on the subclasses (extensions) of the Solutions Framework Base Class 400, and replaces the information already present with a list of products that meet or exceed the requirements. It may be noticed that the calibration requires some information about the market. Calibration requires determination of a list of products that meet or exceed a requirement.

To determine a list of products, a Calibration Base Class 280 operates in conjunction with a set of processes that search the Products Base Class 240 and identify many or all of the products that satisfy the requirements, guidelines, and other constraints as input by the user in response to the question blocks. The Calibration Base Class 280 begins a session as a Calibration Base Class 280a, shown in FIG. 22C. The Calibration Base Class 280 contains a Class ID, a Geo, and a Product Family Identifier. The "Geo" is an identifier of a language and a geographical region. the Geo is used to determine the geographical region for which a solution (or a product in a solution) is to be determined. Many modems, for example, must be compatible with a local telephone network, for access over a Wide Area Network (WAN). Many devices are only available in certain areas of the world, for a number of reasons. Many products, and in particular software products, are available in a number of languages (English, French, Japanese, etc.). The geo provides an identifier that can be used to ensure a satisfactory solution is derived.

The various phases of the tool converge on a specific solution from among the possible solutions. Once a particular solution is recommended, the user may choose to activate an incremental editor. The incremental editor is a set of processes that can be used to choose a different solution from among the possible solutions, and can also be used to change a response to a particular question. Thus, a user is free to develop new combinations of products, examine new network topologies, and expand and personalize the utility of the tool to develop new solutions to new products. The incremental editor includes processes that provide a user-friendly graphical user interface (GUI). Once a user has provided information to the tool using the incremental editor, however, the tool may access the Answers Base Class 140 (FIG. 22B), the User Guidelines Base Class 160, the Calibration Base Class 280, and the Products Base Class 240 to derive a solution that complies to the greatest extent possible with previously-provided information where not in conflict with more recently provided information..

Solutions Framework Base Class 400 itself has processes that search its extensions for lists of products, and provides a selection. The "Search and Match" processes manage to select one product for each of its extensions from the lists within the extensions, often by applying additional considerations. The processes corresponding to the Requirements Translation, calibration, and searching and matching of products are collectively referred to as Phase II.

At this point, an incremental editor can be used. The incremental editor presents the Solution Framework Base Class 400 extensions to the user and allows the user to increase or decrease each selection to the next consecutive ranking. For example, if there are three speeds of microprocessor on the market, and the user initially indicated responses that lead the Phase I processes to select the median, then the incremental editor allows the user to select one of the other microprocessor speeds. The incremental editor processes indicate to the user that the ranking selected is two-of-three, and the user can increase the speed to ranking one-of-three or three-of-three. The calibration and search-and-match processes then proceed automatically. Phase II does not conclude until the user has indicated satisfaction with the selected products.

Figure 50:
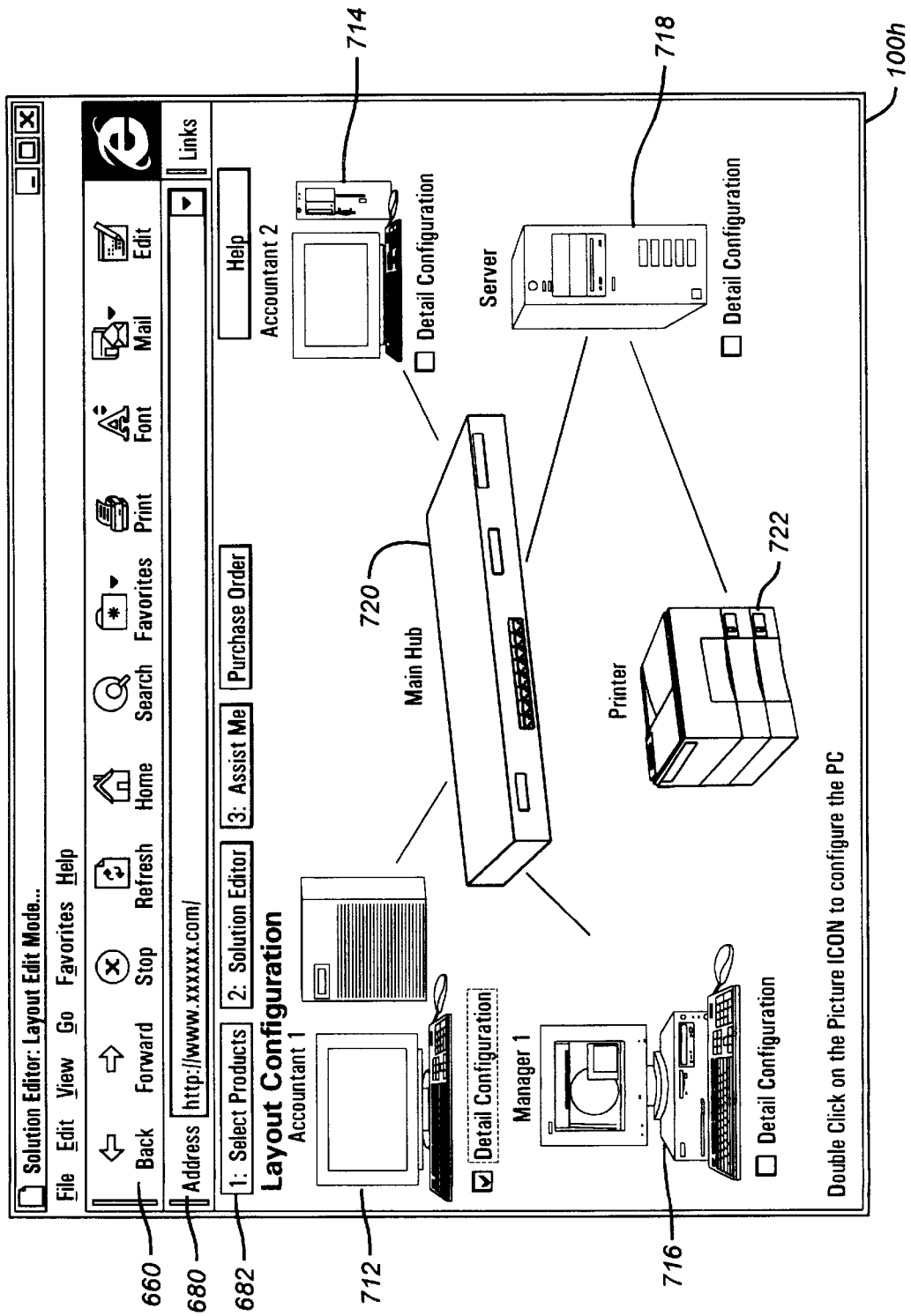
FIG. 50 shows a visual graphic display of a recommended solution.

Referring now to FIG. 50, a graphical display of a layout configuration 100h is shown. The layout configuration illustrates a number of products, and the manner in which the products are coupled. A first accountant 712, a second accountant 714, a first manager 716, and a server 718 are each coupled to a main hub 720. The server 718 also connects to a printer 722. The layout configuration can be used to access further question blocks, and allows each of the desktop accountants 712 and 714, the desktop manager 716, the server 718, the main hub 720, and the printer 722 to be configured merely by double-clicking on an icon representing the product to be configured. A row of control buttons 660 and an Internet or web page URL or other address indicator 680 are placed at the top of the screen, to allow the user to control the entry of information more easily and to control how the information is presented. A row of radio buttons 682 allows the user to control the entry of information by allowing the user to branch to other question blocks within the question procedures.

Figure 51:
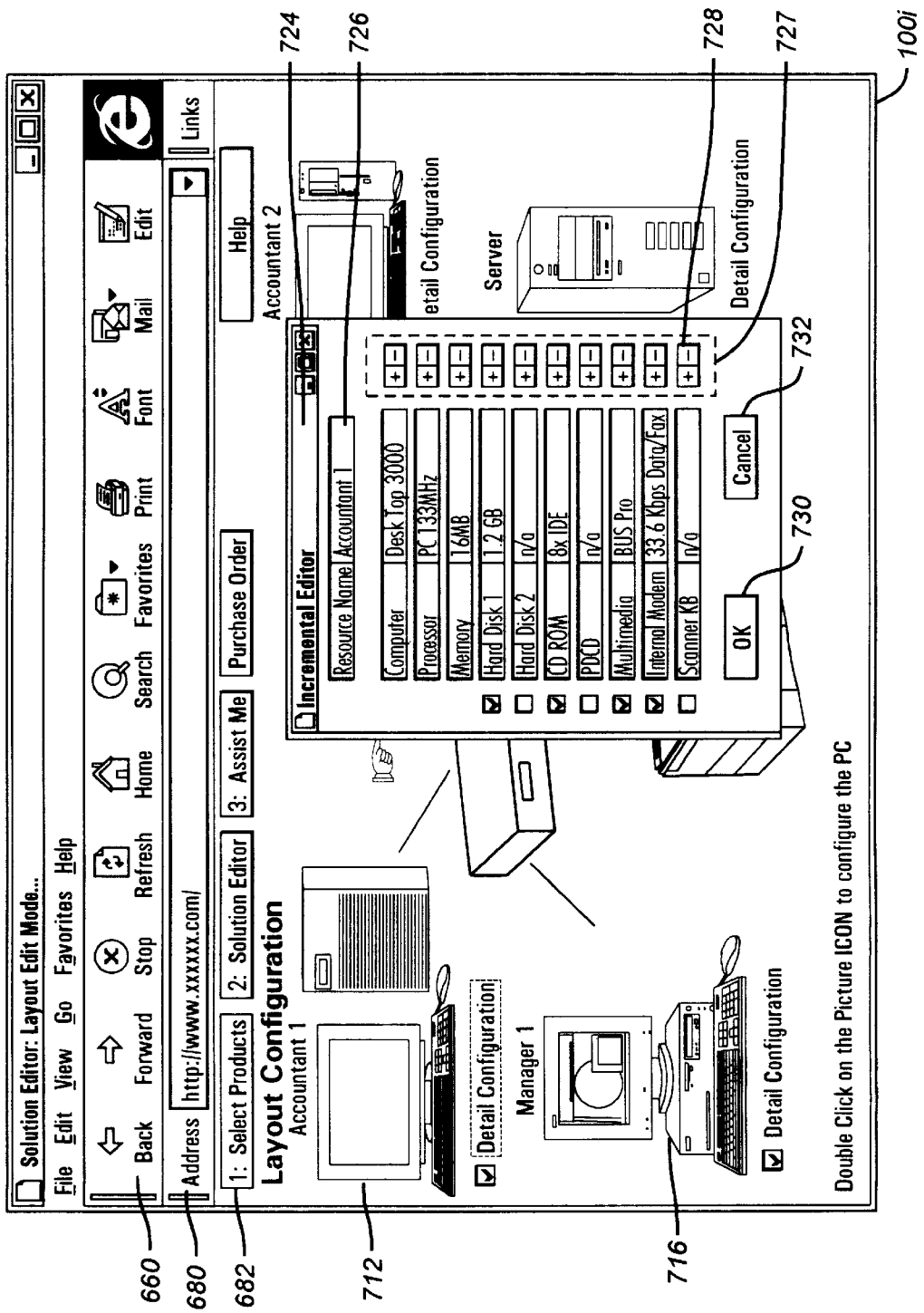
FIG. 51 shows a visual graphic display of the recommended solution of FIG. 50, showing further a graphical user interface window of the incremental editor.

Referring now to FIG. 51, a screen 100i showing an example use of the layout configuration incremental editor is shown. The screen shown in FIG. 51 is produced by double-clicking or otherwise indicating the first manager 716 or other product shown in FIG. 50. The first accountant 712, the second accountant 714, the first manager 716, and the server 718 are each coupled to a main hub 720, and the printer 722 connects to the server 718, as in FIG. 50, and can be seen behind an incremental editor window 724. The resource name 726 is indicated at the top of the incremental editor window 724. Each category 852 of product includes rankable fields or attributes 854. Various fields or attributes,, as listed in FIG. 9, are shown in the incremental editor window 724. For example, the computer monitor, processor (or CPU), memory, hard drive, and other components are provided in the incremental editor window 724. To the right of each component listed, two buttons 726 and 728 are shown. Buttons 726 include a "+", while buttons 728 include a "−". The user may click on any of the buttons 726 and 728. Clicking on a "+" next to the hard disk 1 line will increase the hard disk size to the next rank. As stated previously, there may be several equivalent hard disks on the market, at each size. The incremental editor is not generally used to switch from one component to an equivalent component. Rather, the incremental editor window 724 may be used to verify how changes to one component affect changes to other components in a product. For example, increasing the processor speed by clicking on the "+" button 726 next to the processor line may increase the speed of the processor from 133 MHz to 166 MHz. However, the only processors having the higher speed may have more than 16 MB of memory. If so, that fact will be evident by reference to the incremental editor window 724. The changes can be made, and the resulting system can be studied before actually purchasing the various products. An "OK" button 730 and "Cancel" button 732 indicate that the changes are to be accepted or rejected, respectively.

It may be that, during Phase II, additional question blocks need be indicated. For example, more information may be needed to implement a device selected through the incremental editor, or a user may decide that, upon seeing the overall solution recommendation, a local input/output device should be substituted for a network controller. These additional question blocks are discussed below, with reference to the fifth set of processes corresponding to the Solutions Framework Base Class 400.

Once each extension of the Solutions Framework Base Class 400 contains one product, internetworking can be considered. The internetworking analyzes the products and also analyzes the various tables of the Answers Base Class 140 (FIG. 22B) for internetworking information, and prepares an internetworking solution. For example, the internetwokring analysis may determine that particular desktops needing high-speed frequent information exchange should be grouped in sub-workgroup within a hierarchal configuration, or that certain network adapters are needed at certain workgroups, or that particular servers should be allocated to certain workgroups for security reasons. These internetworking analyses are collectively referred to as Phase III processes. The incremental editor is again used, to allow variations from the initially-recommended solution.

The solution, once derived, is analyzed for consistency and integrity by a set of processes corresponding to the Solutions Framework Base Class 400 itself. These processes are referred to as Phase IV.

In a set of processes related to database maintenance, further analysis determines changes that should be made to help Phases I, II, and III converge more rapidly. The processes corresponding to database-maintenance include processes that alter the weights used in the secondary considerations, i.e., the weights used when the search-and-match processes cannot resolve which product to include in the solution. Some processes monitor the user's use of the incremental editor, while other processes compare the solution the user determines is satisfactory with the solution initially recommended. Still other processes allow maintenance personnel to artificially change the weights, to identify products in the Products Base Class 240 and Collections Base Class 300 that are new or that have been earmarked for recommendation in the initial solution.

Finally, a set of processes analyze the final solution and determine what elements should be reinserted in the Client Base Class 120.

Figure 3:
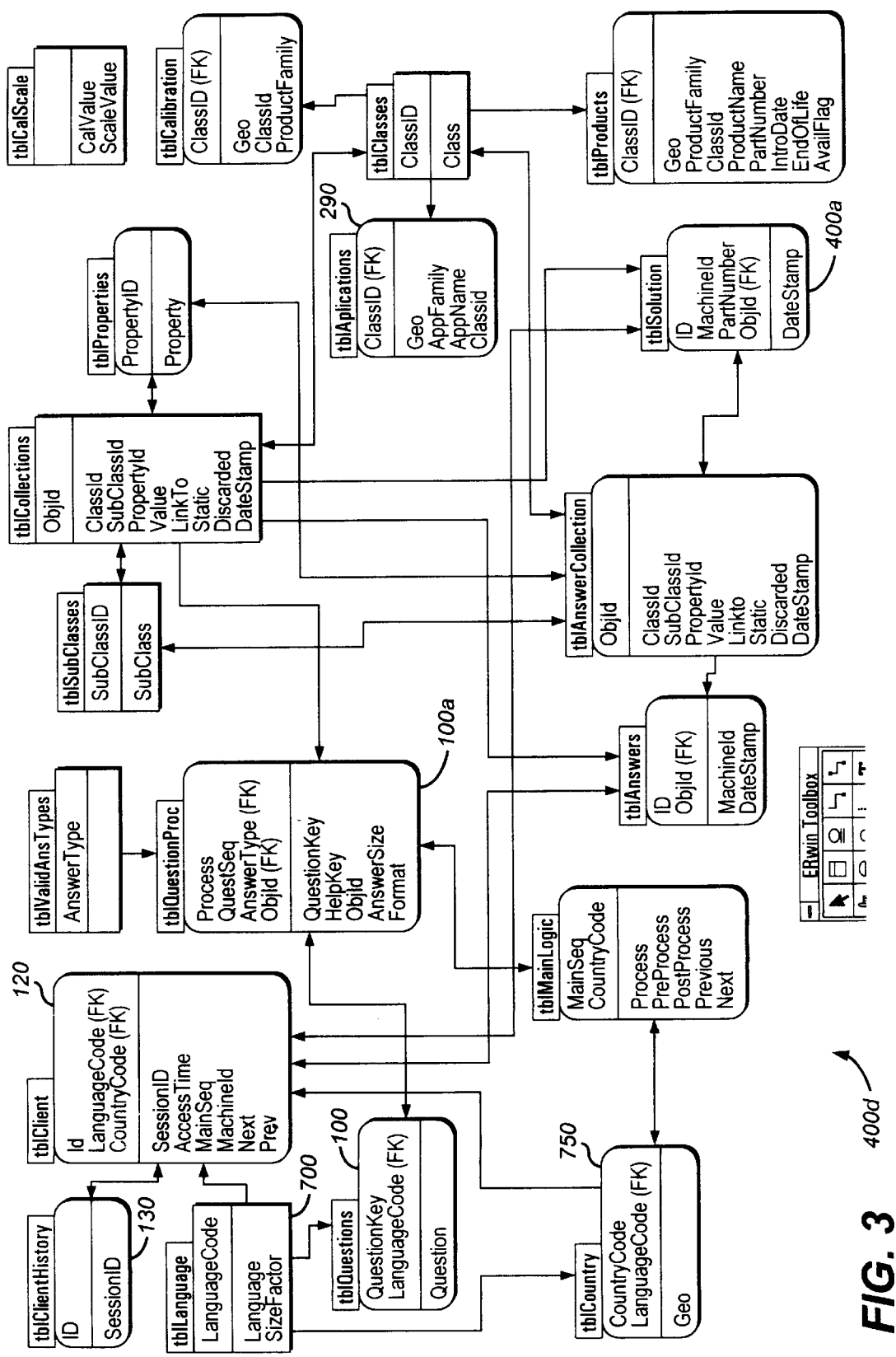
FIG. 3 shows the relationship between the various base classes in the tool.

Referring now to FIG. 3, an overview 400d of the various base classes used in the disclosed embodiment of the present invention is shown. A Client History Base Class 130 stores the user ID, including the machine ID for each solution as currently implemented, and session ID, to enable the solution the user selects to update the Client History Base Class 130. The ID and session ID may be regarded as parameters or fields of a Base Class or data object. The Session ID maps into the Client Base Class 120. The Client Base Class 120 has a number of parameters or fields that allow the tool, upon initiation of a user session, to select an appropriate language with which to pose questions to the user, and a geographical basis for product selection. It will be recognized that different products are available in different countries, and some products, such as keyboards and printers, must be capable of exchanging data with a user in a language the user understands. Also, different countries have different electrical power standards, requiring electronic products to comply. Also, different countries have different telecommunications standards, with which WAN-related products must comply.

A Language Base Class 700 and a Country Base Class 750 link the Client Base Class 120 to a Question Block Base Class 100, described in detail below. The Language Base Class 700 (FIG. 23B) and the Country Base Class 750 (FIG. 23A) allow the Question Block Base Class 100 to access and convert basic QuestionProc 100a (FIG. 22H) procedures into a language suitable for a particular user session. The QuestionProcs each contain a list of questions corresponding to a particular question block of the Question Block Base Class 100, an appropriate size and format for storing the user's answers to the questions. Answers are stored in an Answers Base Class 140 (FIG. 22B), in a format accessible by other base classes. The Answers Base Class 140 also updates the Client Base Class 120.

Several other objects are shown in the overview 400d of FIG. 3, identifying various products and categories of products available. These include the Applications Subclass 290, storing information on software that is available. The Applications Subclass 290 begins as an Applications Subclass 290a, represented as a table shown in FIG. 22E. The Applications Subclass 290a contains the class ID, indicating the type of application and the environment in which the application can be run, and a geo, indicating the geographical region and language in which the application may be run. The Applications Subclass also contains an Application Family identifier and an Application Name. A Calibration Base Class 280 is used to convert user responses to the question procedures into values and rankings that can be used to develop a recommended solution.

Also shown in FIG. 3 is a Solutions Object 400a. The Solutions Object 400a is an object that, upon initiation of an interactive session, actually creates the Solutions Framework Base Class 400 for each session view. The Solutions Object 400a also creates a pointer to the Solutions Framework Base Class 400 for a user session. This is particularly helpful if, for example, a user wishes to link two machines together. Each Solutions Object 400a contains a pointer that allows a subsequent session to access information obtained from the user, or derived by the tool itself, during the current session. The Solutions Object 400a has an ID, a Machine ID, a part number, and an Object ID with an offset vector that, when nonzero, points to a memory location of additional related information. As will be shown, the Solutions Object may be regarded as the lowest level in the Solutions Framework Base Class 400 data structure, which is used to develop the recommended solution. And various stages of processing, the tool contains different information in the solutions object. However, the information eventually converges on a particular product, part of the recommended solution.

Each of these Base Classes is now described in detail.

B. THE OBJECT BASE CLASSES

Referring now to the figures generally, and in particular to FIG. 3, the exemplary embodiment of the present invention is structured as a set of data driven, extensible object classes, each containing a data structure and a set of processes related to the data structure. Several of the objects classes are maintained by a manufacturer or group of manufacturers. Other object classes are created for each session, and can be present in several copies as multiple users access the exemplary embodiment of the present invention. Still other object classes are temporary, and are deleted at the conclusion of the session. Still other object classes are used only to maintain the maintained object classes. Each of these object classes is now discussed in detail in terms of its characteristics, subclasses, and processes.

1. Maintained Object Classes

In the exemplary embodiment of the present invention, three object classes are maintained by a manufacturer or group of manufacturers. These maintained object classes are the Products Base Class 240 (FIGS. 47–50), the Question Block Base Class 100 (FIGS. 58A–58V), and the Calibration Base Class 280 (FIGS. 17A–17D). Each of these object classes includes a Base Class (or a number of tables), and a number of corresponding processes operating on various Base Classes in memory. The processes collect and process information and insert data into the maintained object Base Classes.

a. The Object Base Class

The tool in many embodiments simplifies maintenance and operation by placing a list of all of the objects associated with a subclass or extension of the Products Base Class 240 in a single, centralized base class of its own, referred to as an Object Base Class 600. In some such embodiments, various subclasses and extensions of the Products Base Class 240 map directly into the Objects Base Class 600. In some embodiments, the tool creates the Object Base Class 600 based upon information derived from the Products Base Class 240. In some embodiments, the Object Base Class 600 is separately maintained, and facilitates the use of the Products Base Class 240 and the incremental editor.

A representation of the Object Base Class 600 is shown in FIGS. 18A–18C, in which various characteristics of the Object Base Class 600 are shown as columns in a table. The Object Base Class 600 provides a categorization of all of the types of products that are available on the market, everywhere in the world. Each type of product is listed as a separate class of the Object Base Class 600, and includes a list of attributes in an attribute field 218.

When a new printer, microprocessor, disk drive, or other device of a known type is introduced, the Object Base Class 600 remains unchanged. However, when a new type of device cannot be entered into the existing Object Base Class 600, a new class must be created.

Many of the classes have attributes in common. However, some attributes apply only to certain classes.

b. Products Base Class (1) Definition

Figure 5:
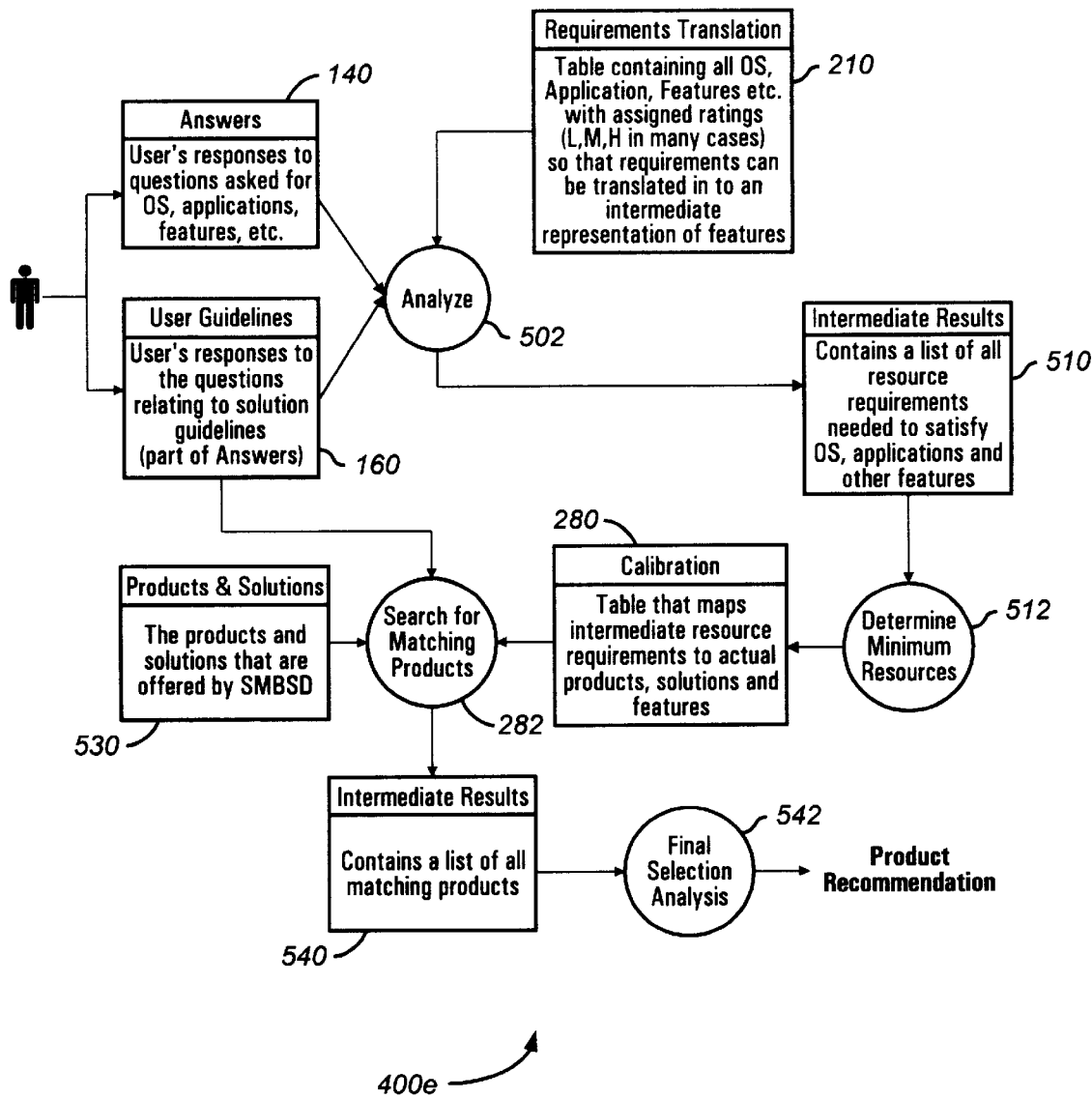
FIG. 5 shows a Phase II product recommendation data flow.

Referring to FIG. 5, a Phase II product recommendation data flow 400e is shown The Products Base Class 240, containing subclasses and extensions having a list of many products available on the market, is read via a products and solutions process 530 by the Calibration Base Class 280, the Requirements Translation Base Class 210, and the Solutions Framework Base Class 400. Therefore, the Products Base Class 240 must allows searching. As will be shown in the discussion of the Question Block Base Class 100 (FIGS. 58A–58V), the tool includes question blocks that have processes for obtaining information from a user and placing information in tables corresponding to the various tables of the Answers Base Class 140 (FIG. 22B). As will also be shown in the discussion of the Solutions Framework Base Class 400, a fourth set of processes corresponding to the Solutions Framework Base Class 400 includes a search and match process 282 that obtains a Property and a Real World Value 214 and searches the Products Base Class 240 for products having the Property and Real World Value 214. Therefore, each product class in the Products Base Class 240 must be such that these processes can extract information regarding the attributes from the product classes.

Subclasses of the Products Base Class 240 include an Applications Subclass 290, which includes a table of software and operating system software having as properties the platform and other attributes the software requires to operate. The Products Base Class 240 (FIGS. 47–50) also includes the Desk Base subclass, a tabulated list of all available computer platforms and the microprocessor, system bus, and system resources included in the desk base.

The Products Base Class 240 includes Attribute (i.e., Property) Fields 218, providing a common structure over substantially all of the Product Base Class subclasses that permit straightforward access. Referring now to FIGS. 18A–18C, the object classes that serve as the subclasses of the Objects Base Class 600, and provide information to organize the Products Base Class 240, are shown. Each category of product, corresponding to a subclass of the Products Base Class 240, is shown in the first field, representing categories 852 of products. In other words, the class field of FIGS. 18A–18C corresponds to the subclass name of the Solutions Framework Base Class 400. Each class in the class field contains several non-common attributes provided in the Attribute (i.e., Property) Field 218. For example, the "server" class contains at least 20 attributes, which are listed in the Attribute (i.e., Property) Field 218. In this example, the "server" class contains a "user" attribute.

The attributes field of the Products Base Class 240 maps to the Requirements Translation Base Class 210, which is linked to the various tables of the Answers Base Class 140 (FIG. 22B), allowing user-provided information in the various tables of the Answers Base Class 140 to map into the rankings. It will be recognized upon further reference to the disclosure that the Property Field 218 of the Requirements Translation Base Class 210, shown in FIGS. 5 and 7, maps directly to the attribute field of the Product Base Class 240. A property is merely a rankable attribute. As will be discussed below in reference to the Requirements Translation Base Class 210, attributes of the Requirements Translation Base Class 210 map directly into the Answers Base Class 140 the Client Base Class 120, and the Calibration Base Class 280. The attributes of the Requirements Translation Base Class 210 also map into the object classes shown in FIGS. 18A–18C and used in Phase I to allow selection of product types in the Solutions Framework 400 extensions.

Attributes provide a link to other processes corresponding to other base classes in the tool, since compatibility may be desired. Similarly, as each desktop, portable, hub, switch, router, LAN, and other subclasses of the Solutions Framework Base Class 400 are created, the view receives an allocation of memory sufficient to obtain the necessary attribute values from the Answers Tables of the Answers Base Class 140.

The Products Base Class 240, linked to the Collections Base Class 300, contains all the relevant information about all of the products available on the market all over the world. Subclasses of the Products Base Class 240 include, as fields, parameters, or attributes, a variety of information about the product, and searches can be performed on the subclasses based on the fields. The Products Base Class 240 is stored by class, subclass, property and value within the Collections Base Class 300, referenced by the Products logical view. The Products Base Class 240 is shown in FIG. 50.

The Products Base Class 240 is used in a number of processes associated with other Base Classes. For example, after calibration, the Real World Values are converted to products or to groups of equivalent products in a search and match process 282 corresponding to a set of processes of the Solutions Framework Base Class 400. Generally, these products are devices able to satisfy a wide variety of end user needs, and able to be included in any of a wide variety of network and systems solution configurations.

(2) Subclasses

Subclasses of the Products Base Class 240 include Products Base Class 240 tables, expandable objects having a number of attributes, some of which are shared in a Base Class and some of which are applicable only to the particular subject in an Extension Base Class. The following is one embodiment of the Products Base Class 240; it will be apparent that other object classes are possible. The list of common attributes of FIGS. 8 and the list of object classes of 18A–18C are used to drive the product selection of Phase II, since they include only the actual values for the searchable attributes.

Referring to FIG. 8, Object Class 600 attributes, including attributes 850 common to all object classes, is shown. The attributes may be represented as three columns illustrating a list of attributes common to all object classes. Each extension and subclass within the Products Base Class 240 has an attribute represented by the first column 802 of FIG. 8. The second column 804 of FIG. 8 provides a list of attributes that each product in the Products Base Class 240 (and its corresponding subclasses and extensions) share. Thus, the attribute represented by the first column 802 of FIG. 8 identifies the object classes having the particular attribute listed in the second column 804, and indicates the format of the information of the second column 804. A third column 806 aids in maintenance of the tool, by providing a list and some additional information about each attribute. Generally, the attributes common to the object classes provide overall rankings of the product generally, rather than by considering individual performance criteria such as microprocessor speed and monitor color pixel resolution.

The Requirements Translation Base Class 210 obtains its structure from the subclasses and extensions of the Objects Base Class 600 as shown in FIGS. 24A–24C. Extensions and subclasses of Requirements Translation Base Class 210 (or tables 210a), having incorporated extensions and subclasses of the Objects Base Class 600, are then provided to the Requirements Translation architecture, shown in FIG. 7. Thus, from the Objects Base Class 600 (maintained by computer specialists), having subclasses and extensions with attributes 850 defining the rankable attributes of products, map directly into the Requirements Translation Base Class 210.

Figure 4:
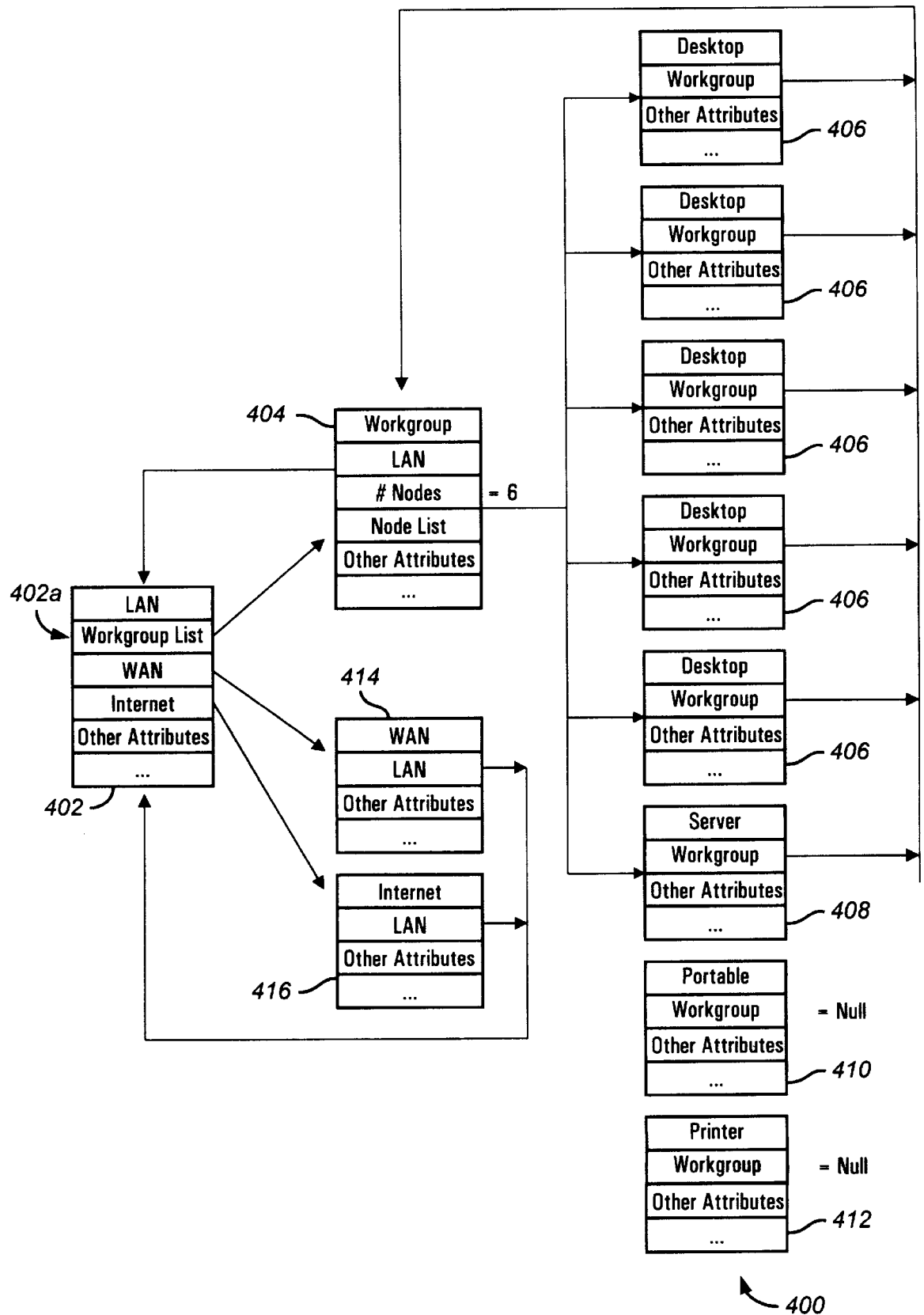
FIG. 4 shows solution framework high level representation.

As shown in FIGS. 4 and 5, however, the information is soon replaced with other information obtained from the Answers Base Class 140 (FIG. 22B), in turn derived from information provided by the user. Requirements translation includes adding rankings to the various attributes 850 listed in the FIGS. 24A–24C. Subclasses and extensions of the Requirements Translation Base Class 210 are identified by product category 852.

Column 802 also provides an indicator of extension parameters possessed by particular products. Such extension parameters are provided in FIGS. 18A–18C. The first column or field, representing categories 852 of products, provides an identification of the class or subclass described. The second column 854 provides a list of attributes associated with each column. The third column, 856, provides notes for ease of maintenance.

The Products Base Class 240 includes a variety of fields for each record. One field includes the name of the product. Another field is the object class to which the product belonged. As shown in FIG. 8, the part number, class name, product family, model, overall ranking, lowest cost ranking, performance ranking, and availability ranking are among other parameters included. Additionally, whenever the Products Base Class 240 is accessed, additional fields having values depending on the product class identification are momentarily added to the Products Base Class 240 from other areas of memory. The Object Base Class of FIGS. 18A–18C show some of the possible parameters. The fields are attributes of the product class. Thus, not only the characteristics described with reference to FIG. 8E included in the Products Base Class 240, but also additional fields (previously described as characteristics, attributes, or additional Base Class fields) are included as well, and can be used to rank or sort the products within the product class.

(3) Links

The Object Base Class 600, whose attributes are shown in FIGS. 18A–18C is used in several different processes corresponding to other Base Classes. The first set of processes corresponding to the Solutions Framework Base Class 400 accesses the Object Base Class 600 when a subclass to the Solutions Framework Base Class 400 is created. Accessing the Object Base Class allows the Solutions Framework Base Class 400 processes to identify what attributes to place in the newly-created Solutions Framework 400 subclass. Also, a region in a subclass or table within the Answers Base Class 140 (FIG. 22B) maps to the Base Class in FIGS. 18A–18C, and drives a question block having detailed product questions 110.

Figure 33:
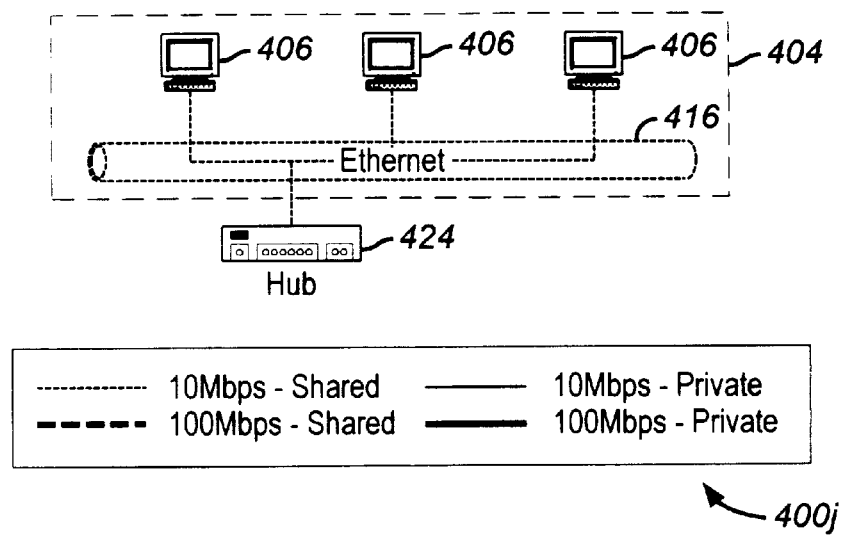
FIG. 33 shows small peer-peer workgroup.

An example may serve to illustrate this point. If in response to the initial question blocks the user indicates that a simple network as shown in FIG. 33 is desired, then the Solutions Framework Base Class 400 will create several subclasses or extensions. Three of the subclasses or extensions will be "desktop" subclasses 406. Each Desktop 406 Subclass will have certain attributes, listed in a region of memory within the view. Each Desktop 406 Subclass has its own region of memory for storing its attribute values. Referring again to FIGS. 18A–18C, each attribute shown in the Attribute (i.e., Property) Field 218 corresponding to the desktop class in the class field of FIGS. 18A–18C is copied into each of the three desktop-allocated regions of memory.

(4) Processes

The processes related to the Products Base Class 240 (FIGS. 47–50) can spawn Product Available subclasses for any appropriate property listed in the Base Classes related to the Products Base Class 240. For example, given a particular country or national computer standard, the Products Base Class 240 can form a Product Available subclass corresponding to the given properties.

c. Calibration Base Class

The Calibration Base Class 280 (FIGS. 17A–17D) is an extensible data structure containing various Base Classes and procedures for replacing the rankings in the Solutions Framework Base Class 400 with lists of actual products satisfying or exceeding the minimum requirements identified by the rankings. The tables and subclasses of the Calibration Base Class 280 are maintained by the manufacturer or third party, but are relatively easy to maintain, since the related maintenance procedures merely sort the Products Available Base Class by whatever the corresponding field happens to be.

Various attributes of a Calibration Base Class 280 are shown in FIGS. 17A–71D. The Calibration Base Class 280 is linked to the first intermediate results instance 512 of the Solutions Framework Base Class 400, containing minimum resources for the solution For example, given a real-world value 214, the processes corresponding to the Calibration Base Class 280 determine a ranking, according to several attributes represented in FIG. 17A–17D. As stated, rankings are found for each product in the Products Base Class 240 and stored, as represented generally in the rankings column 604 of FIG. 6. The ranking of each product, and the name of the subclass of the Products Base Class 240 to which the product belongs, may be concatenated to form an internal representation value 212. The Calibration Base Class 280 has processes, illustrated generally in the second column 762 of FIG. 17A–17D, storing Real World Values 214 corresponding to the internal representation value 212 of the first column 218. Notes are included, and are particularly useful, since the manufacturer or other third party stores and updates these value.

Subclasses of the Calibration Base Class 280 are search and sort results, as various processes corresponding to the Calibration Base Class 280 collect products that share a common attribute into a common sub-table (within the subclass). The Calibration Base Class 280 is linked to the Collections Base Class 300, the Products Base Class 240 (FIGS. 47–50), and the Solutions Framework Base Class 400. The subclasses corresponding to these base classes are discussed more completely in the section dealing specifically with the respective base classes, but some attributes of these base classes are relevant to the operation of the Calibration Base Class 280 as well. The Collections Base Class 300 and the Products Base Class 240 contain subclasses each defining a category of products. In the Products and Collections Base Classes 240 and 300, the properties and values of each product is identified in various fields within tables and subclasses corresponding to the subclasses of the Products and Collections Base Classes 240 and 300. These values are referred to as the Real World Value. For example, in the category (subclass) of microprocessors, for a property of microprocessor speed, the contents of the Real World Value Field 214 may be 133 MHz. In the category (subclass) of printers, for a property of characters per inch, the contents of the Real World Value Field 214 may be 100 characters-per-inch.

The Calibration Base Class 280 is linked to the Solutions Framework Base Class 400. At one stage, during Phase II (also described below), the Solutions Framework Base Class 400 extensions contain ranking information, identifying the product corresponding to the extension by category, rank and property. For example, the extension may contain "microprocessor," rank=2, property="speed." In such a stage, an extension of the Solutions Framework Base Class 400 is referred to as an intermediate results instance 510 of the Solutions Framework Base Class 400. Processes corresponding to the Calibration Base Class 280 recognize the first intermediate results instance 510 of the Solutions Framework Base Class 400, and replace the rank with a particular value obtained from the Products Base Class 240.

Referring now to FIGS. 17A–17D, an initial content of the Calibration Base Class 280 within the Calibration Base Class 280 is shown. The Calibration Base Class 280 may be regarded generally as a table, having rows representing the types of products, and columns representing various characteristics of the products. It should be remembered, however, that in the Calibration Base Class 280, equivalent products share a common record. Only the qualities of the products are included. Each record has three fields: an Internal Representation Field 212, a Real World Value Field 214, and an Further Notes Field 216. The Internal Representation Field 212 has a value for each record indicating the concatenation of the category of product and the ranking of the product with respect to the other products in the category. For example, the internal representation of a high cost desktop would be "DeskCost1," while (if the products in the Products Base Class 240 were of exactly three costs), the lowest cost would be "DeskCost2." Ordinarily, the higher ranking, the more desirable the product. The real world value 214, however, contains the "translation" of the product category and ranking to a more widely-understood and useful number. The real world value may be a type of product, a number of MHz, a bus width, etc. The further notes field 260 facilitates maintenance.

(5) Processes

A first set of processes corresponding to the Calibration Base Class 280 sorts the products listed in a given subclass of the Products Base Class 240 by the value corresponding to a given value. The Products Base Class 240 (FIGS. 47–50) and the Collections Base Class 300 have subclasses for each category of product available. The first set of processes is linked to (and accesses) the Products Base Class 240 and the Collections Base Class 300. The first set of processes provides extensions having the product lists corresponding to each category of products, each extension being further sorted by a particular value.

A second set of processes corresponding to the Calibration Base Class 280 then provides a ranking to each product in each Calibration Base Class 280 subclass. The ranking is a measure of the relative position of the product among other products of the same category, determined by the value. It should be noted that several products may have the same ranking. Many products are "clones", or functional equivalents, of other products, at least with respect to some properties or attributes. Thus, the Calibration Base Class 280 contains the reference values which identify the relative performance across the product spread stored by Class, subclass, Property and value within the Collections Base Class 300. The Calibration Base Class 280 reads values from the Collections Base Class 300, particularly the Value field, and converts the Value (a ranking) into a real world value, based on industry standards. Particular models or manufacturers are not identified; only a list of capabilities.

A third set of processes corresponding to the Calibration Base Class 280, given a product-category (i.e., subclass of the Collections Base Class 300 and the Products Base Class 240 (FIGS. 47–50)), then accesses each Calibration Base Class 280 subclass and provides a "real world" value corresponding to the ranking.

The Calibration Base Class 280 shown in FIG. 5 receives an internal representation consisting of a class and ranking, and converts the internal representation to a real-world value. Although the real-world value may at any particular level of technological development be mapped to a particular product, class and ranking are sufficient to completely designate the product. In other words, if the database contains three processors in the class "processors," then processor 2 always refers to the processor of intermediate speed. Although the level of technological change may alter the meaning of this within the Calibration Base Class 280, only the Calibration Base Class 280 need be updated. Thus, the Calibration Base Class 280 only takes the (1) class and rank, and (2) Products Base Class 240 and produces a real-world value. In each object of the Intermediate Results Base Class 510, a list of speeds, resolutions, etc. are described.

A fourth set of processes in the Calibration Base Class 280 also double-checks compliance with system compatibility considerations. The Calibration Base Class 280 may be expansible, may include pointers to other data objects, and may include bookmarks to or cross-reference partitions in tables, Base Classes, or other object classes existing on other systems across the Internet or other network. For example, some of the information necessary to translate the contents of the Internal Representation Field 212 corresponding to a device into Real World Values 214 (and store the contents in the Real World Value Field 214) may be provided by independent manufacturers, or by different divisions of the manufacturer or third party. This abstraction of the Base Class will be discussed below, in the section pertaining to maintenance of the exemplary embodiment of the present invention database.

The Real World Values 214, once determined, are stored in the Solutions Framework Base Class 400.

In summary, although the analysis of the first instance of intermediate results 510 does not provide a direct reference to technology or products, the analysis does provide general ranking information such as "intermediate," "high speed," or "low performance." When the Intermediate Results object 510 has provided a general ranking representation of each of the products in the solution, a set of Calibration objects are invoked. The calibration objects access a table or subclass of the calibration base class 280 containing a list of the full set of products and solutions 530 available and provide "real world" values for each product class. The table or subclass from the Calibration Base Class 280 is used by the Search and Match process 282.

In the described example, if the Products Base Class 240 contains three speeds of processors, 166 MHz, 133 MHz, and 100 MHz as microprocessor speeds, then the processes corresponding to the Calibration Base Class 280 replace the "Rank=2" with the value "133 MHz." Other processes corresponding to the Calibration Base Class 280 search the Base Class and sort records into subclasses.

For example, a question block pertaining to the user's preferences in printers may have elicited information indicating that the user would prefer a "mid-level" printer. The second set of processes, which determines the ranking, stores the response in the Answers Base Class 140 (FIG. 22B). During Phase I processes corresponding to the User Guidelines Base Class 160 (FIG. 6) and Requirements Base Class 180 (FIGS. 12–16), the response is used to place a "mid-level" indicator in the Value field of the Properties field within the Class pertaining to "printers." Because the values are not yet calibrated, only the ranking and value-rankings ("I need at least 100 characters per second") and the relative importance (e.g., "But price is more important and I can live with a slower speed.") are stored in the Collections Base Class 300, which attempts to determine the entire solution. The solution is determined by using a weighting matrix 582 (FIGS. 55 and 56) to "weight" the various considerations. For example, the Calibration Base Class 280 identifies 166 MHz, 133 MHz, and 100 MHz as microprocessor speeds, and ranks each accordingly. Given a rank of 2, the Calibration Base Class 280 identifies the 133 MHz speed as meeting the ranking requirement. Although described in terms of a Calibration Base Class 280 containing a list of all products identified by product category and by ranking within the product category, it will be recognized that the Calibration Base Class 280 may be configured as a table or subclass of pointers to records in the Products, Collections, and Solutions Framework 400 (Intermediate Results) Base Classes. With respect to run-time operation, it should be noted that due to product congestion in narrow technical areas and due to "don't care" considerations in user responses, the number of products that may be included in the calibration output is quite large. This feature of the exemplary embodiment of the present invention highlights a significant advance, due to the increase in the level of abstraction. Rather than identifying a particular model of processor, for example, the solution can specify a "mid-level" processor. The Requirements Translation Base Class 210 and Calibration Base Class 280 are thereafter able to map this description, using the Products Base Class 240, into a particular processor, e.g. a 133-MHz Pentium. As new processors are developed by technology innovators such as the manufacturer or third parties, however, the definition of a "mid-level" processor can be updated simply by changing some information in the Products Base Class 240.

The Calibration Base Class 280 created by the first set of processes is configured as shown in FIG. 17A. Because the number of products in each object class is countable (e.g., there are six Desk Memory products) and are listed in increasing order, the third set of processes straightforwardly determines the "real world" value (e.g., "32 MB") based on the rankings.

c. The Question Block Base Class

The Question Block Base Class 100 (FIGS. 58A–58V) includes a large Base Class of questions that may be posed to a user to identify user preferences that can help determine a solution and a set of implementation instructions that meet the preferences. Questions may be posed in several languages and levels of technical expertise. The question block objects ("Question proc" or "question block subclass") fall within several categories, and each object contain both user-interface procedures and the text of questions. Each of the question blocks contains a number of questions, labels, or GUI and other tools, such as bookmarks to interactive web pages, to help the user enter information. The questions are grouped into blocks by their inclusion within a Question Proc.

Figure 55:
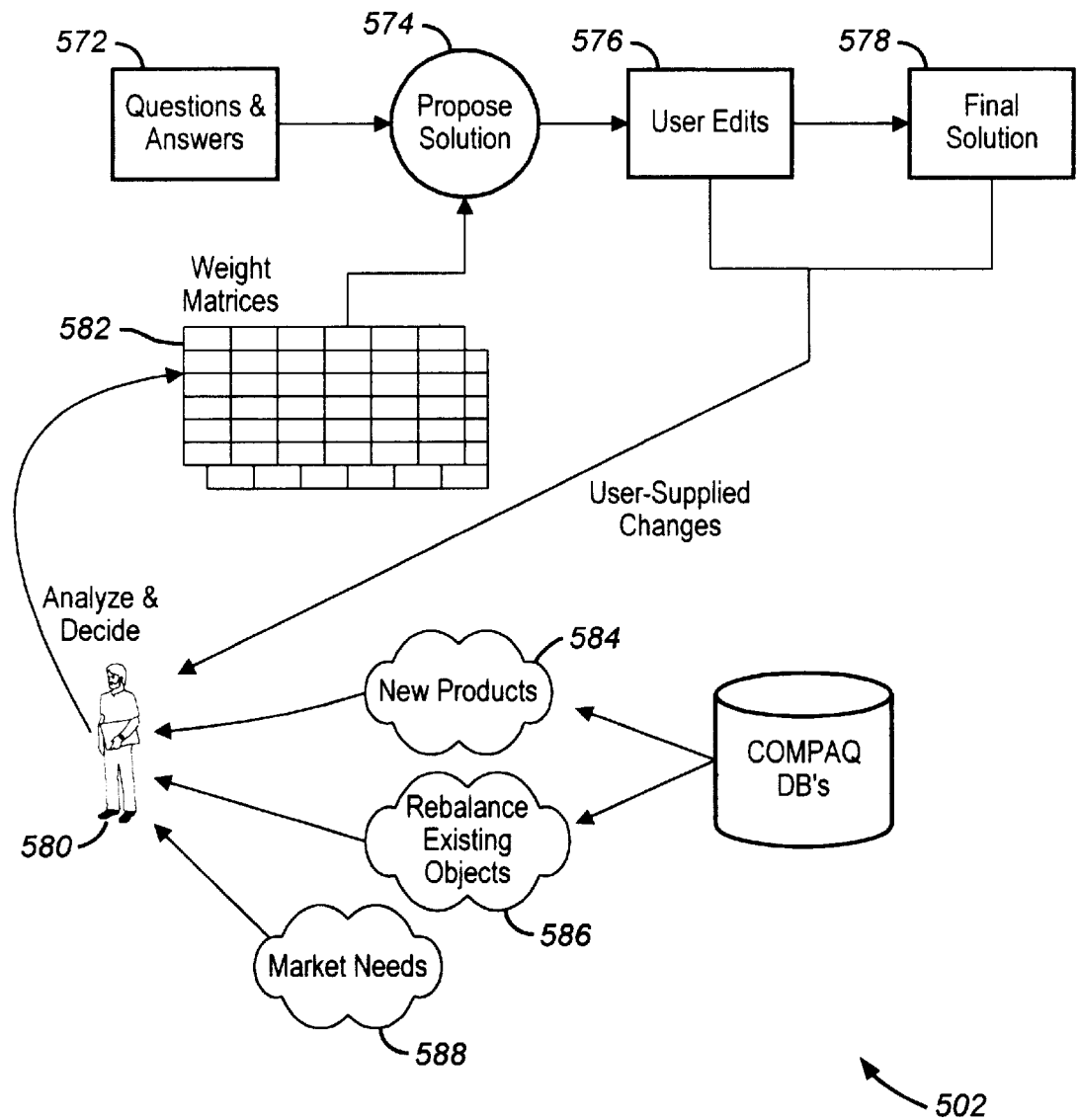
FIGS. 55 and 56 show a manual and an automatic process of implementing maintenance of the tool, improving the response when less than full information is provided by the user.
Figure 56:
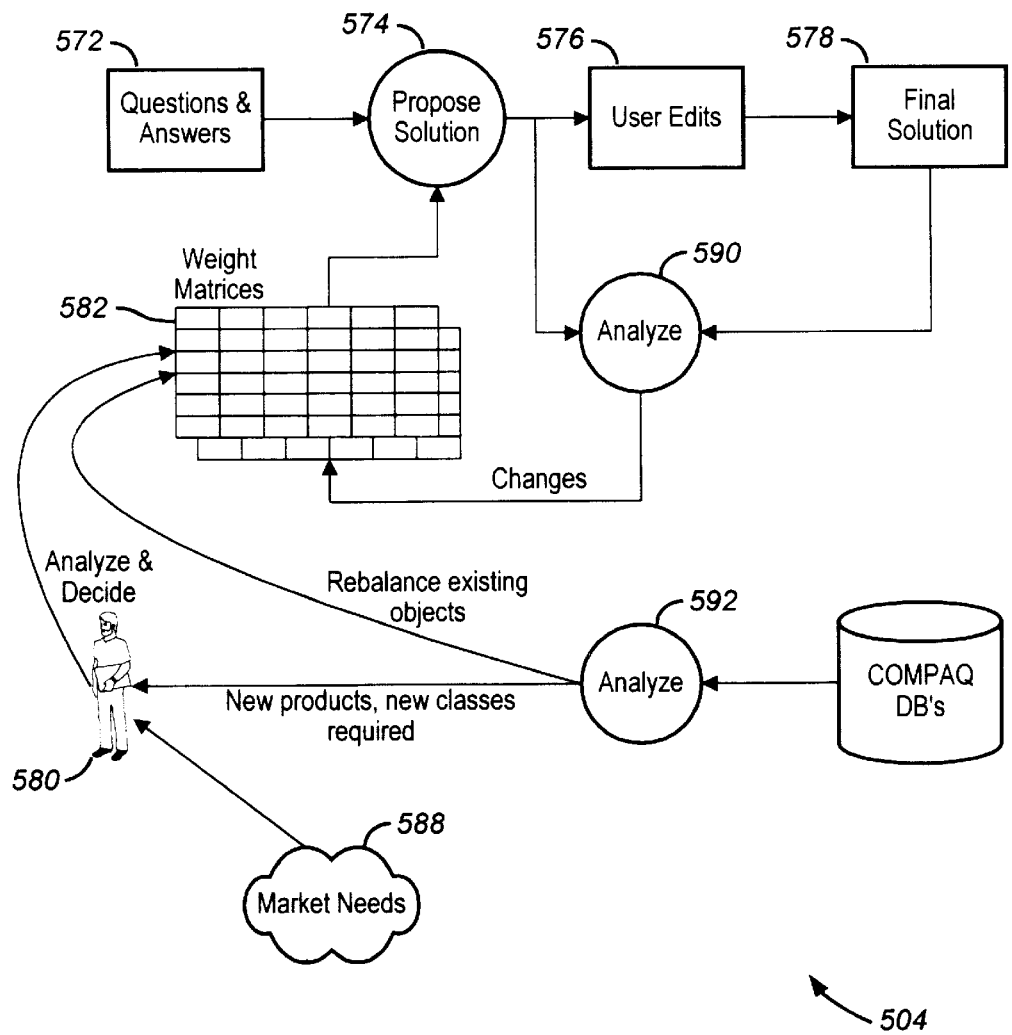

Moreover, it will be apparent that a user need not answer a question simply because the present embodiment accessed a particular question block object, since, as indicated in FIGS. 55 and 56, a weighting matrix 582 allows the present embodiment to derive an appropriate solution based on limited information. This branching ability allows the tool to abstractly determine categories of information needed to determine a solution, and invoke other question block (user interface) objects to prompt a user for responses that provide information to the question blocks. The tool can then determine based upon information thus obtained what further information is necessary to derive a solution and call additional user interface objects appropriate to obtaining the needed information from the user, and provide a skeletal overview solution that meets or exceeds the requirements corresponding to the information. With respect to the groups of data objects that pertain to the user, the user enters data in response to questions posed in ordinary, easy to understand non-technical language.

The Products Base Class 240, Calibration Base Class 280, and the Question Block Base Class 100, as stated above, are maintained by personnel in the computer field who are aware of the supply of computer products and can maintain a list of products including searchable fields or properties (i.e., attributes) that distinguish one product from another. Moreover, the entity maintaining the database includes in the question block objects questions that, although posed in high level, "plain English" language, can allow the user to provide sufficient information for the present invention to determine an appropriate solution.

Figure 58O:
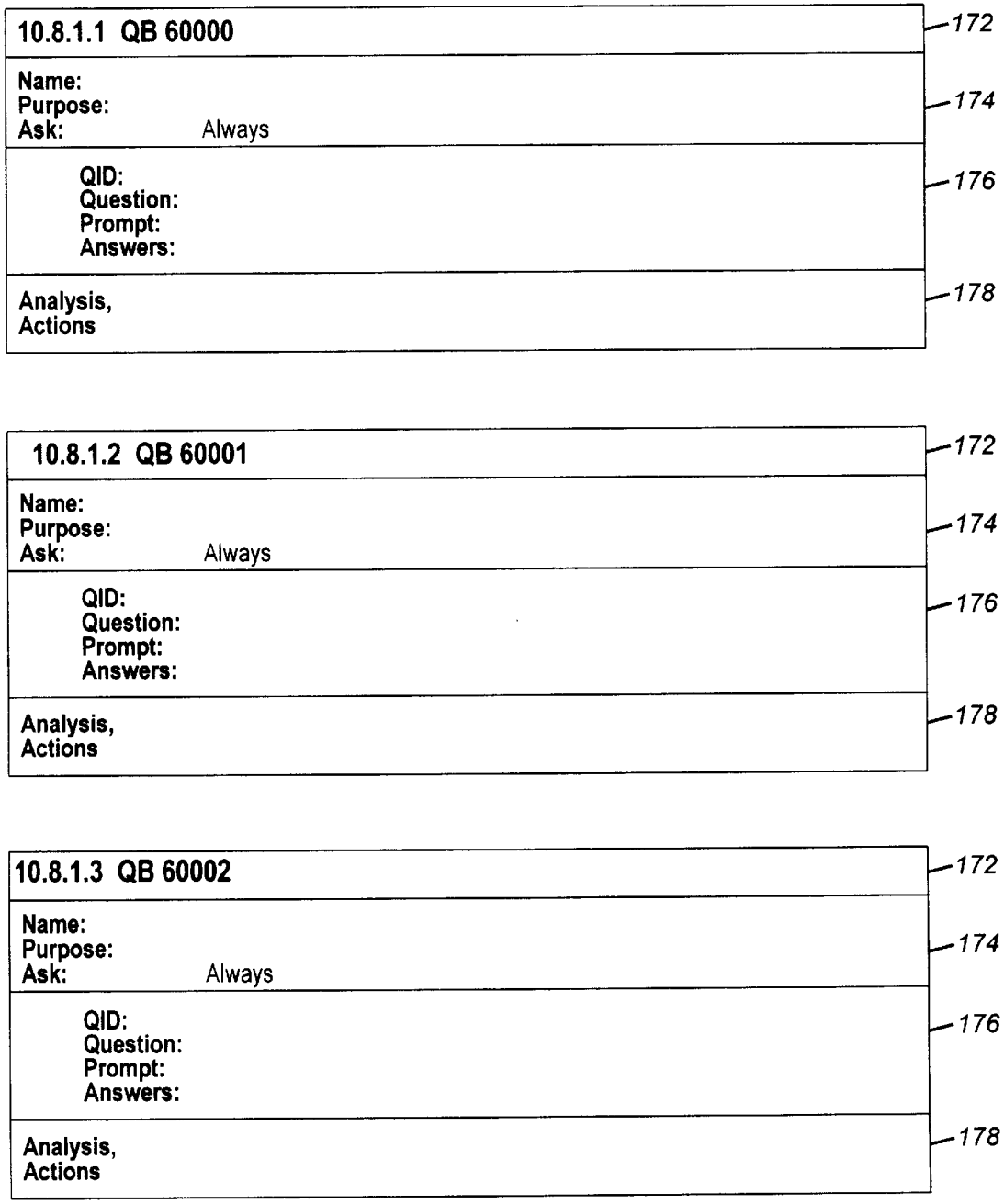
FIGS. 58A–58V show a representative set of question blocks.

The Question Blocks maintained by the manufacturer or third party may contain a very large number of questions. Examples of Question Blocks are shown in FIGS. 58A–58V. The procedures that interact with the user obtain their questions and prompts from the Question Block objects. However, many question blocks are not relevant to certain user's needs, and are not called for these users. The flow through the Question Blocks is nonlinear, however, and often questions become relevant late in a session that had not been asked or been relevant previously.

Subclasses of the Question Block Base Class 100 each comprise a Question Block object containing a number of questions, a corresponding process for obtaining input from a user, and a process for storing the response in memory. Each question block has an abstract class containing a title or other information, and a property type for grouping questions together. The abstract class of the question block allows the question block process that obtains information from the user to display for the user some heading information that can help the user understand a common attribute of the question in the question block. The question block property type allows the present invention to categorize questions, and allows one question block to command an entry into multiple question blocks of a common property type.

(1) The Structure of a Question Block

Questions are stored as single strings and are grouped into meaningful order by inclusion into a question procedure. Each question procedure is a self-contained block that is similar in appearance to a web-page and may contain a question or a group of questions to be answered by typing text, or by clicking a mouse on check boxes or radio buttons. Because the questions are self-contained within a discrete block, presentation of the question or questions within the block are controlled by the block itself. Therefore, while some blocks may provide a straightforward list of questions requiring text entry, other blocks present several questions at once and allow the user to click where appropriate. In some embodiments, common question presentation procedures are available to question procedures. An Answer Type flag is used to control access to the presentation procedures. The Answer Type flag determines how the questions are presented to the client. In the case of check or radio buttons, each question within the block represents the text for one button on the display and may be combined dynamically with other questions. In the exemplary embodiment, a client browser runs Microsoft Visual Basic (VB) Script that parses the question packet, and from the answer type flag builds the appropriate presentation control.

The questions of each object class collectively comprise a question block of questions, assigned a question block identifier or QID-prefix identifying the object class to which the question belongs. Each question is identified by the question identification number ("QID"), using the question block identifier as a prefix identifying the Question Block to which the question belongs. Some typical questions, and the corresponding data object classes to which they belong, are shown in FIGS. 58A–58V. In several embodiments, the views contain only pointers or entry points to a set of common question blocks. Questions are asked in "plain English" (or other language appropriate to the user, as identified during the informational questions).

Question Blocks contain pointers to particular entries in the Client and Answers Base Class 140 (FIG. 22B), and determine whether the entries are valid. If some of the entries in the Client Base Class 120 or Answers Base Class 140 (FIG. 22B) are invalid, the Question block or a pointer to the question block is placed in the queue within the view, and the question block is eventually called by the user interface (usually, the browser).

The Questions Block and related procedures may be implemented as a QuestionProc 100a (FIG. 22H) of instruction code and a plurality of QuestionBlock text. One such structure is shown in FIGS. 58A–58V. The Question Block Base Class 100 may be viewed as a Process Block which presents questions, their display formatting parameters and pointers to their answer objects. Responses (answers) provided by the user are placed in the corresponding areas of the database, filling in the missing elements of the class. The questions are grouped into various data classes, and various processes within the exemplary embodiment of the present invention access different classes when different information is needed.

Referring now to FIGS. 58A–58V, a set of question procedures is shown. Each question block includes a question block identifier, or Question Block Number 172. Each question block also contains a description field 174, having a name, purpose, and summary of the questions in the question block. Although the Question Block Number 172 and description field 174 do not appear to the user, the fields are useful in maintaining the system. Each question block also includes a list of questions 176. The list of questions 176 is the result of the translation of the question field, shown in FIG. 22I, by the Country Base Class 750 (FIG. 23A) and the Language Base Class 700 (FIG. 23B). Each question block may also contain an "analysis, action" field for indicating further activity. The "analysis, action" field contains a summary of branch commands or a description of further action that may be anticipated when certain responses are stored in the Answers Base Class 140 (FIG. 22B). Collectively, the Question Block Number 172, the description field 174, the list of questions 176, and the "analysis, action" field 1778 comprise a QuestionProc 100a.

(2) Categories of Question Blocks

In the disclosed embodiment, the numerous subclasses of the question blocks are be grouped into six categories, although it must be remembered that the list of categories, like the list of questions in each category, is not exhaustive and is subject to change as technology develops and as customers' needs change. Some general categories of such objects include informational, objective, requirements, and guidelines categories.

Within each category, the several question blocks each contain numerous questions grouped with other related questions in various data object classes. With the exception of the informational question blocks 102 used to obtain pointers to the Client Base Class 120 (invoked by the Login procedure, as discussed below), the other question blocks are invoked by processes associated with previously invoked question blocks. In other words, the tool scans the Answers Base Class 140 (FIG. 22B) (described below) and determines that information is needed, and that a particular question block can obtain the necessary information.

The first category is the informational question block category. Informational question blocks 102 obtain a client identifier from the user, and either obtain or generate a machine identifier for the system the user wants to provide. The informational question blocks 102 obtain general information about the user, the operating environment in which the system satisfying the solution will operate, and whether a new system or an expansion or upgrade of an existing system is contemplated. The informational question blocks 102 also includes questions relevant to the presentation procedures and other processes for controlling the Graphical User Interface at the user's browser. Expert mode may be identified during the preliminary phase.

Informational questions of a general nature are also included within the informational question blocks 102. These questions are also driven by the absence or invalidity of certain data within the Client and Answer Base Classes. The information that is provided by the user and stored in the Client Base Class 120 can be used subsequently for customer service and marketing purposes, for product development (i.e., building new products customized to existing systems), and many other purposes. Examples of the informational questions within the informational question blocks 102 include interrogatories directed to Company Name, Company Address, Company Phone Number, Company Fax Number, Company Mail Address, Company Web Site, Type of Business, Primary Contact Name, Primary Contact Phone Number, Primary Contact Fax Number, and Primary Contact Email Address.

Informational questions within the informational question blocks 102 also identify whether the user wishes to create a new solution or update a previously determined solution. If a previously determined solution is to be updated, the subsequent objects in the execution of the exemplary embodiment of the present invention update the previously determined solution. Otherwise, a new solution is calculated. Generally, each execution of the tool in novice mode results in a calculation of a solution comprising nine objects—a server 408 subclass object, a printer object, a WAN subclass 414 object, a Desktop 406 Subclass, a LAN 402 subclass, an Internet subclass 416 object, a portable 410 subclass object, a workgroup 404, and a remote access object, all of the Solutions Framework Base Class 400. Attributes are taken from the Object Base Class 600. Each object contains a pointer to the structure within which it is contained, and each parent structure maintains a list of nodes it has created.

Referring now to FIGS. 18A–18C, each of the nine categories of products corresponds to a class shown. Also shown in FIGS. 18A–18C is the inter-networking subclasses. Each class includes a set of parameters and data sources for building a subclass of the Solutions Framework Base Class 400. Each is mapped to a question block such as one of the question blocks containing detailed product questions 110, and is also mapped to a region within the Answers Base Class 140 (FIG. 22B).

Informational questions within the informational question blocks 102 also include a question block that initiates the view for each session. The Client Base Class 120 (FIG. 3), Answers Base Class 140 (FIG. 22B), Solutions Framework Base Class 400, and Recipe Base Class (FIG. 3), as well as the User Guidelines Base Class 160 (FIG. 6), Requirements Translation Base Class 210, Requirements Base Class 180 (FIGS. 12–16), and Products Requirements Base Class 200, are all created by question blocks within the first category in response to user-supplied information necessary to create the particular Base Class. The Client Base Class 120 and Solutions Framework Base Class 400, in particular, are described in detail below.

Once the initial information is obtained, the exemplary embodiment of the present invention identifies, in ordinary language, some of the constraints around which a solution must be generated. The Questions Block objects call additional Question Block objects, including objective question blocks 104, requirements question blocks 106, and guideline questions 108.

The second category of question blocks includes the objective question blocks 104, and the third category includes requirements question blocks 106. Like the informational questions within the informational question blocks 102, both are driven by the absence or invalidity of entries in the Answers Base Class 140 (FIG. 22B). Responses from the user replace the absent or invalid entries in the Answers Base Class 140, where the responses will be available to subsequent analysis procedures. Requirements identified in the requirements question blocks 106 include the number of computers, number of nodes, number of servers, future growth expectations, local area network (LAN 402) uses, and other characteristics such as brand preferences that a user may have. Users are free to leave particular questions unanswered, as the exemplary embodiment of the present invention can develop a solution based on limited information. As will be explained, users can also add information later, after an initial solution is suggested, through an incremental editor described below.

A fourth category of question blocks includes guidelines question blocks 108. Guidelines refer to overall considerations, such as total budget, servers, platforms, and other considerations to be applied throughout the overall system. Guidelines question blocks elicit information that is necessary to determine the user's needs across multiple pieces of equipment (or the network as a whole). The information obtained is stored in the Answers Base Class 140 (discussed below), and is accessed by (among other Base Class processes) the User Guidelines Base Class 160 (FIG. 6) processes. Guidelines question blocks allow the tool to ask detailed questions for each piece of equipment. Other question block processes update and alter the information in the Answers Base Class 140 as the user responds to other question blocks. The tool gathers sufficient information to allow it to understand the capacity and speed requirements of the equipment, and how each piece of equipment must be connected to the network in order to satisfy the requirements and guidelines.

A fifth category includes detailed product questions 110. The questions within the fifth category are used during Phase I and Phase II to narrow down selection of particular products and to arrive at the recommended solution. A sixth category includes internetworking questions 112. The questions within the sixth category are used during the Phase III to narrow down selection of how the products are to be connected to one another, and how to arrive at the recommended solution.

(3) Processes Corresponding To The Question Block Base Class

The Question Block Base Class 100 contains a number of question blocks that are grouped into categories. Referring again to FIG. 3, the Question Block Base Class 100 includes procedures that (a) create a question block queue, (b) identify empty or invalid memory locations in the Answers Base Class 140 (FIG. 22B) and in the Client Base Class 120, (c) identify subclasses and extensions in the Question Block Base Class 100 that map to the empty or invalid memory locations, (d) translate question information from the identified subclasses and extensions in the Question Block Base Class 100 by the Language Base Class 700 and the County Base Class 750, (e) create a QuestionProc 100*a* (FIG. 22H) corresponding to the question block and "Spawn" a process for presenting the QuestionProc 100*a* to the user, and (f) place a pointer to the QuestionProc 100*a* in the queue. The queue and the corresponding QuestionProc 100*a* are part of the view, associated with each user session.

A first set of processes corresponding to the Question Block Base Class 100 retrieves particular question block objects from the maintained Question Block Base Class 100 and copies the question block into a view for the client session. As will be explained, each user session is assigned a region of memory referred to as a view into which information relating to the client session is copied. Copying the question blocks, or at least a representation of the question blocks, into the view allows presentation at a user's browser in an environment appropriate to the browser.

The first set of processes associated with each question block copies the question block object from the Base Class into a region of memory dedicated to a particular session. The ability to provide a view of the Question Block corresponding to each session allows the present invention to simultaneously accommodate multiple users by allocating to each user a different region of memory. In some embodiments, while the Base Class exists in a common area maintained by the manufacturers or other experts, subclasses and extensions reside in the client session view. Alternately, only a question block identifier need be copied into the view, where it is placed in a queue. In still another embodiment, the queue contains entry points of the question blocks to be called.

The first set of processes accesses Graphical User Interface routines, or contains its own, which ask questions of the user and stores responses in memory, within a region of memory dedicated to the view. In one embodiment, each view contains an instance of the question procedure object class. Question Procedures (or Answer Handling Procedures) include procedures that create a class instance of each class referenced in the corresponding block of questions; re-use deleted instances; put, get, update or delete answers to the Answers Base Class 140 (FIG. 22B); get additional class members; traverse a class tree; gets class properties; and creates temporary collection of class members. As stated previously, the processes associated with the question blocks present questions from the question blocks on an output device corresponding to the user, and receive responsive inputs (answers) from the user over an input device. The answers are placed in either a Client Base Class 120 or an Answers Base Class 140, depending on the particular question block.

A second set of processes associated with the each object (i.e., question block) in the Question Block Base Class 100 parses the returned answers from the question block, updates the Answers Base Class 140 (FIG. 22B) and then formats and presents the next question block to the client. Preferably, though, only one entry point to the question block is needed to handle all interactions with the client. Each such object possesses three corresponding sets of data driven Question Block processes. The third set of processes then determines, based on responses to previously asked questions, whether to branch to the entry point of other question block objects within the view. The objects of the Questions Blocks do not branch in a tree-like manner nor any other predetermined way, but rather can branch among the other question blocks in a nonlinear, nonsequential manner. Control flow through the question block processes is driven by previous answers. Within the view, the question block identifiers are stored in a queue. Each block of questions has the possibility of invoking one or more other blocks of questions; each block of questions thus invoked is queued for presentation when a previously-queued block of questions is completed. The second set of processes analyzes the Answers Base Class 140 (discussed below) and identifies other question blocks that are to be included.

The fifth category of question blocks includes detailed product questions 110. These detailed product questions 110 are typically called after some product definition has occurred, and are used to identify additional products that should be included with the products already defined. For example, once a Desktop 406 Subclass is established, detailed product questions 110 need be called to select products, parameters, operating systems, and applications, as well as personal preferences and expected future trends, corresponding to the desktop 406. Similar detailed product questions 110 are called when notebook computers, personal printers, other I/O devices, and other products are identified. These detailed product questions 110 are discussed further below, in reference to FIG. 9 and further in reference to the fifth set of processes corresponding to the Solutions Framework Base Class 400.

(4) Control Flow Through Question Blocks

Control flow through the question blocks is nonlinear and non-sequential. Because the operations are controlled by the answers provided during this interactive session, flow control may be best described as a dynamic process that is initially based on a redefined order of execution of Question Procedures. Pre- and post-process procedures are used to perform analysis of the Answers Base Class 140 (FIG. 22B), add values to the Answers Base Class 140 or alter program flow based on the results of the analysis.

It will be recognized that, though shown in a sequential flow, the objects need not in fact be implemented in such a sequential flow. Instead, objects such as the requirements question blocks 106 object call or spawn informational questions within the informational question blocks 102 for additional information. It will be remembered that many of the user interfaces accessing the question blocks are designed to obtain from the user a set of guidelines to be used in later phases to structure the solution. The interactive phase need not be completely terminated; if needed, additional question blocks can be accessed and more information obtained from the user. If an object determines that more information is needed or would be useful, another object designed to obtain the missing information is created.

The numerous subclasses of the Question Block Base Class 100 include questions seeking related pieces of information from the user. Each subclass (or its entry point) can be copied to any view. Processes associated with the subclass can branch to any other subclass in the Question Block Base Class 100 by adding the other subclass to the view as well, depending on user responses.

d. Products Requirements Base Class

The Products Requirements Base Class 200 identifies, for each subclass of the Solutions Framework Base Class 400, the properties whose values question blocks can be queued to value.

2. Temporary Objects For Each Session

In addition to the Maintained Object Classes, some of which are copied into the view, other object classes are created for each client session. The objects created for each client session collectively define the state of the client session.

When a user initiates a session, the exemplary embodiment of the present invention creates a "view" corresponding to the session. The view may be regarded as a region of memory storing all of the object classes corresponding to the client session. If multiple users access the tool, or if a user indicates that several different (i.e., separate, distinct) computer systems are to be designed, then different regions of memory are allocated to prevent any overlap of the views.

Each view includes a copy of at least some access to the Question Block Base Class 100. As stated above, each Question Block object in the Question Block Base Class 100, once copied into the view, can pose questions to the user in abstract, easily understood language, and can store information derived from the answers to the questions. Each view is self-directed, in that question block processes corresponding to the question blocks in each view can access the Question Block Base Class 100 and copy additional question blocks into the view. The Language Base Class 700 (FIG. 23B) and the Country Base Class 750 (FIG. 23A) are used to validate Language, Country, compatibility and availability Parameters.

Each view also includes a Client Base Class 120 (FIG. 3), an Answers Base Class 140 (FIG. 22B) (not shown, but including a Collections subclass, an AnswersCollections subclass, and an Applications Subclass 290), a Solutions Framework Base Class 400, and a Recipe Base Class (FIG. 3). Each of these Base Classes resides in each view. The Client Base Class 120 (FIG. 3) the Answers Base Class 140 are created by processes associated with particular question blocks. The Solutions Framework Base Class 400 and the Recipe Base Class are generated by the Login procedure during the preliminary phase described below, and contain update processes that obtain information from both the Client Base Class 120 and the Answers Base Class 140.

Typically, object classes in each view operate independently of the object classes in the other views. Each of these Base Classes contains a subclass or table and a set of processes. Each process is identified with a Base Class, and is driven by the absence and invalidity, or the presence and validity, of the data within the Base Class. Each of these Base Classes is now described in detail.

Other objects are also created within the view, but do not necessarily survive the end of the session. These are shown in FIG. 5. These object classes include a User Guidelines Base Class 160, having attributes represented as columns in a table in FIG. 6, a Requirements Base Class 180, having attributes represented as columns in a table in FIGS. 12–16, a Products Requirements Base Class 200 (not to be confused with the Requirements Base Class 180 having attributes represented as columns in a table in FIGS. 12–16), and a Requirements Translation Base Class 210 (also, not to be confused with the Requirements Base Class 180). The User Guidelines Base Class 160 contains information to which the entire solution, or large portions of the solutions, are subject. The Requirements Base Class 180, however, has information that is specific to each product. A Products Requirements Base Class 200 and the Requirements Translation Base Class 210 allows the tool to develop solutions based on these base classes. Many of the processes that access Base Classes within these Base Classes also access the Calibration Base Class 280, one of the maintained Base Classes described above.

Each of these object classes is now discussed in detail.

a. User Guidelines (1) General Structure

The User Guidelines Base Class 160 (FIG. 6) contains a Base Class of overall user guidelines that can be applied over an entire computer system or network. Subclasses define user guidelines for particular extensions of the Solutions Framework Base Class 400. In other words, as the Solutions Framework Base Class 400 generates subclasses (i.e., extensions) in the view (i.e., the region of memory dedicated to the client/user session), each subclass of the Solutions Framework Base Class 400 is an instance, or copy, of one of the object classes defined in FIGS. 18A–18C.

Referring now to FIGS. 18A–18C, the User Guidelines Base Class 160 includes a Base Class of all the computer products to be included in the recommended solution. The Base Class has entries (records) describing each class (category) of product available in the market, according to various attributes (i.e., parameters) or fields upon which a customer or repeller or a consultant configuring and designing a solution to a customer s particular computer needs might desire to search. Each desktop, for example, is an instance of the "desktop" subclass of the Object Base Class 600 shown in FIGS. 18A–18C. During Phase I, each user-specified attribute is included in the Solutions Framework 400 subclass, shown as desktop 406 extension in FIG. 4.

For example, speed, cost, availability, error tolerance, and other attributes (i.e., parameters or properties) of computer-related products are included in the User Guidelines Base Class 160 to help specify each product. It may be noted that several products may be identical with respect to a particular field.

The attributes field of the User Guidelines Base Class 160 serves several basic functions. It provides a means for distinguishing products of the same class (i.e., product category). The attributes field includes a value that can be used to rank the products in the class. The Attribute (i.e., Property) Field 218 also provides the structure for the Solutions Framework Base Class 400 extensions, providing information useful to identifying the products by manufacturer and part number. The Attribute (i.e., Property) Field 218 also allows information from the Answers Base Class 140 (FIG. 22B) to map to Solutions Framework Base Class 400, to the Translations Base Class, and eventually to the Calibration Base Class 280 (FIGS. 17A–17D).

User Guidelines Base Class 160 processes search the Answers Base Class 140 (FIG. 22B) for indicia of whether particular User Guidelines subclasses are to be included within a particular view. The non-sequential branching of the question block objects includes several question blocks obtaining from the user a description of the system that the user wants. The user's responses, stored in the Answers Base Class 140 (FIG. 22B), are typically in very high level abstract terminology, easily understandable to any user. Requirements such as "the fastest," "the least expensive," and other similar easily understandable requirements are typical. The User Guidelines Base Class 160 processes determine, based on the user's responses as stored in the Answers Base Class 140, overall compatibility requirements related to security, segmentation of networks, and other factors in determining an overall guideline. User Guidelines allow trade-offs to be made among the products in a computer system or network. For example, if a guideline required compatibility with a server operating in an NT environment, or if the total network cost or fault tolerance were a critical factor, the User Guidelines Base Class 160 can provide an overall adherence to the guidelines. Tradeoffs among guidelines are also accommodated, for example if faster means more expensive.

(2) Processes

Processes of the User Guidelines apply the guidelines to particular criteria. For example, one subclass may verify overall speed of a distributed network, while another verifies system cost. If the defined system does not comply with the guidelines (for example, if a computer system is defined with a maximum cost in mind), then products are selected for substitution. The subclasses are generated dynamically in response to questions posed by the Question Block subclasses and the answers stored in the Answers Base Class 140. Each subclass has a corresponding Question Block determining whether the Guidelines subclass is created for the particular client session.

In the exemplary embodiment, the tool uses the various object classes described above to identify the user's level of technical knowledge and skill, as well as the user's needs for computer products, and to identify an appropriate set of computer devices that satisfy the needs of the user. The tool also identifies the user's spoken language, so that all interactive activity can be performed in a language that the user can understand.

Since the user's level of technical knowledge and skill is known to the tool, virtually all of the information is phrased in language the user can understand. The control flow through the tool also identifies industry standards, and verifies that the set of products and the set of instructions presented to the user are available and compatible in the user's geographical location.

The preliminary question block also includes processes for identifying other questions blocks to call, and entering entry points to the other question blocks into a queue. In those embodiments in which the entire Question Block Base Class 100 is copied into the view, only a relational vector is necessary in the queue. In the disclosed embodiment, once a question block process determines that all questions within the particular question block have been presented to the user and the user has either responded with an answer or declined to do so, another process corresponding to the question block searches the queue and identifies another question block pointer, entry point, or relational vector (i.e., offset). If any such exists in the queue, another question block is called, and its answers likewise placed in either the Client Base Class 120 or the Answers Base Class 140 (FIG. 22B), depending on the particular question block.

The processes associated with the User Guidelines Base Class 160, the Requirements Base Class 180, and the Products Requirements Base Class 200 are collectively referred to as Phase I. Phase I interprets the Answers Base Class 140 and the Client Base Class 120 (FIG. 3) determines the basic structure of the Solutions Framework 400 and the Recipe Base Classes (FIG. 3). These processes access the Answers Base Class 140 and Client Base Class 120 directly, and extend the Solution Framework 400 and Recipe Base Classes (FIG. 3) to include specifications of products (both hardware and software) and are used to supply the various subclasses of the Solutions Framework Base Class 400 and Recipe Base Class with basic guidelines and requirements.

No consideration is given during Phase II to compatibility among the given products, but rather Phase II is directed to selecting a list of products individually corresponding to the Guidelines Base Class and the Requirements Base Class 180. During execution, both the Requirements Translation Base Class 210 and Products Requirements Base Class 180 store their corresponding results in the Solution Framework 400 and Recipe Base Classes (FIG. 3).

A User Guideline Base Class 160, also in the database, and also created by processes within Phase I, may be regarded as an initial instance of the Solution Framework depicted in FIG. 4, and are initial instances of the data classes pertaining thereto. The processes associated with the User Guideline Base Class 160 store the rankings of the set of data objects shown in FIG. 4, relating to solution guidelines, in the empty solution framework created in Phase I.

User specified guidelines and input parameters gathered during the question and answer session of 252 describing each of the product classes constrain the output of Phase II and Phase III, since the guidelines are applied across the solution to ensure close match with the user's expectations. Although some answers provided by the user apply to particular devices or products, and are used to drive the product selection of Phase II, other user specified guidelines apply to the solution as a whole, rather than to particular devices or products. Characteristics such as cost, performance, number of features, expandability, scalability, fault tolerance, security, and availability may all be specified as a ranking, and each feature, device, software, or operating system determined by the exemplary embodiment of the present invention will thereafter comply with the overall user specified guideline. Because each product in the product object in the database includes a ranking relative to the other products within the same product class, subsequent processes pertaining to Phase II and Phase III can apply the user specified guidelines across the entire solution. Each product is positioned within its class relative to the other products, so that the user specified guidelines indicating the importance of the feature to the user may be specified.

How the guidelines are applied to product selection is another innovative feature. As explained previously, there are two approaches within the exemplary embodiment of the present invention for specifying the user specified guidelines and product selection. In the "overall" guideline or product selection, a user identifies, for each product class, whether the low end, best value, or high end product is desired. In other words, in response to the question blocks, for each product class (e.g. microprocessors, printers, etc.) the user specifies a low end, best value, or high end criteria for the whole product. Each product in the Products Base Class 240 thus has an overall ranking. In the "detail" guideline approach, however, in the detailed guidelines approach, for each product class, the user ranks the various characteristics (cost, performance, number of features, expendability, scalability, fault tolerance, security, availability) according to the level of importance the user attaches to each characteristic. Because each product in the database objects have a separate ranking number corresponding to each of these characteristics, relative to the other products in the product class, a process can select from the database objects the particular product or set of products corresponding to the characteristic ranking. A default value of "best value" may be provided. Thus, in the database object, each product not only has a ranking corresponding to its fault tolerance relative to the other products in the class, but also indicates whether users typically select the product typically deem fault tolerance more important than scalability. This is accomplished by forming a Base Class for each product class, the rows in the Base Class corresponding to individual product within the product class, columns in the Base Class corresponding to the characteristics listed above, and each Base Class entry including a unique number between 1 and 100 that provide the balance between the relative importance among the various characteristics, and the ranking of the product within the class of that characteristic.

Another innovative feature is the "median selector" of the product selection. The process 534 that searches for matching products only includes the products that exceed the median in the zone that is being processed. For example, if a Base Class or entry in the User Guidelines Base Class 160 indicates that the solution guidelines place a premium on fault tolerance, in the characteristics Base Class just described, each column is examined and only those products exceeding the median are included in the Second Intermediate Results Base Class 540. This selection process is described in FIG. 8 b. Requirements Translation Base Class

A Requirements Translation Base Class 210, initialized during the Login procedure, includes processes calculating and deriving information and storing the information in a Requirements Translation Base Class 210.

Processes associated with the Requirements Translation Base Class 210 access the User Guidelines Base Class 160, and determine the categories or products desired by the user, and the guidelines associated with each category or product, as indicated by the user in response to question blocks. The processes associated with the Requirements Translation Base Class 210 then access either the Products Base Class 240, or a Capabilities subclass thereof, and count the number of products available in the category. The processes associated with the Requirements Translation Base Class 210 then rank the products from one to the number of products in the category, creating a subclass of the Products Base Class 240. Finally, the processes associated with the Requirements Translation Base Class 210 compare the desired ranking indicated by the user (.e.g., "the median-speed microprocessor") with the ranking in the subclass of the Products Base Class 240 (FIGS. 47–50), to determine the minimum requirements of the product. The minimum requirements of the product are then copied into the corresponding extension of the Solutions Framework Base Class 400.

In this way, the Requirements Translation Base Class 210 processes determine the current for each particular product in the Solutions Framework Base Class 400, and provide a mapping of rankings into a list of minimum requirements. For example, in the category of microprocessors, if the requirements translation processes determine that three microprocessors are currently available on the market that comply with the user guidelines, each having a different value for a given property (e.g., speed), and that the Products Requirements Base Class 200 indicates that the user desires one of median capabilities, then the Requirements Translation Base Class 210 processes select the second microprocessor of the three. For this purpose, the Requirements Translation Base Class 210 accesses the Products Base Class 240 and determine the capabilities of the median product.

The Requirements Translation Base Class 210 need not isolate a single product, since several products may be equivalent. Capabilities such as "133 MHz" or "12 characters per inch" are the result of the processes corresponding to, and are stored in the Base Classes of, the Requirements Translation Base Class 210.

Referring to FIG. 6, a generalized Requirements Translation Base Class 210, and referring to FIG. 14, a Requirements Translation Base Class 210 specifically for operating systems, are shown. Within each category of products, for each field, a number appears indicating, with respect to the other products in the category, the ranking of the particular product with respect to a property corresponding to a field. It should be noted that the field does not contain a Real World Value such as 133 MHz, 400 characters-per-inch, or other such value, but rather has a numerical ranking from 1 to 3 or from 1 to 100 (or other range determined by the system maintenance manager). It should also be noted that several products, having the same speed or cost or other property, may have identical rankings. Requirements Translations Base Classes are used to convert subjective considerations such as "very fast" into a rank. The Requirements Translation Base Class 210a, the first intermediate results instance 510 of the Solutions Framework Base Class 400, and the Calibration Base Class 280 are "intelligent" in that, rather than providing actual data in an indicated area of memory, each provides a mapping to a database entry. The Requirements Translation Base Class 210 is used to determine the product features and resource requirements from a user's inputs. Answers to user questions specify the intended use and required product features for each product class. Product classes include operating systems, major applications, product features, and user specified guidelines such that a recommendation can be made as to the correct system resources and supporting features. Thus, the preferred or recommended solution may be represented as a collection of requirements, decoupled from the database itself. Product evolution and changes in product availability and capabilities may impact the database itself, but not the intended use nor product features required, and therefore the user guidelines and other responses from the user to questions are completely independent of the product object database. Thus, if all processors available on the market increase in speed without changing their relative ranking, then only the Calibration Base Class 280 need be updated to reflected to reflect the increase. The Requirements Translation Base Class 210 performs two functions: translating user requirements into a set of internal requirements that can be processes via the Calibration Base Class 280, and generating a products requirements specification, e.g. for a specific upgrading system and application. Specific operating system and application requirements can impose minimum guidelines on processor, memory, and disc space, for example. As shown in FIG. 5, these two functions of the Requirements Translation Base Class 210 are separately illustrated, in the Requirements Translation Base Class 210 and the Products Requirement Base Class 200.

Figure 7:
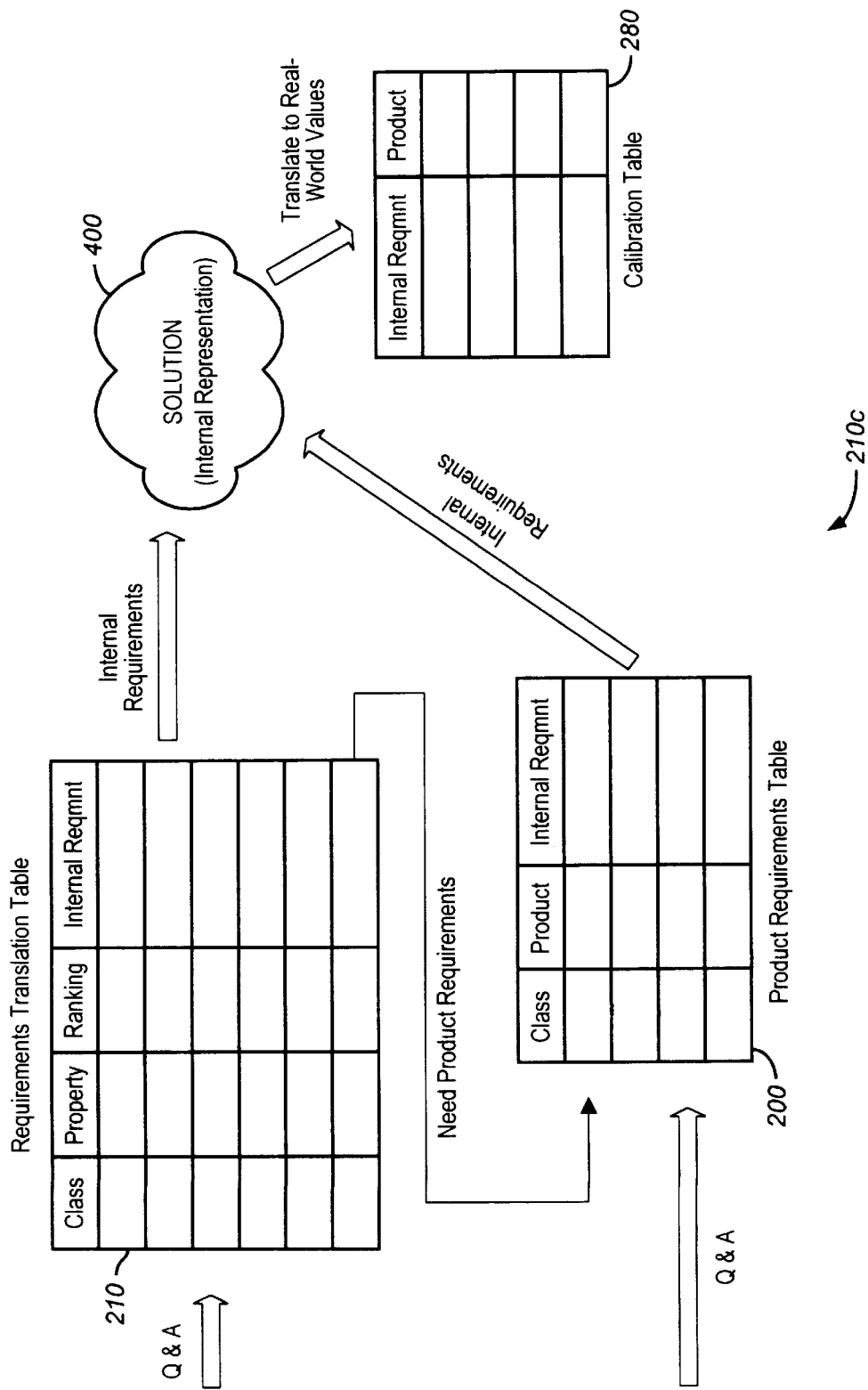
FIG. 7 shows requirements translation.

Referring back to FIG. 7, a typical requirements translation architecture 210c is shown. Initially, the question-and-answer interactive session provides a general identification of the categories of products required. For example, printers and desktop computers, and perhaps portable 410 within the Solutions Framework Base Class 400 computers, may have been specified. A table of the Requirements Translation Base Class 210 as shown in FIG. 7 includes fields for the class name, properties, rankings, and internal requirements. Thus, for the class "printer," and the properties "dots per inch," a ranking is provided. Generally, the higher the ranking, the more desirable the product is to the typical end user. Internal requirements include references to cable sizes, operating systems, or other requirements that the system must have to use the particular product identified. The make and model of the particular product, however, is omitted from the Requirements Translation Base Class 210, since multiple products in a class having the same value for a particular property have the same ranking, and therefore, require only one row in the Requirements Translation Base Class 210. If new products having the same capabilities produced by other manufacturers come onto the market, the Requirements Translation Base Class 210 need not be updated, since no new capabilities have been introduced.

Requirements translation architecture, including a table of the Requirements Translation Base Class 210, is further illustrated in FIG. 7. In the first analysis step 510, for each class (printer, microprocessor, etc.) a list of properties (speed, fault tolerance, etc.) and ranking is determined from a question block. This provides a User Guidelines Base Class 160, also illustrated as a Requirements Translation Base Class 210. This Requirements Translation Base Class 210 allows representation of the user specified requirements for each product class. Separately, an internal database is maintained for all products available globally, and is accessible to the "determined minimum resources" process and the products and solutions 530 data object in FIG. 5. The User Guidelines Base Class 160 shown in FIG. 7 identifying the ranking and properties of each product class are mapped into the various subclasses of the Products Requirement Base Class 200 shown in FIG. 7, to provide a solution (contents of the internal Representation Field 212) shown in FIG. 7 that is mapped into Real World Values 214 by the Calibration Base Class 280. The first intermediate results instance 510 of the Solutions Framework Base Class 400 has a corresponding set of first intermediate results processes 512 that provide information from the first intermediate results instance of the Solutions Framework Base Class 400 to the Calibration Base Class 280.

Requirements translation functionality involves translating rankings into minimum requirements. Products Requirement functionality involves translating requirements into actual products. Both of these steps are definable by the maintenance professional. New classes, products, properties and property values may be added to the database as market needs change. When specific requirements are provided by the user and appear in the Answers Base Class 140 (FIG. 22B), the Requirements Translation Base Class 210 determines the category of product, and then from the Object Base Class 600 determines the list of parameters, attributes and characteristics illustrated in FIGS. 8 and 9, and again in FIG. 16) that distinguish products in a category from one another. For example, the class "Baseline products" includes a subclass "Desk Base." The instances (elements) of the class include a variety of products that may serve as a desk base. Each such product has, in the Base Class, various properties that are ranked. For example, a particular desk base has an overall ranking, a cost parameter, a performance parameter, etc.

Referring now to FIG. 9, various attributes 850a for each class, including properties and requirements are shown. By way of further explanation, the first line of FIG. 9, including the Desk Base Class, is expanded further within FIGS. 11A–11B, which is sorted through with respect to FIG. 9. The result places the operating system and hardware preferences (subjective rankings) in the solution framework. Because the solution framework shown in FIG. 4 may be implemented indirectly with pointers to actual data, rather than as containing the data itself, and may be stored locally, the operating system and preferences are described in FIG. 5 as the first intermediate results or the intermediate resource requirements.

In addition to the Requirements Translation Base Class 210, FIG. 7 shows a table or subclass of the Products Requirement Base Class 200. The table or subclass of the Products Requirement Base Class 200, also formed in response to the questions and answer interactive session, provides a field for the class name, the product, and internal requirements. For example, the Products Requirements Base Class 200 merely shows what internal requirements are associated with particular products, into what class each product belongs. The Products Requirements Base Class 200 introduces constraints on the system when a product is selected, but does not provide values or rankings to be used in selecting particular products. Collectively, the Requirements Translation Base Class 210 and Products Requirements Base Class 200 enable a solution to identify additional internal requirements when given a subjective evaluation of the requirement. For example, if a user requires a "fast" printer, the Requirements Translation Base Class 210 can convert the subject evaluation of the property to a ranking of "three" or "100" and provide internal requirements for all products having the highest ranking. The corresponding list of rankings and properties are placed in the corresponding locations in the solution framework. Thereafter, the Calibration Base Class 280 allows conversion of the ranking to Real World Values 214 (illustrated in FIGS. 17A–17D) such as 133 megahertz in the case of processors, or 100 dots per inch in the case of printers.

Processes corresponding to the Requirements Translation Base Class 210 and the Calibration Base Class 280 (FIGS. 17A–17D) are referred to as Phase II, since they build on the Phase I objects and extend the Solution Framework 400 and Recipe Base Classes (FIG. 3) to include the actual names of products (both hardware and software), identified by vendor and model number. Phase II processes also invoke the incremental editor, to allow a user to substitute different products into the solution to replace identified products. The incremental editor can be accessed in a number of ways, including the "Assist Me" feature in Expert mode 400c, described below. Phase III processes, corresponding to the Solutions Framework 400 and Recipe Base Classes themselves, analyze the answers in the Answers Base Class 140 (FIG. 22B) and inserts into the Recipe Base Class an instruction for installing, implementing, updating, or maintaining the given products, and further provide a set of instructions for connecting the product to other products in the overall solution. Finally, Phase IV processes, also corresponding to the Solutions Framework 400 and Recipe Base Classes themselves, perform a final compatibility and integrity verification on the overall solution, check the solution against the Answers Base Class 140 to ensure that the user's needs are met by the solution, and store the solution in the Client Base Class 120.

A Requirements Translation Base Class 210 also shown in FIG. 5 includes various portions of the products and services database, maintained by the manufacturer or third party, and contains entries corresponding to available hardware or software product, including operating systems, applications, features, and other products. With each entry in the Requirements Base Class 180, a performance rating or ranking is included. The ranking or rating may be "low," "medium," or "high," for example. The Requirements Translation Base Class 210 allows translation of the ratings or rankings into an intermediate representation of features. Product selection comprises three data objects. First, subjective preference information is obtained from the user and stored in the Answers Base Class 140. Then, the information is translated to requirements, converting the subjective information into a numerical rank, e.g. "fastest" becomes "Rank 6 of 6 speeds." The higher the rank generally, the more desirable. Translation requires consulting the Products Base Class 240, if only to count the number of devices in a particular class. Calibration then converts the rank into a "real world" value, such as 200 MHz. Finally, a search and match process 282 identifies products having the characteristics and properties in question. All three steps, though, are driven by the vacancies in the solution framework. Searching the information in the Products Base Class 240 (i.e., a collection of maintained Base Classes storing product information) reveals product differences. By determining whether multiple products equally satisfy the user-imposed constraints, additional question objects are launched that request additional information from the user. As customer's needs and technology both evolve, the methods of querying a database change, so additional information must be constantly included.

The above description applies equally to software. The Applications Base Class. linked to the Collections Base Class 300, contains all the relevant information about various applications stored by Class, subclass, Property and value within the Collections Base Class 300, referenced by the Applications logical view, is shown in FIG. 16. For example, comparison of FIG. 16 with FIG. 24B reveals the relationship between Products Requirements Base Class 200 and the Products Base Class 240. The Products Requirements Base Class 200 subclass of FIG. 16 contains the actual product requirements indicating what is needed to implement a particular system. Requirements Translation, however, accesses the Products Base Class 240 and replaces the product requirements with actual real-world values.

In a similar embodiment, rather than providing a number for each ranking, a function can be specified. The functional parameters in such an embodiment include technology features. The functions are designed to include information about ranking different technologies, thereby allowing the exemplary embodiment of the present invention to provide its own ranking. Thus, instead of merely translating subjective considerations to rankings to Real World Values 214 to products in a one-to-one relationship, more complicated relationships can be created.

The Requirements Translation Base Class 210 is shown in FIG. 7. The Requirements Translation Base Class 210 is linked to the Answers Base Class 140 and the Client Base Class 120 (FIG. 3), and searches these base classes for information from the user that can be used to identify a product that should be included in the recommended solution. Thereafter, given a subjective requirement for each object in the solution framework in response to a Question Block, processes corresponding to the Requirements Translation Base Class 210 insert the information, which may be subjective, into the Intermediate Results Base Class 510, which is an instance of the Solutions Framework Base Class 400. Any information provided by the user, including all the classes of products, the properties of importance to the user, and the value of the property specified by the user, are provided to the Requirements Translation Base Class 210 Base Classes.

Requirements translation analysis uses the guidelines and the other answers provided by the user, as well as the Requirements Translation Base Class 210 of products, to convert the subjective requirement into a numerical ranking and to place the numerical ranking in the solution framework. Thus, the first Intermediate Results object 510 contains a list of all resource requirements needed to satisfy the operating system, applications, and other features, but does not contain particular products or Real World Values 214. Conforming to User Guidelines and user Answers object, the intermediate results data object 510 contains a list of rankings of attributes for each class of products with which products must comply, in order to satisfy the criteria imposed by the user in the user interface processes. In process 512, the minimum resources for each product and also identified and used to constrain the solution. Thus, if the user's choice of processor constrains choice of memory, for example, then the memory size can be adjusted. At this point, however, the devices are specified only as, for example, "printer," with some minimum operating system or application requirements and a rating or ranking in terms of "low," "medium," or "high."

The Requirements Translation Base Class 210 contains processes that are linked to the Answers and Client Base Classes 120. These processes detect the validity of data structures within the Answers and Client Base Classes 120. These processes also extract requirements information, based on the valid Answers and Client Base Classes 120 data, and store the requirements information in the Solutions Framework Base Class 400. This requirements information may be subjective in nature. In other words, the information may indicate "the fastest microprocessor" or "the monitor of highest resolution."

The Requirements Translation Base Class 210 also accesses the Calibration Base Class 280, which contains an ordered ranking of all of the products in the Products and Collections Base Classes 240 and 300, and determines the ranking associated with the particular requirements information. In other words, the set of processes corresponding to the Requirements Translation Base Class 210 (rather than to the Solutions Framework Base Class 400) reads the requirements and user guidelines from the Solutions Framework Base Class 400 objects, and determines and stores the corresponding ranking associated with each product.

(1) PARTICULAR REQUIREMENT TRANSLATION SUBCLASSES

Referring now to FIG. 10, a particular subclass or table within the Requirements Translation Base Class 210 is shown, specifically the Desktop Base Requirements Translation Base Class 210a, in which each record identifies a product or products required to be connected to a desktop, all of the product or products having a common attribute. A first column 212 of the subclass or table indicates the classes, i.e. the types of products, for which the subclass or table is to be used. A second column 214 indicates the property, or attribute, that distinguishes the products within a particular class from one another. For example, among desktops, products are distinguished by overall ranking, cost, performance, features, expandability, scalability, fault tolerance, and security, possibly among other properties as well. For example, many end user's place emphasis on cost, while many other end users place emphasis on performance. Within each distinguishing property, several differences are ranked. For example, among desktops, one group of products has a first cost, while a second group of products has a second cost. The relative ranking of the different financial costs of the product is included in a third column 216. A fourth column 218 includes the concatenation of the second and third columns, such that the Calibration processes can read the internal representation. A fifth column 220 presents notes for ease of maintenance.

Referring now to FIGS. 11A and 11B, a Desktop Options Requirement Translation subclass 210b of the Requirements Translation Base Class 210 is shown. Like other tables of the Requirements Translation Base Class 210, the tables shown in FIGS. 11A and 11B may be translated according to the approach shown in FIG. 7. The Desktop Options Requirement Translation subclass identifies a product or products optionally includable in a desktop. Like the subclass or table within the Requirements Translation Base Class 210 of FIG. 10, the Desktop Options Requirement Translation subclass has five columns.

Referring now to FIG. 12, a Server Base Requirement Translation subclass of the Requirements Translation Base Class 210 is shown, in which each record identifies a product or products required to be connected to a server, all of the product or products having a common attribute. Referring now to FIG. 13, a Server Options Requirement Translation subclass of the Requirements Translation Base Class 210 is shown, in which each record identifies a product or products optionally includable in a server, all of the product or products having a common attribute.

Referring now to FIG. 14, a Server Base Requirement Translation subclass of the Requirements Translation Base Class 210 is shown, in which each record identifies a product or products required to be connected to a server, all of the product or products having a common attribute.

Referring now to FIG. 15, an Operating System Options Requirement Translation subclass of the Requirements Translation Base Class 210 is shown, in which each record identifies a product or products optionally includable in a operating system, all of the product or products having a common attribute. Referring now to FIG. 16, an Application Base Requirement Translation subclass of the Requirements Translation Base Class 210 is shown, in which each record identifies a product or products required to be connected to an Application, all of the product or products having a common attribute.

The first column 252 of the Requirements Translation Base Class 210 indicates the classes, i.e. the types of products, for which the table or subclass is to be used. The second column 254 indicates the property, or attribute, that distinguishes the products within a particular class from one another. For example, among desktops, products are distinguished by overall ranking, cost, performance, features, expandability, scalability, fault tolerance, and security, possibly among other properties as well. For example, many end users place emphasis on cost, while many other end users place emphasis on performance. Within each distinguishing property, several difference are ranked. For example, among desktops, one group of products has a first cost, while a second group of products have a second cost. The relative ranking of the different financial costs of the product is included in the third column 256. The fourth column 258 includes the concatenation of the second and third columns, such that the Calibration processes can read the internal representation. The fifth column 260 presents notes for ease of maintenance.

Each of the Base Classes shown in FIGS. 11–16 includes a number or records each having a class field, a Property Field 218, a ranking field, an Internal Representation Field 212, and Further Notes Field 216. Each record identifies a product or products optionally includable in a desktop, all of the product or products having a common attribute. Each of these Base Classes includes a number or records each having a class field, a Property Field 218, a ranking field, an internal representation field, and Further Notes Field 216.

In each of these figures (FIGS. 10–16), the Class field identifies the Subclass of the Products Base Class 240 and Collections Base Class 300 to which the product belongs. The Property Field 218 and ranking field allow subsequent sorting of the subclass or table by processes corresponding to the Calibration Base Class 280 (FIGS. 17A–17D). The Internal Representation Field 212 may be regarded as a concatenation or merger of the property and ranking fields, and it is the Internal Representation Field 212 that actually maps to the Calibration Base Class 280.

Although shown with only one Property Field 218, only one ranking field, and only one Internal Representation Field 212, in actuality the Base Classes in the Requirements Translation Base Class 210 provide information for ranking and sorting products according to a variety of properties. The Further Notes Field 216 facilitates maintenance, by describing generally the product or products belonging to the record. The Class field identifies the Subclass of the Products Base Class 240 (FIGS. 47–50) and Collections Base Class 300 to which the product belongs. The Property Field 218 and ranking field allow subsequent sorting of the subclass or table by processes corresponding to the Calibration Base Class 280.

The Internal Representation Field 212 may be regarded as a concatenation or merger of the property and ranking fields, and it is the Internal Representation Field 212 that actually maps to the Calibration Base Class 280. Although shown with only one Property Field 218, only one ranking field, and only one Internal Representation Field 212, in actuality the Base Classes in the Requirements Translation Base Class 210 provide information for ranking and sorting products according to a variety of properties. The Further Notes Field 216 facilitates maintenance, by describing generally the product or products belonging to the record.

c. REQUIREMENTS BASE CLASS

The Requirements Base Class 180 identifies the class, property and ranking of each product type, and provides a general overview of the number of different products available. Similar products, even if manufactured by different manufacturers, share a common row, due to their identical properties. Thus, the Requirements Base Class 180 is used to select a set of properties that are available in the particular geographical region and in the appropriate language. (In some embodiments, the tool assigns an identifier to each geographical region and language, referred to as a "geo".) The Products Requirements Base Class 200, on the other hand, provides a list of products, each identifying the necessary minimum resources, identified by class. Each product has a distinct row for each of its resources. However, there is no mapping in the Products Requirements Base Class 200 to Real World Values 214, nor to rankings.

d. PRODUCTS REQUIREMENTS BASE CLASS

The Products Requirement Base Class 200, also created within the view during the log in, operates to provide a list of products corresponding to the entry in the Requirements Translation Base Class 210. The Products Requirement Base Class 200 processes read the Answers Base Class 140 (FIG. 22B) to determine the categories of products (desktop computers, servers, notebook computers, gateways, and firmware such as operating systems) and properties of the products desired by the user. The Products Requirement Base Class 200 accesses the Products Base Class 240, and determines a list of products satisfying the requirements. The results of the Products Requirement Base Class 200 processes are then copied into the corresponding extension of the Solutions Framework Base Class 400.

3. NON-VOLATILE OBJECTS CREATED FOR EACH USER SESSION WITHIN THE VIEW a. CLIENT BASE CLASS

The Client Base Class 120 is either created or updated by each session. The Client Base Class 120 is a nonvolatile data structure containing partitions for each client. When a client session begins, the identity of the client and the machine identifier (ID) are identified and the relevant partition of the Client Base Class 120 is copied into the view, where it is accessible to the processes associated with the Client Base Class 120 subclasses and with the Solutions Framework Base Class 400 and the Recipe Base Class. Alternately, only a pointer, start and offset vector, or entry point to the Client Base Class 120 and the partition relevant to the client session are placed in the view. When the client session terminates, the Client Base Class 120 is not erased or invalidated, but remains in memory or in a nonvolatile storage until the next session. The Client Base Class 120 can therefore be used to ensure that new solutions are compatible with previously-acquired products, and that recipes are explained in terminology (user's spoken language and level of technical skill) with which the user is familiar.

The subclasses of the Client Base Class 120 include the Client History subclass, which stores information obtained in response to the Question Block questions and stored in the Answers Base Class 140. The Client Base Class 120 is used to maintain the client's session and state information. The Client Base Class 120 also includes a Client History subclass that stores information obtained during previous sessions for the given user, which can be accessed by processes corresponding to the various objects of the present invention. The Client History subclass contains the linkage between the client's ID and the session ID's for all previous runs of the tool by this client.

The procedures associated with the Client Base Class 120 have largely been described as belonging to the informational question blocks 102 described above. As stated above with reference to the first category of question blocks, once security validates the client, processes associated with the Client Base Class 120 determine whether the user wishes to create or update a computer system. Additional information obtained during the question blocks is also stored in the Client Base Class 120. For example, any preferences for country, language and ID are stored in this subclass or table. One of the first few question blocks also obtains information from the user identifying the user's level of skill, the type of hardware the user has previously purchased, and other information particularly relating to the user, and generally all of this information is stored in the Client Base Class 120 not previously obtained or that the user indicates a desire to change. The user's responses to the preliminary question block are used to retrieve and update the Client Base Class 120 (if this user has used the tool previously) or to create the Client Base Class 120 (if this user has not used the tool previously). The question blocks thus copied include some preliminary questions used to identify the user and some overall guidelines and requirements of the computer system that the user desires to implement.

The responses from the user are stored in a large database object, i.e., the Answers and Answers Collection sets of data objects, each object storing data pertaining to, and which can be used to select from among, a single variety of hardware or software products.

The control flow for a client session begins with a call from a user's browser to a preliminary question block on a server. By creating a view for each session, client and machine, the exemplary embodiment of the present invention allows several clients to use the same question block at the same time. Upon receiving the call, the preliminary question block dedicates a region of memory, referred to as the view, to the client session, copies some information into the view, and places an instruction for issuing calls to other question blocks into the view. Control then branches to the view.

The preliminary question block also includes processes for identifying other questions blocks to call, and entering entry points to the other question blocks into a queue. In those embodiments in which the entire Question Block Base Class 100 is copied into the view, only a relational vector is necessary in the queue. In the disclosed embodiment, once a question block process determines that all questions within the particular question block have been presented to the user and the user has either responded with an answer or declined to do so, another process corresponding to the question block searches the queue and identifies another question block pointer, entry point, or relational vector (i.e., offset). If any such exists in the queue, another question block is called, and its answers likewise placed in either the Client Base Class 120 or the Answers Base Class 140 (FIG. 22B), depending on the particular question block.

The process for building the Client Base Class 120 can be run simultaneously for several clients, each building a different Client Base Class 120.

The exemplary embodiment of the present invention assigns a distinct and unique session ID to each user session.

If the session is directed to expanding an existing customer system, pointers to previously stored information are created. If the session is directed to a new system, sufficient area within memory is reserved to store answers to introductory questions.

Internally, for each client and machine, the exemplary embodiment of the present invention stores a Client Base Class 120 of information as to the current status of the client's network. A Solutions Framework Base Class 400, generated by an interactive session with the exemplary embodiment of the present invention, describes a desired configuration the user may choose to implement.

b. ANSWERS BASE CLASS

The Answers Base Class 140 (FIG. 22B) contains the responses the user or client browser that initiated the tool provided in response to the question blocks. Answers to the questions are stored in the Answers Base Class 140 residing in memory, and are, like the Client Base Class 120, accessible to the processes of other Base Classes described below. Some of the answers in the Answers Base Class 140 define the number of computer terminals, workstations, printers, and other products in a desired integrated computer solution.

Subclasses of the Answers Base Class correspond to question blocks and to categories of question blocks. As stated above with respect to question blocks, the list of categories, like the list of questions in each category, is not exhaustive and is subject to change as technology develops and as customers' needs change. Some general categories of such objects include informational, objective, requirements, and guidelines categories. The Answers Base Class contains the responses provided by the user or client browser that initiated the exemplary embodiment of the present invention in response to the Questions. The Base Class view is a logical join of the Collection, Class, subclass and Property Base Classes into the logical Base Class.

Other subclasses of the Answers Base Class 140 (FIG. 22B) include the AnswersCollection subclass, which is used to store the client responses and values calculated by the tool for the given client session. The Answers Base Class 140 and AnswersCollection subclass group the clients' answers, and place the clients' answers in appropriate locations, stored by property within the Base Classes, identified by client Session ID, the Answer Object ID, and the client's Machine ID. Information is tabulated by Class, subclass, Property and value within the Collections Base Class 300, referenced by the Applications logical view.

Another subclass of the Answers Base Class 140 is the Applications Subclass 290, in which information regarding software is stored. The Applications Subclass 290 may also be implemented as a separate subclass or table, linked to the Collections Base Class 300. The Applications Base Class may be implemented as a partition, or as a separate subclass or table, or a region within the Base Classes.

Referring to FIGS. 22A–22C, the AnswersCollection subclass (dynamic objects) and Collections subclass (static objects) have four further subclasses, which are identically structured. The four sub-Base Classes are: ObjID(PK) 620, containing an Object ID 622, a Primary Key 624, and an Auto Increment 626; ClassID(FK) 630, containing a Class ID 632, Foreign Key 634 to a Subclass Table; SubClassID (FK) 640, containing a Sub Class ID 642 and a Foreign Key 644 to a subclass table; and PropertyID(FK) 650, containing a Property ID 628, and a Foreign Key 638 to a Property Base Class. Each of the four sub-tables has Property Value 648, Static Flag 614, Discarded Flag 616, and TimeStamp fields 618.

The Class sub-table ClassID(PK) contains a Class ID, a Class Name (Indexed), a Primary Key, and Auto Increment. The Subclass sub-table SubClassID(PK) contains a Subclass ID, a Subclass Name (Indexed), a Primary Key, and Auto Increment. The Properties sub-table PropertyID(PK) contains a Property ID, a Property Name (Indexed), a Primary Key, and Auto Increment Text. The indexed names cross reference text by name.

An Answers Base Class 140 contains the user's responses to questions asked at the Phase I solution framework process. The answers data object is created by the question blocks pertaining to Phase I. However, if additional information is necessary, Phase I objects and processes may still be called; otherwise, some aspects of Phase II cannot be completed.

The Base Class view is a logical join of the Collection, Class, Subclass and Property Base Classes.

c. THE SOLUTIONS FRAMEWORK BASE CLASS 400

(1) THE STRUCTURE OF THE SOLUTIONS FRAMEWORK BASE CLASS

The Solutions Framework Base Class 400 is one of the two data structures comprising the eventual output of the session. Its basic framework is established at the beginning of the session, but the basic framework merely reserves some memory and allows the creation of extensions defining products and networks.

The Solutions Framework Base Class 400 is set up when the session is initiated, and during each phase is updated. The extensions of the Solutions Framework Base Class 400 are used to store the results of the processes corresponding to User Guidelines, Requirements, Products Requirement Base Class 200, and Requirements Translation Base Classes. When the Solutions Framework Base Class 400 is created upon Login, only an empty Base Class having invalid pointers to other areas of memory is established. As the various procedures begin, however, data is added to the view and pointers to the added data make the added data into extensions of the Solutions Framework Base Class 400.

The user's responses to the preliminary questions are used to retrieve and update the Solutions Framework Base Class 400 and Recipe Base Class (FIG. 3) (if this user has used the tool previously) or to create a Solutions Framework Base Class 400 and Recipe Base Class (if this user has not used the tool previously), which is stored in the view.

The Solutions Framework 400 initialization processes generally produce an empty solution framework internal representation, as shown in FIG. 4. Although the various numbers of nodes and object attributes are empty, a general rudimentary structure has been determined. The general solution thus determined, as shown in FIG. 4, is developed by a group of user interfaced objects operating within the solution framework. The solution framework is represented as a data object as shown in FIG. 4. Referring again to FIG. 4, a solution space within the database is provided at the conclusion of Phase I. The empty solution framework includes regions of memory in which data can subsequently be written. Each LAN 402, WAN 414, Internet 416, workgroup 404, and computer system (i.e., desktop 406, server 408 subclass, or portable 410 within the Solutions Framework Base Class 400), as well as each peripheral device, comprises a separate data object within the solution database.

Referring now to FIG. 4, a solution framework internal representation of the solution objects database reservation is shown. Each subclass in the Solutions Framework Base Class 400 is a data structure defining a device, operating system, software application, or other system element. The objects (subclasses) in FIG. 4 each have a first record identifying the type of product. The instance of the first class (i.e., record in the subclass) identifies the product as a printer, desktop 406, or other product type. The other instances of the classes identify what "make and model" of printer, desktop 406, or other product type is to be included in the solution. Possibilities are given in FIGS. 18A–18C.

To construct a generalized solution framework having the appropriate vacancies that when filled define the optimum solution satisfying the needs of the user, the exemplary embodiment of the present invention creates empty objects corresponding to generalized classes of products and services. These empty objects are "filled in" during Phase I, Phase II and Phase III.

Thus, the Solutions Framework Base Class 400 phase is a comprehensive interactive run-time database building tool that creates both a customer profile and a highly-generalized description of a system. Small objects having a few questions each are used to guide the session, and each object determines what additional information is necessary and launches appropriate objects accordingly. Although the novice mode requires more time from the user than expert mode 400c, the novice mode allows a user with limited computing experience or knowledge to use the exemplary embodiment of the present invention to arrive at a suitable solution appropriate to the computing needs.

As is further shown in FIG. 1, the novice mode high level flow 400b is shown. Upon conclusion of the guidelines question blocks 108, an initial solution framework is determined in Phase I of an analysis step. Subsequently, detailed product questions are presented to the user, who may enter detailed product question answers pertaining to particular node requirements. For example, if the solution relates to an anticipated computer network in a particular business, various personnel of the business may have different levels of familiarity with particular computer products, may have training on some products and not on others, or may simply prefer to use one type of product over another. The exemplary embodiment of the present invention asks detailed questions for each piece of equipment, gathers sufficient information to allow it to understand the capacity and speed requirements of the equipment and how the equipment must be connected to the network in order to satisfy the equipment s need for data. Analysis of the responses to the detailed product questions constitutes the Phase II of the analysis, identifying particular product recommendation.

Often the initial solution framework is hierarchal in nature, although a more circular or distributed network topology may be derived. In the initial hierarchical structure, at the highest level, the solution includes a group of inter-networking objects, including LANs 400, WANs 414, and Internet 416 connections. Each of these data objects can contain similar data objects at a lower hierarchal level. Some of the LANs 402, however, contain other data objects as well. For example, a LAN 402 can include a number of workgroups 404. Each workgroup 404 includes a number of computer systems interconnected locally, typically including a relatively small number of desktop 406 or portable 410 computers locally connected to a server via a hub 424. The various computer systems, whether they be desktop 406 computers, portable computers, or the server, serve as nodes in the workgroup 404 connecting to the hub 424. The various workgroups within the LAN 402 may be coupled one to another by interconnecting hubs 424 via a switch 422.

Figure 43:
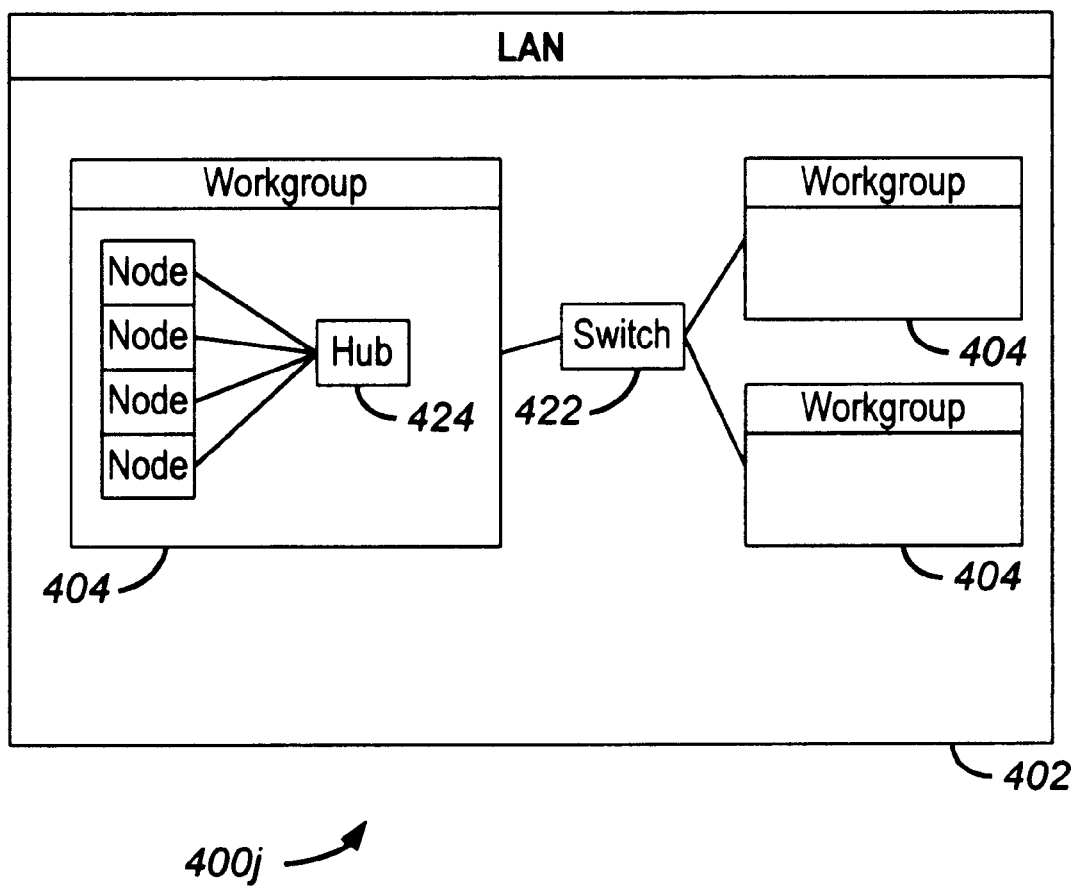
FIG. 43 shows inter-network hierarchy of Phase III.

The hierarchal nature of the LAN 402, workgroup 404, and node relationship is illustrated graphically in FIG. 43, showing the inter-networking hierarchy 400j. Each object in the solution has a pointer to each of the other objects it hierarchically contains, and a pointer back to the object in which it is hierarchically included. Because of this dual linked list object, non-hierarchical or circular networks of shared or distributed processors, for example, can easily be represented as a set of objects. Each data object includes a pointer to the data object in which it is abstractly included. Each data object also includes a pointer to each data object which it abstractly includes. Peripherals such as printers are also included in the Solutions Framework Base Class 400 extensions, providing addressable output from each of the computer systems at the lowest level or otherwise within the workgroup 404.

The Solutions Framework 400 object contains an extensible Base Class having subclasses for each hardware and software product and for each network node in the overall system. Each extension of the Solutions Framework Base Class 400 corresponds to a product in the recommended system or network. Initially, the Solutions Framework Base Class 400 is merely a list of invalid pointers to other memory locations in the view. But as products are added to the system, the pointers are validated and written to point to the objects defining the product. Each object thus added is a subclass of the Solutions Framework Base Class 400. Adding products to the system is either implemented by writing information to the view, or by writing pointers within the subclass pointing to pre-written descriptions of products.

Products fall into nine categories: a server 408 subclass, a printer, a WAN 414, a desktop 406, a LAN 402, an Internet 416, a portable 410, a workgroup 404, and a remote access device, all of the Solutions Framework Base Class 400. Each extension of the Solutions Framework Base Class 400 corresponds to a product within one of these nine categories. The Solution Base Class contains subclasses for each sub-network or work group in the solution, classes for each Internet 416 and WAN 414 of the Solutions Framework Base Class 400 group, and an instance for each node, identifying what products belong to the node.

A LAN 402 has corresponding thereto LAN 402 subclass of the Solutions Framework Base Class 400, containing a workgroup list 402a, a WAN 414 pointer, an Internet 416, and other attributes. The LAN 402 subclass of the Solutions Framework Base Class 400 is further expandable to include additional information. The workgroup list 402a includes a pointer to a workgroup 404 subclass that includes a LAN class, a number of nodes class, a node list, and an other attributes class, as well as an expandable region of the database. The LAN class includes a pointer returning to the LAN 402 subclass of the Solutions Framework Base Class 400. The workgroup 404 subclass, as stated, includes a node list. The node list includes a list of pointers to the nodes included in the workgroup 404. Each node in the workgroup 404 is, in the solution represented in FIG. 4, either a desktop 406 or a server in the workgroup 404 subclass. Each node in the workgroup 404 includes a reference or pointer back to the workgroup 404 subclass in which it is included.

Generally, the procedures associated with the Solutions Framework Base Class 400 can be divided into five categories. In addition to the general structure of the Base Class and its extensions/subclasses, the five categories are: Product Selection, Phase I; Product Selection, Phase II; Product Selection, Phase III; Internet 416 and other internetworking devices of the Solutions Framework Base Class 400; and consistency and integrity check, Phase IV. Each of these is described in detail below.

(2) SOLUTIONS FRAMEWORK BASE CLASS DURING PHASE I

During Phase I, processes associated with the Solutions Framework Base Class 400 read the Client and Answers Base Class 140 (FIG. 22B), and determine the number of extensions and the type of product represented by the subclass (i.e., the extension). A first set of processes associated with the Solutions Framework 400 read Base Classes in the User Guideline Base Class 160 and the Requirements Base Class 180, described below, and provide data to the solution framework 400 and Recipe Base Classes (FIG. 3). Phase I creates a skeletal overview of the solution framework, based upon requirements and guidelines provided by the user during the interactive session and stored in the Answers Base Class 140. At the end of Phase I, User Requirements and Guidelines (in common English) are stored in the Solutions Framework Base Class 400.

A first set of processes associated with the Solutions Framework Base Class 400 pertain to Phase I, and interpret the Answers Base Class 140 and the Client Base Class 120 and determine the basic structure of the Solutions Framework 400 and the Recipe Base Classes (FIG. 3). The processes access the Answers Base Class 140 and Client Base Class 120 directly, and extend the Solution Framework and Recipe Base Classes to include specifications of products (both hardware and software) and are used to supply the various subclasses of the Solutions Framework Base Class 400 and Recipe Base Class (FIG. 3) with basic guidelines and requirements. Then, a second set of processes associated with the Solutions Framework Base Class 400 copy the User Guidelines Base Class 160 and the product-specific Products Requirements Base Class 200 into the corresponding Solution Framework subclass. All the relevant information about this application stored by Class, Subclass, Property and value within the Collections Base Class 300, referenced by the Applications logical view.

Execution of Phase I can be "short-circuited" by execution of the Expert mode 400c. Rather than performing the analysis normally associated with Phase I, Phase II, and Phase III, operating under the Expert mode 400c allows the user to select products by name directly from the Products Base Class 240. Operation under the Expert mode 400c can still access Phase I, Phase II, and Phase III processes, but only in the "Assist Me" submode.

(3) SOLUTIONS FRAMEWORK BASE CLASS DURING PHASE II

Once the number of printers, computer terminals, and other devices of a general nature have been determined, actual product selection is necessary. In Phase I, each of the object classes shown in the solution framework representation of FIG. 4 corresponds to, or spawns, additional processes for obtaining particular product information relating to the object to "fill in" details of the object. These processes obtain specific product, model number, and manufacturer information, preferably in parallel. When created, these objects contain pointers to locations in the Answers Base Class 140 and Client Base Class 120. If the corresponding entries of the Answers Base Class 140 and Client Base Class 120 are empty or invalid, additional question blocks may be called. Also, requirements and user guidelines are copied into the Solutions Framework Base Class 400. Thus, at the conclusion of Phase I, each extension of the Solutions Framework Base Class 400 contains a products requirements and a user guidelines field. These products requirements and a user guidelines may be seen as subjective requirements, obtained directly from the Answers and Client Base Classes 120.

As described above in reference to the Requirements Translation Base Class 210, processes in the Requirements Translation Base Class 210 detect the validity of data structures within the Answers and Client Base Classes 120, and operate thereon to store requirements information that may be subjective in nature. In other words, the information may indicate "the fastest microprocessor" or "the monitor of highest resolution." A first set of processes corresponding to the Solutions Framework Base Class 400 maps the Requirements Translation Base Class 210 into the Solutions Framework Base Class 400. As described elsewhere in this disclosure, the Requirements Translation Base Class operates on the Answers and Client Base Classes 120, and stores its results in the Solutions Framework Base Class 400. The Requirements Translation Base Class 210 also accesses the Calibration Base Class 280 (FIGS. 17A–17D), which contains an ordered ranking of all of the products in the Products and Collections Base Classes 240 and 300, and determines the ranking associated with the particular requirements information. In other words, the set of processes corresponding to the Requirements Translation Base Class 210 (rather than to the Solutions Framework Base Class 400) reads the requirements and user guidelines from the Solutions Framework Base Class 400 objects, and determines and stores the corresponding ranking associated with each product.

Referring now to FIG. 5, a representative product recommendation data flow is shown. A set of processes corresponding to each object performs other functions to fill in the missing data. Also shown in FIG. 5, an analysis process 508 within the Solutions Framework Base Class 400 and its corresponding subclasses receives information from the Answers Base Class 140 (FIG. 22B), the User Guidelines Base Class 160, and the Requirements Translation Base Class 210, and stores its intermediate results within the Solutions Framework Base Class 400. This causes the Solutions Framework Base Class 400 to become an Intermediate Results Base Class 510. The Intermediate Results Base Class 510 within the Solutions Framework Base Class 400 stores the minimum and maximum requirements and user guidelines as provided by the user.

The First Intermediate Results object 510 may be viewed as a later instance of the Solution Framework, in which operating system, platform, and software specifications have been inserted.

As described above in reference to the Calibration Base Class 280, processes in the Calibration Base Class 280 detect the validity of the Intermediate Results Base Class 510 and operate thereon to produce real-world values. A third set of processes corresponding to the Solutions Framework Base Class 400 maps the Calibration Base Class 280 into the Solutions Framework Base Class 400. As described elsewhere in this disclosure, the Calibrations Base Class operates on the Intermediate results, and stores its results in the Solutions Framework Base Class 400. A set of processes corresponding to the Calibration Base Class 280 (rather than to the Solutions Framework Base Class 400) determines based on the necessary for the Intermediate Results and calibrates these minimum resources to Real World Values 214. Then, constrained by the user guidelines, the tool determines products and solutions 530 having the Real World Values 214. A Second Intermediate Results Base Class 540, a list of multiple products having the Real World Values 214 in each object, comprises another instance of the solution framework. The framework is analyzed and presented to the user. Thus, the Solutions Framework Base Class 400 contains, at the termination of the third set of processes, Real World Values 214.

A fourth set of processes corresponding to the Solutions Framework Base Class 400, the search and match process 282, searches the Products Base Class 240 and the Collections Base Class 300 to identify the products and solutions 530 having the "real world" values that match the user guidelines included in the output of the User Guidelines Base Class 160. Matching products are listed in a second Intermediate Results Base Class 540, actually another instance of the Solution Framework, containing a list of all matching products. The results are yet another instance of the Solutions Framework Base Class 400, stored as the second Intermediate Results minimum resource requirement data object. As evident from FIG. 5, the Search and Match process uses information from the user guidelines, established during the initial user interaction. Product selection, like the solution framework, can be specified at any of a number of levels of abstraction using data-driven objects.

The fourth set of processes is a search and match process 282 that may return a number of products. For example, several processors may have speeds of 133 MHz or several processors may differ only in speed and the user may have omitted speed as a product guideline. Both the incremental editor (in both novice and expert mode 400c) and the "Assist Me" feature (expert mode 400c only) allow subsequent isolation of a single product for each object in the solution framework.

The exemplary embodiment of the present invention provides information to the user and allows the user to change or refine the product selection, using the "Assist Me" feature and the incremental editor. Where a particular model of printer, for example, is not identified by the user, the fourth set of processes recognizes that several models of printers are available.

A fifth set of processes corresponding to the Solutions Framework Base Class 400 allows secondary considerations to narrow the list of products where the fourth set of processes returns more than one. Identifying the fact that the different printers listed have different speed, price, availability, compatibility, and other attributes, the Phase II objects evaluate information previously provided by the user to determine what further information is necessary to isolate a particular model of printer. Two types of information are sought: the value (e.g., "I need at least 100 characters per second") and the relative importance (e.g., "Price is more important to me than speed, and I can live with a slower speed")

The fifth set of processes, also corresponding to the search and match process 282, can be explained through an example. If, in response to a question block object, a User Guidelines Base Class 160 indicates that the user places a premium on cost, and a somewhat less importance to performance, but has specified no other user specified guidelines, then the search and match process 282 counts the number of products in the product class and selects the half of this number (but at least one) which conform most closely to the cost criteria. From this remaining number, the exemplary embodiment of the present invention considers and selects 50% of the number of products, selecting those which conform most closely to the performance criteria. If the user has specified lowest cost, then the search and match process 282 collects the products with the lowest cost. However, if best value were selected as the cost criteria, then the mid-most 50% would be selected. (In other words, "best value" ranks each product according to its proximity to the median of the products in the class.) Every criteria entered by the user reduces by up to 50% the number of products placed in the Second Intermediate Results Base Class 540, although at least one product is always included. In some embodiments, if after all criteria are considered, more than one product remains, then the entire search and match process 282 is repeated, selecting from among the remaining list of products.

Phases I and II analysis must be repeated for each product in the overall system or network. These phases rely heavily on the responses the user provides to the question blocks and that are stored in the Answers Base Class 140 (FIG. 22B). However, as the analysis continues, additional questions may need to be asked. As stated above in the section pertaining to the question blocks, the fifth category of question blocks includes detailed product questions 110. These detailed product questions 110 are typically called after some product definition has occurred, and identify additional products that should be included with the products, and additional question blocks that should be called before a final recommended solution is presented to the user. Referring now to FIG. 9, an analysis for a desktop system is shown. Once a Desktop 406 subclass is established in the Solutions Framework Base Class 400, the Solutions Framework Base Class 400 recognizes that other question blocks need be called to select products, parameters, operating systems, and applications, as well as personal preferences and expected future trends, corresponding to the desktop 406. Similar detailed product questions 110 are called when notebook computers, personal printers, other I/O devices, and other products are identified.

At the end of Phase II, a single product has been selected to comply with the requirements and guidelines. Also, during the processes that are collectively referred to as Phase II, the intermediate results (rankings) of the devices are stored in the corresponding extension of the Solutions Framework Base Class 400.

(4) SELECTION OF A BASE SERVER, AND CREATION OF A BASE SERVER SUBCLASS AS AN EXTENSION OF THE SOLUTIONS FRAMEWORK BASE CLASS

Phase II, the product selection phase, also includes base server selection. Base server selection may be considered part of Phase III, however, since it involves coordination with other products in the system or network.

Selecting a server can be problematic since the base server model should be matched to the number of processors and their rating, the amount of memory required, the total hard disk size required on the server before any fault tolerance scheme is applied, the number and size of multiple hard discs, the configuration and petitioning of any hard discs, and the fault tolerance strategies such as RAID, recovery server or reversionary hardware. The most important considerations in selecting a server are cost and fault tolerance, since servers vary so widely in price and since service calls after a failure are fairly expensive. The exemplary embodiment of the present invention evaluates the server load, i.e. the number of users and their processing load, as well fault tolerance requirements and server functions.

Figure 31:
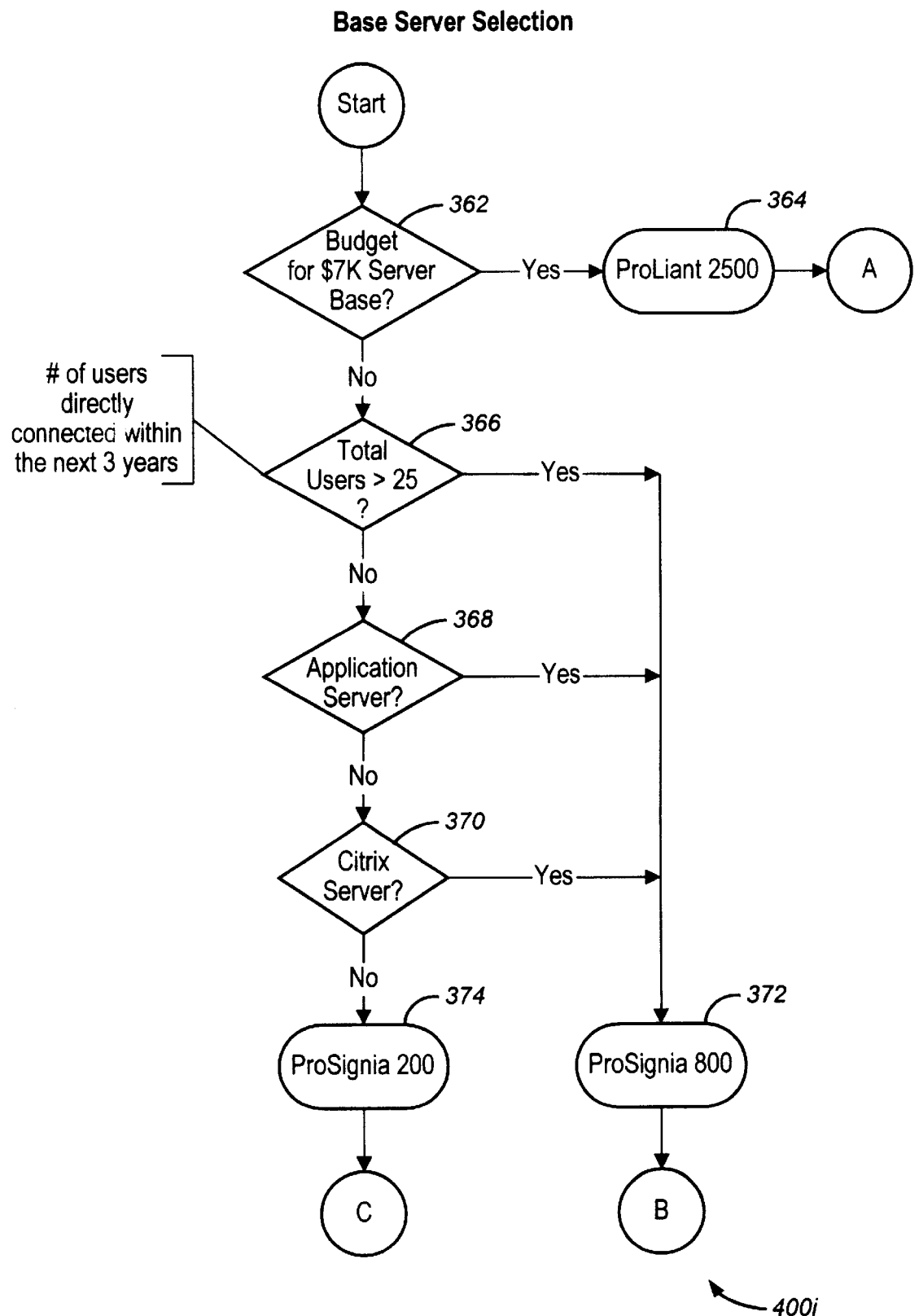
FIG. 31 shows base server selection.

Referring now to FIG. 31, a sample server selection process according to the present invention is illustrated. Processes 400i of the Solutions Framework Base Class 400 analyze the user's responses stored in the Answers Base Class 140 (FIG. 22B), the Client Base Class 120 (FIG. 22J) and Client History Table 120b (FIG. 22K), and other information to determine an appropriate base server recommendation. The initial constraint on base server selection is the customer's budget 362. If the budget of the user is only sufficient for a $7,000 server base, then a Compaq ProLiant 2500 is recommended 364. If the user's budget can afford more processing capacity at the server, then if either the number of users directly connected to the server within the next three years is greater than 25 users 366, or the server will be used to run applications 368, or if the server is Citrix server 370, then a Compaq ProSignia 800 is recommended 372. If the total number of users does not exceed 25, the server is not an application server, nor a Citrix server, then a Compaq ProSignia 200 is recommended 374.

Figure 32:
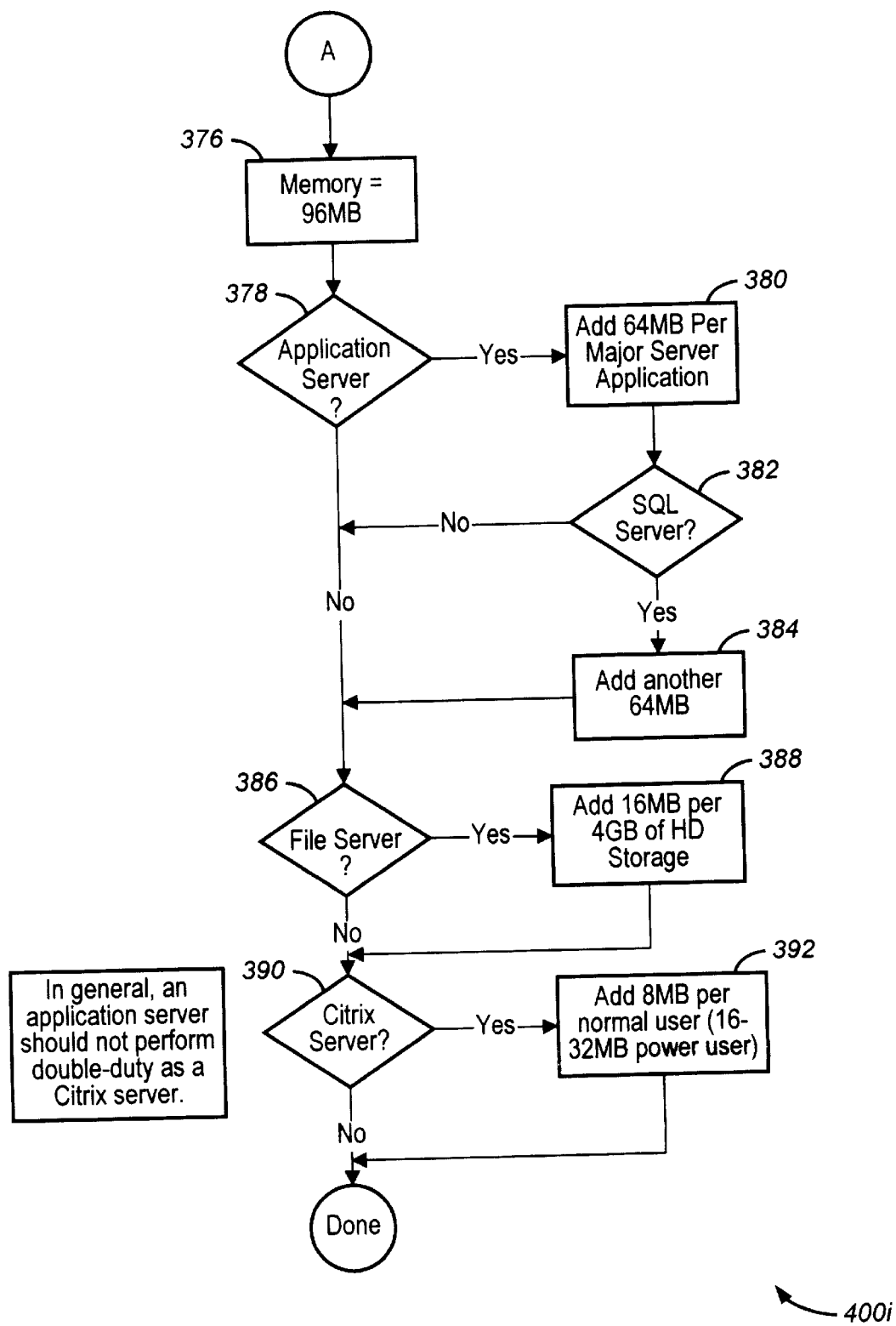
FIG. 32 shows a ProLiant server performing memory sizing.

Referring now to FIG. 32, if a ProLiant 2500 is recommended, memory is set at 96 megabytes 376. If the server is an application server 378, 64 megabytes per major server application are added to the server memory 380, and if the server is a SQL server 382, and additional 64 megabytes are added 384. If the server is a file server as well 386, then 64 megabytes are added per 4 gigabytes of hard disc storage 388. The additional 16 megabytes allow file access and manipulation. Further, if the server is a Citrix server 390, an additional 8 megabytes is added per normal user 392, and 16 to 32 megabytes is added per power user. While these recommendations may be provided to the exemplary embodiment of the present invention user, in general, an application server should not perform double duty as a Citrix server.

The determination of the appropriate base server is determined as any other product, by reference to the Answers Base Class 140 (FIG. 22B) (and to the Client Base Class 120). Question blocks pertaining to the server selection include: the length of time data will be kept on line, the number of data files which will be produced per user per time period, each data file's average size, the expected size of any database, and the amount of disc space needed for the operating system and application code. Also, questions should be directed to determine the level of RAID the customer requires.

A Final Selection Analysis process 542 sorts through the lists of equivalent products and recommends a product based on other considerations. The final product recommendation this produced is the final instance of the Solution Framework of FIG. 4.

(5) PHASE III SOLUTIONS FRAMEWORK BASE CLASS PRODUCT EXTENSIONS: INTERNETWORKING SELECTION

The Solutions Framework 400 processes also provide, in Phase III, a description of how products can be implemented and installed into the recommended solution. Each Solutions Framework 400 extension contains such information. Various gateways, switches 422, routers 426, and other interconnection devices may be considered as additional products and may be assigned their own extensions of the Solutions Framework Base Class 400, or may be regarded as part of other products with which they are typically collocated and stored in the corresponding subclass.

Procedures performing the interconnection analysis are, in some embodiments, contained within the Solutions Framework Base Class 400 and are spawned when the product selection is substantially complete. In other embodiments, the procedures performing the interconnection analysis are contained in other areas of memory, and are called from the Solutions Framework Base Class 400 when the product selection is substantially complete.

The inter-networking questions relate to the need for firewalls or other security devices among the various network and workgroup 404 topologies, and can be used to identify the need for additional server, hubs 424, routers 426, switches 422, and even cables. Firewalls are mechanisms used in a computer network to prevent, or at least reduce the risk of, unauthorized access to secure data structures. The inter-networking questions are analyzed in the Phase III analysis, culminating in a recommended solution. The recommended solution contains products and inter-networking structures satisfying the detailed product, guidelines, requirements, and questions, corresponding to the Objective Question Blocks 104. However, using the incremental editor, a user of the exemplary embodiment of the present invention can add additional information, by replacing any product in the recommended solution with a product having a slightly higher or slightly lower rank (the concept of rank will be described below), and the user may continue to add additional information via the incremental editor until a final solution with which the user is satisfied is derived.

In a fully-networked world, some aspects of a customer's needs are beyond control. Many businesses network with other locations and even other businesses over Wide Area Networks (WAN 414 of the Solutions Framework Base Class 400's) or over the Internet 416 of the Solutions Framework Base Class 400. Accordingly, a solution may be incomplete without consideration of a customer's inter-networking needs.

Having developed an optimum product recommendation for each user requirement, the exemplary embodiment of the present invention initiates Phase III analysis to refine the network topology requirements and select the inter-networking components that implement the LAN 402, WAN 414, or Internet 416 of the Solutions Framework Base Class 400, or other connectivity requirements. This refinement/selection process creates and completes the attributes of each inter-networking object by analyzing the answers to the questions posed in the "inter-networking detailed needs" phase 526, interconnecting the products derived in Phase II with other devices over the inter-network.

Figure 25:
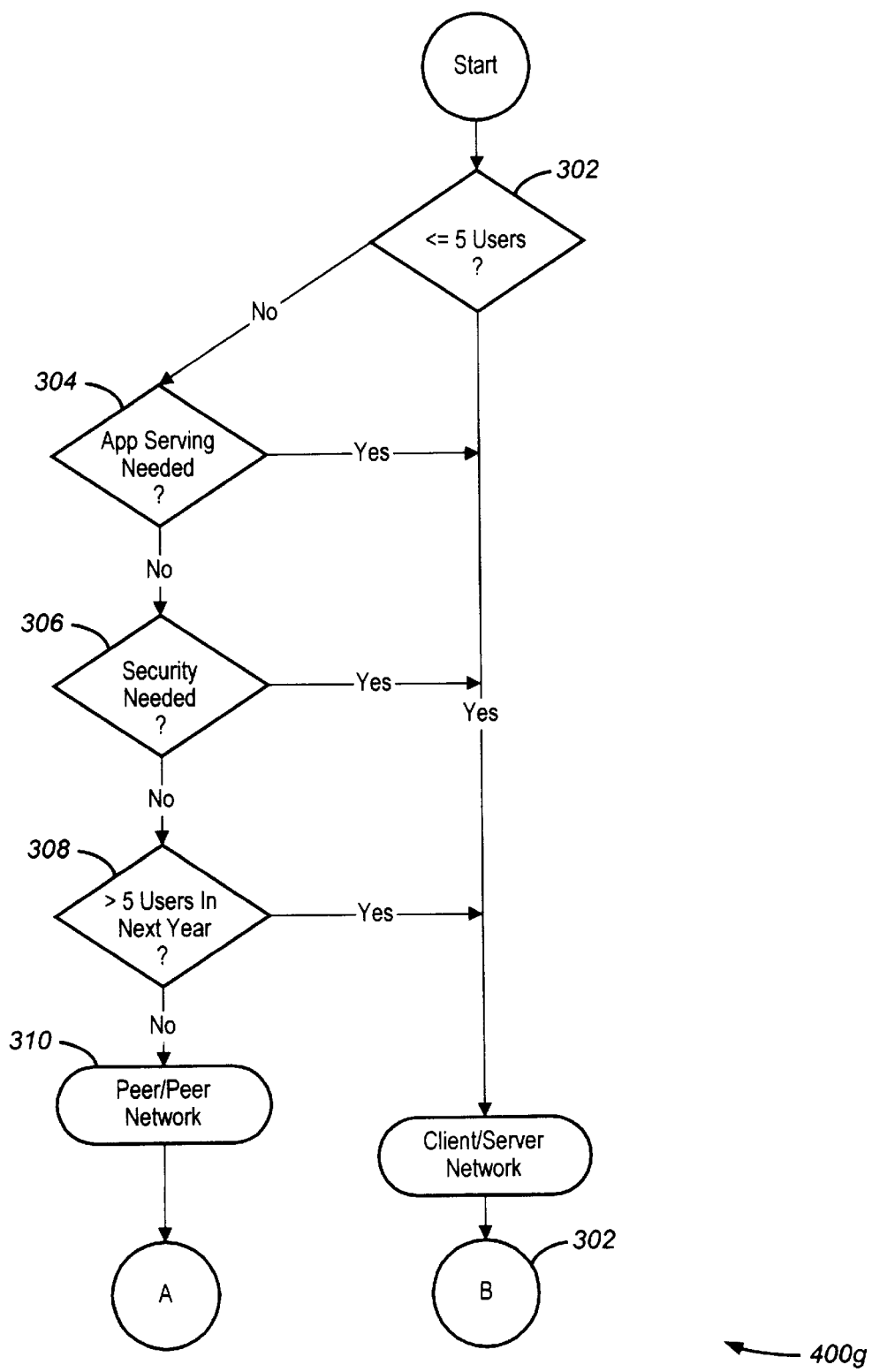
FIG. 25 shows peer-to-peer versus client server network.

Inter-networking is a highly complex set of processes, basing upon the solution framework answers and the product selection of Phase II a complete inter-networking solution. Phase III also includes additional processes determining the level of security provided by the various regions of the solution topology. However, because the types of networks are few in number, straightforward formulaic analysis operating on information collected during Phase I can provide the optimum network. During Phase I, various questions relating to overall network topology are presented to the user in easy to understand language. Some of these questions relate to factors useful in determining whether a peer-to-peer network architecture, or a client/server network architecture, is the more appropriate solution. Now, in Phase III, the selection of particular products from Phase II can be inserted into the skeletal framework from Phase I to produce a "network map" showing interconnections among products and a set of implementation instructions or "recipe" for connecting the various products. Referring now to FIG. 25, information obtained from the user during the user interface processes of Phase I and Phase II are used to determine whether a peer-to-peer or client/server network architecture is preferable. The following exemplary process illustrates this determination.

(6) CONFIGURING THE LAN (PHASE III)

The network architecture is determined, generally, by various processes 400 g of the Solutions Framework Base Class 400, particularly during Phase III analysis. These processes 400 g examine information in the Answers Base Class 140 (FIG. 22B), and determine a recommended network or system architecture based on the user's responses. For example, if more than 5 users 302 will use the system, a peer-to-peer network is generally inappropriate, and a client/server network is recommended. Control branches to "B" 304, as indicated at the bottom of FIG. 25 and top of FIG. 26. It will be apparent, however, that some recommendations can be overridden by a VAR or consultant using the exemplary embodiment of the present invention, e.g. if a customer (user) has an embedded, peer-to-peer network and seeks merely to add an extra node. Generally, however, if more than 5 users will be using the network, the exemplary embodiment of the present invention will (and the VAR should) recommend a client/server network.

FIG. 25 reveals other situations in which a client/server network is preferable to a peer-to-peer network. Initially, the number of users entered in Phase I is consulted at step 302. If no application serving is needed 304, no security is needed 306, and no more than 5 users will be using the system in the next year 308, then the system solution is preferably a peer-to-peer network 310. However, if application serving is needed 304, if security is needed 306, or more than 5 users will be on the system in the next year 308, a client/server network is preferable 304.

Figure 26:
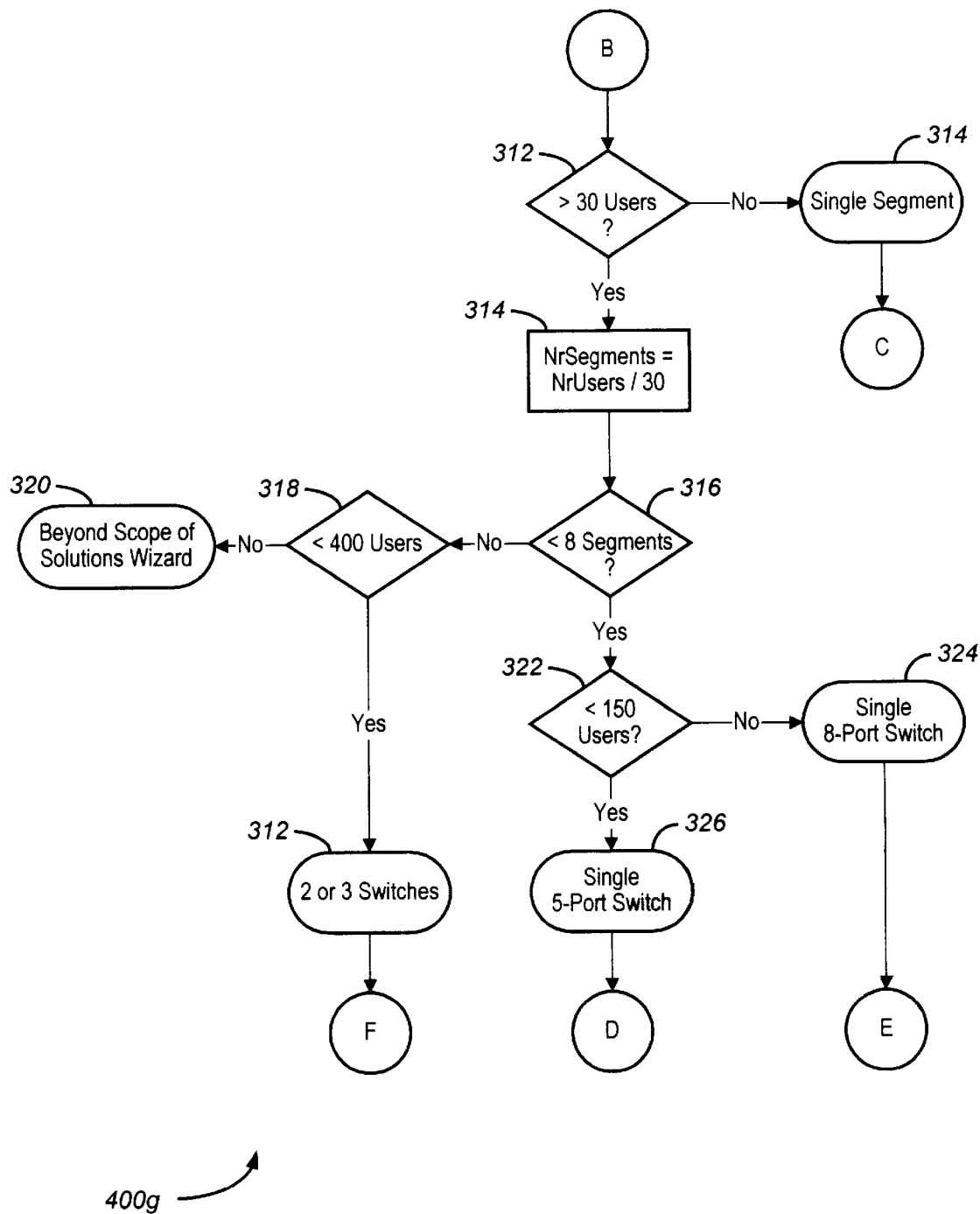
FIG. 26 shows segmenting client/server networks.
Figure 27:
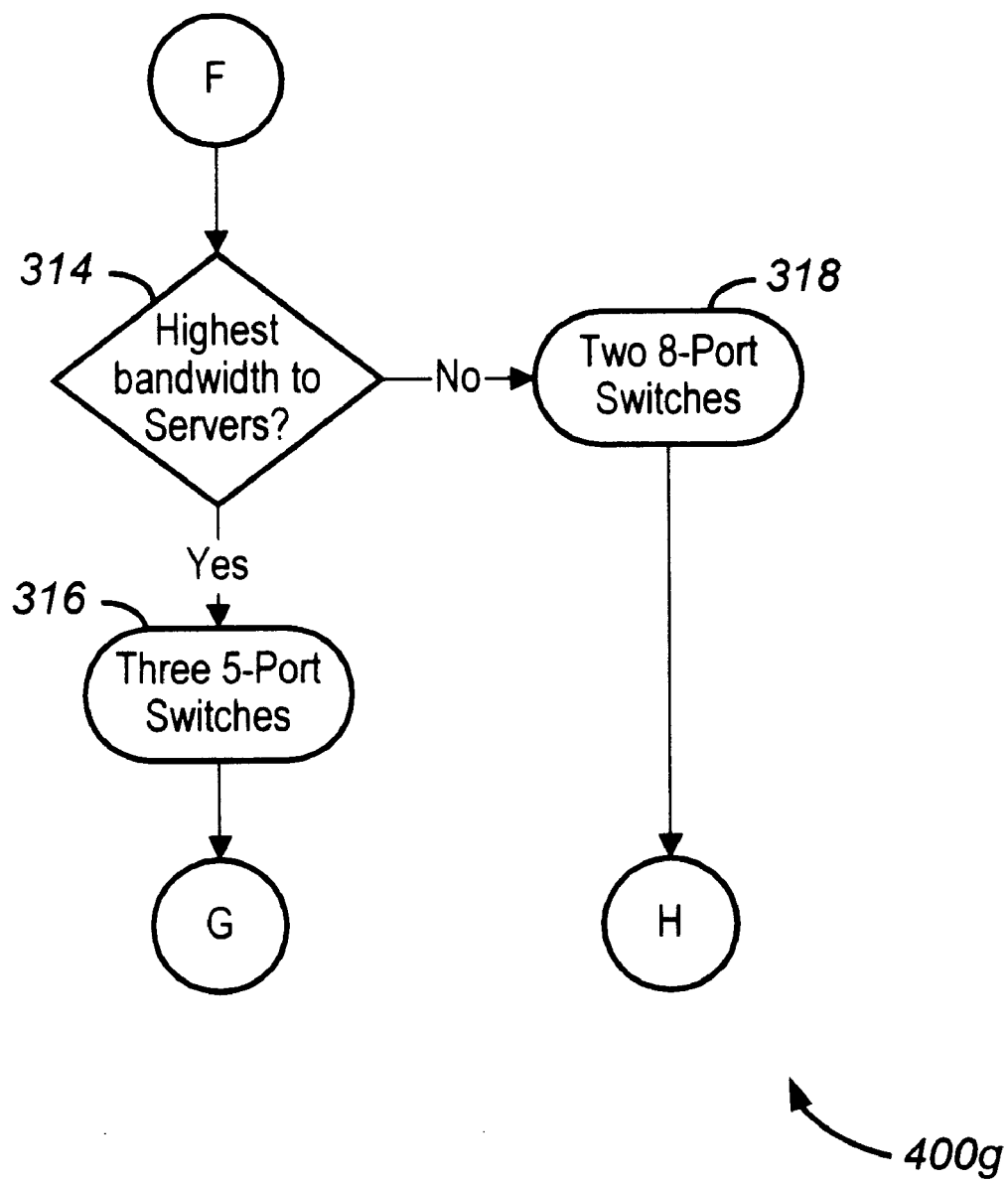
FIG. 27 shows 5-port versus 8-port switch in networks.

Referring to FIG. 26, once a client server network is determined, a number of switches 422, number of ports per switch 422, and whether a switch 422 is needed at all must be determined. If there are no more than 30 users on the system 312, a segmented client server network 314 is not preferred. According to the process illustrated in FIG. 26, if more than 30 users are on the system 312, optimal segmentation places 30 users on each segment 314. If this results in more than 8 segments 316 (i.e., more than 240 users), a limit is checked to determine 318 whether the number of users exceeds 400. If at least 400 users are on the system, the solution is beyond the scope of the exemplary embodiment of the present invention, and control flow terminates 320. If at least 8 segments (240 users) are on the system, but less than 400 users are on the system, 2 or 3 switches 422 are needed 312, and control branches to "F" at the top of FIG. 27. Referring to FIG. 27, in such a case, 3 5-port switches 422 are used 316 if the highest bandwidth goes to the server 314, while 2 8-port switches 422 are used 318 if the highest bandwidth does not go to the server.

Referring again to FIG. 26, if fewer than 8 segments (i.e., fewer than 240 users) are on the system 316, a determination is made as to whether the number of users is at least 150 (if there are at least 150 users on the system 322, a single 8-port switch 422 is used 324. If there are fewer than 150 users on the system, a single 5-port switch 422 is used 326.)

Referring again to FIG. 25, in a peer-to-peer network a single 5- to 8-port 10-megabytes-per-second hub 424 (low end) is used, with 10-megabytes-per-second network interface controllers in each desktop 406 and CAT 5 UTP cables and connectors are used. If a single segment is required (no application serving, security, or large number of users in the next year), multiple 8- to 16-port 10-megabytes-per-second hubs 424 (low end) are used, the hubs 424 being cascaded together. A 10-megabytes per second network interface controller is included in each desktop 406 and server, and CAT 5 UTP cables and connectors are used.

The situation is slightly more complicated when the number of users becomes large, since segmentation of the client server network is needed. Between 30 users 312 and 150 users 322 require a single 5-port 10-megabyte-per-second switch 422 with 100-megabyte-per-second uplink port. Each of the 5 ports in the switch 422 326 is coupled to an 8- to 16-port 10-megabyte-per-second hub 424, which is the first hub 424 in a distinct segment. Each segment includes a number of cascaded hubs 424, the first of which is coupled to the port. Within each segment, the hubs 424 are each coupled to a number of 10-megabyte-per-second network interface controllers residing within desktop 406 computers. Also, each hub 424 is further coupled to a 100-megabyte-per-second network interface controller in a service, which is connected to the 100-megabyte-per-second port of the switch 422. CAT 5 UTP cables and connectors are used.

If between 150 users 322 and 240 users may be on the system simultaneously, a single 8-port switch 422 is used 324. The single 8-port 10-megabyte-per-second switch 422 has 100-megabyte-per-second uplink port, and is connected to multiple 8- to 16-port megabyte-per-second hubs 424. The various hubs 424 are cascaded together in segments, the first hub 424 in each segment being coupled to the 8-port switch 422. Each hub 424 is coupled to a number of 10-megabyte-per-second network interface controller in desktops 406, and a 100-megabyte-per-second network interface controller is a server. The network interface controller in the server is connected to the 100-megabyte-per-second port of the switch 422.

If between 240 and 400 users may be on the system simultaneously, 2 or 3 switches 422 are required. If the highest bandwidth is applied to the server, 3 5-port switches 422 with 100-megabyte-per-second uplink ports may be used. Either one 8-port 10/100-megabyte-per-second hub 424, or multiple 8- to 16-port 10-megabyte-per-second hubs 424, may be used, the various hubs 424 coupled to the ports of the switch 422. As above, the various hubs 424 are grouped into segments, and are cascaded together within each segment, the first hub 424 in each segment being coupled to a port of the switch 422. The switch 422 uplink port is connected to the 100-megabyte-per-second hub 424 link to server. Each desktop 406 includes a 10-megabyte-per-second network interface controller, and each server includes a 100-megabyte-per-second network interface controller, a number of desktops 406 and a server comprising a segment.

If, however, between 240 and 400 users may be on the system simultaneously but the highest bandwidth does not apply to the server, then 2 8-port switches 422 are used. The 2 8-port switches 422 are 10-megabyte-per-second switches 422, with 1100-megabyte-per-second uplink ports. Either one 8-port 100-megabyte-per-second hub 424, or multiple 8- to 16-port 10-megabyte-per-second hubs 424, may be used (mid-range). As before, the various hubs 424 are grouped into segments, the first hub 424 in each segment being connected to the switch 422. Within each segment, the hubs 424 are cascaded. The switch 422 100-megabyte-per-second uplink port is coupled to the 100-megabyte-per-second hub 424 linked to each server. As before, the desktops 406 each include a 10-megabyte-per-second network interface controller and each server includes a 100-megabyte-per-second network interface controller, several desktops 406 and a server comprising a segment.

It will be recognized that, although 30 users per segment is advised, the actual implementation will depend on the number of active users expected on the solution network as well as the level of use by each user. The more the number of users and the more extensive the use, then the fewer the number of users per segment is advisable. If more users or heavier use is expected, then each segment of the network should have fewer of the users.

(7) SUMMARY OF LAN CONFIGURATION (PHASE III)

Thus, Phase III allocates particular products, devices, cables, routers 426, software applications, peripherals, and all the other elements of an overall system or enterprise selected in Phase II to the various locations and empty objects created in Phase I. In conjunction with the final product recommendations (the final solution framework instance), the set of implementation instructions produced by the Phase III analysis completely defines the system. Phase III determines the number of within each LAN and the number of nodes within each workgroup 404, as well as how to identify and interconnect the various nodes. Whether repeaters, switches 422, and routers 426 are needed to interconnect the components is also determined, as is the type of node within each LAN.

(8) WORKGROUP CONFIGURATION

Various processes within the Solutions Framework Base Class 400, and in particular within Phase III, typically configure workgroups according to the answers provided by the user respecting which desktops 406 must communicate directly with which other desktops 406, security considerations, and speed and performance requirements. However, some examples of workgroup 404 configurations and topologies that may be recommended are illustrative of the flexibility and complexity of the exemplary embodiment of the present invention approach.

As stated in the network architecture section, when a peer-to-peer network is recommended, generally a single 5-to-8 port megabyte-per-second hub 424 (low end), with 10-megabytes-per-second network interface controller in each desktop 406 and CAT 5 UTP cable and connectors, are recommended.

Referring now to FIG. 33, a typical small peer-to-peer workgroup 404 is shown. A workgroup 404 of desktops 406 are coupled together over an ethernet 416, which is connected to a hub 424. There is no centralized server requirement, and the desktops 406 simply share files and printers. The small peer-to-peer workgroup 404 configuration is appropriate when only a handful of desktops 406 are being networked.

Figure 34:
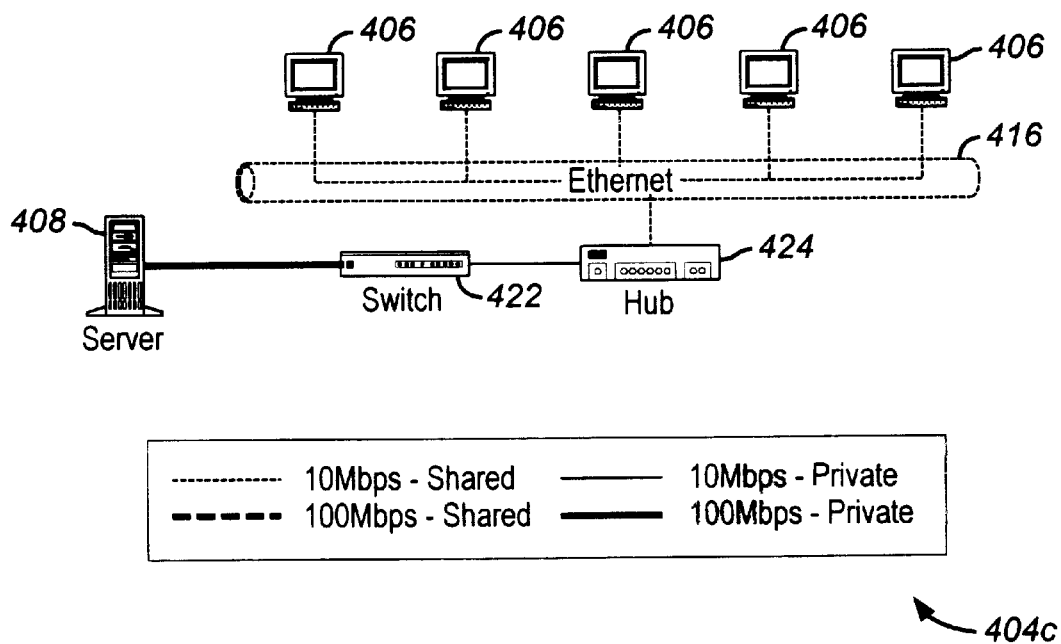

Referring now to FIG. 34 small client/server workgroup 404c is shown. As in FIG. 33, a workgroup 404 of desktops 406 are coupled together over an ethernet 416, which is connected to a hub 424. A server 408 is coupled to the hub 424 via a switch 422. The centralized server 408 for the single workgroup 404 is appropriate when a small number of desktops 406 are connected, but there is an expectation of growth. The desktops 406 predominantly use the server 408 for application service, sharing files, and printing resources. A 10/100-megabyte-per-second switch 422 is included, used to segment the network to increase the effective bandwidth. The switch 422, though not necessary for such a small number of desktops 406, allows a great deal of future growth. For example, if the switch 422 had 8 10-megabyte-per-second ports and one 100-megabyte-per-second uplink port, then the network could be scaled to add 7 more 10-megabyte-per-second hubs 424, each hub 424 supporting anywhere from 8 to 24 desktops 406 or cascaded for even greater number of desktops 406 per segment. Because of the use of the switch 422, each segment (in this case each hub 424 and its connected desktop 406) has a full 10-megabyte-per-second of bandwidth available, since the switch 422 can handle 10-megabytes-per-second on all 8 ports and 100-megabytes-per-second on its high speed port, simultaneously. Such a configuration, however can overload the server 408.

Although the configuration of FIG. 33 possibly may be recommended by the exemplary embodiment of the present invention for a new system, in general the exemplary embodiment of the present invention will not recommend the switch 422 initially since it can easily be added to a pre-existing network. Network segmentation, enabled by the switch 422, becomes necessary when the network is slow due to the amount of network traffic on a single segment. The inclusion of the 10/100 switch 422, however, is a very important step, providing scalability and fast access to the server 408.

Figure 35:
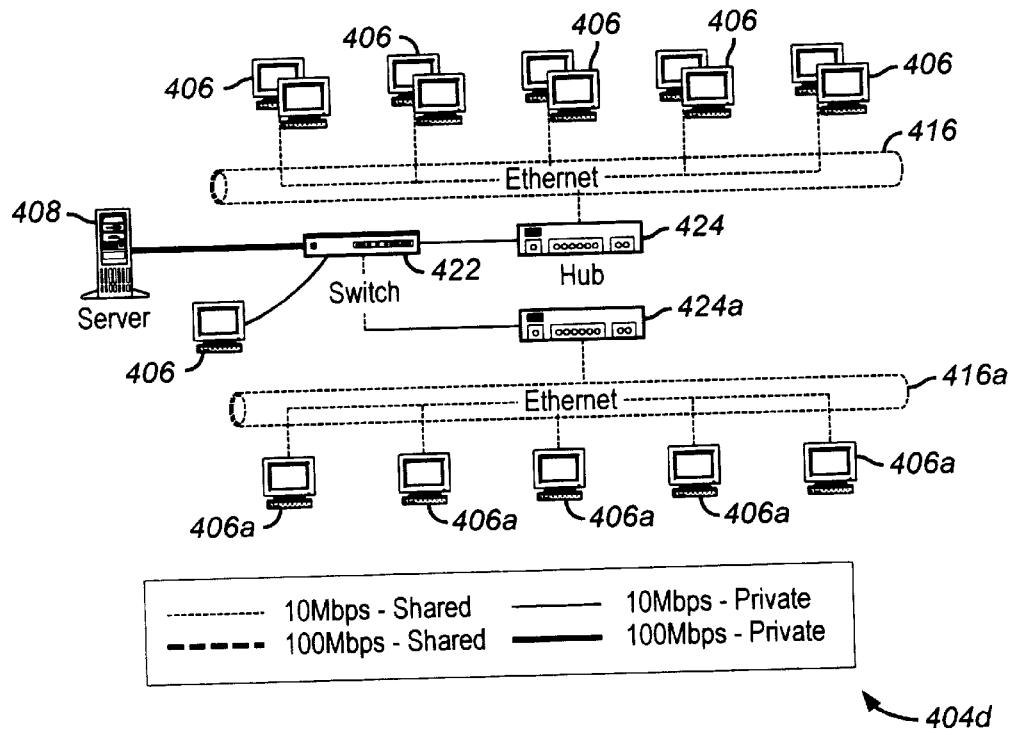
FIG. 35 shows growing client server workgroup.

Referring now to FIG. 35, a similar client/server workgroup 404 *d* is shown, in which only two of the 10-megabyte-per-second ports are used. As in FIG. 33, a workgroup 404 of desktops 406 are coupled together over an ethernet 416, which is connected to a hub 424. Also, as in FIG. 34, server 408 is coupled to the hub 424 via a switch 422. However, a second group of desktops 406a are coupled together over an ethernet 416a, which is connected to a hub 424a. The two hubs 424 and 424a are connected together via a switch 422, coupled also to a server 408. Converting from the configuration of FIG. 33 the configuration of FIG. 35 is a simple process, by adding a single hub 424a, connected in parallel with hub 424. The smaller number of desktops 406a connected to the lower hub 424b each can use a greater portion of the 10-megabyte-per-second bandwidth associated with that hub 424a.

Figure 36:
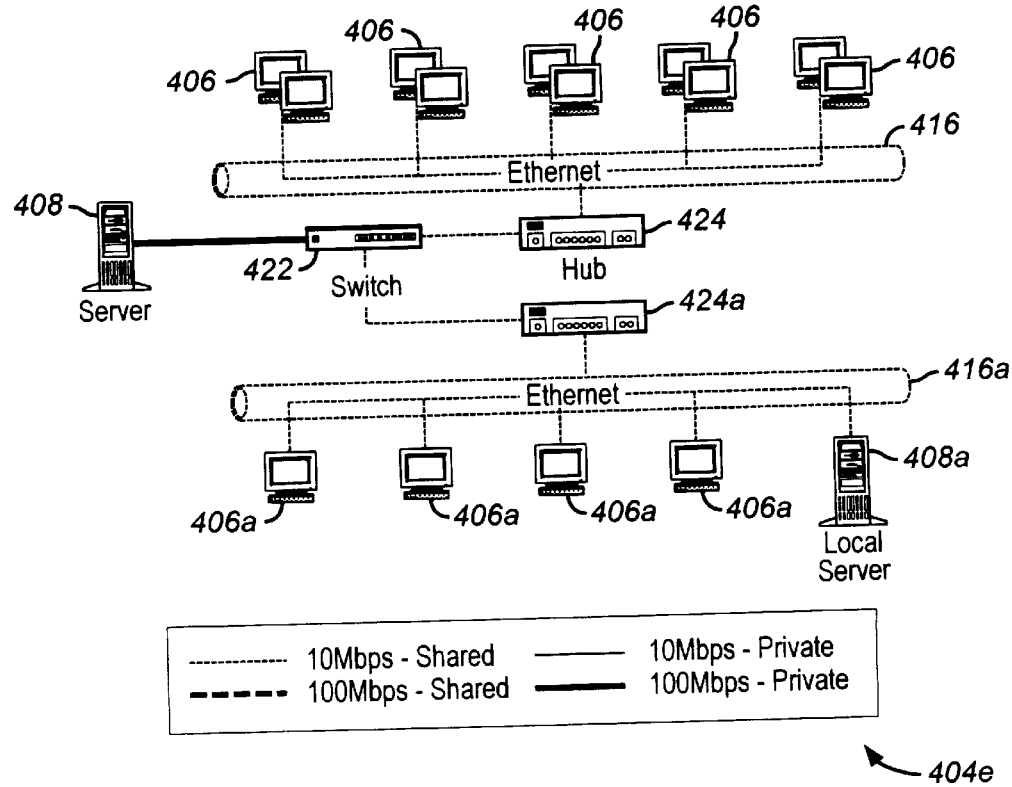

Referring now to FIG. 36, another workgroup 404e is shown. In workgroup 404f, local server 408a is added to the lower segment and is coupled via the Internet 416 connection to the lower hub 424b. As in FIGS. 24–26, a workgroup 404 of desktops 406 are coupled together over an ethernet 416, which is connected to a hub 424. Also, as in FIGS. 25–26, a server 408 is coupled to the hub 424 via a switch 422, and as in FIG. 35, a second group of desktops 406a are coupled together over an ethernet 416a, which is connected to a hub 424a, and the two hubs 424 and 424a are connected together via a switch 422, coupled also to a server 408. However, in FIG. 36 local server 408a is added to the lower ethernet 416a. The local server 408a thus added can have additional security features, files that are desired to be accessible only to desktops 406a in the lower segment, or can simply provide additional speed and capacity to the lower segment. It will be noted that, however, the two servers 408 and 408a are connected via the lower hub 424a, operating at only 10-megabytes-per-second, limiting to some extent the capabilities of the workgroup 404. However, with respect to the lower segment, speed is dramatically increased due to the presence of the local servers 408a. While the configuration of FIG. 36 not be appropriate for customers requiring the desktops 406a at the lower segment to access the primary server 408 frequently, local speed is increased.

Figure 37:
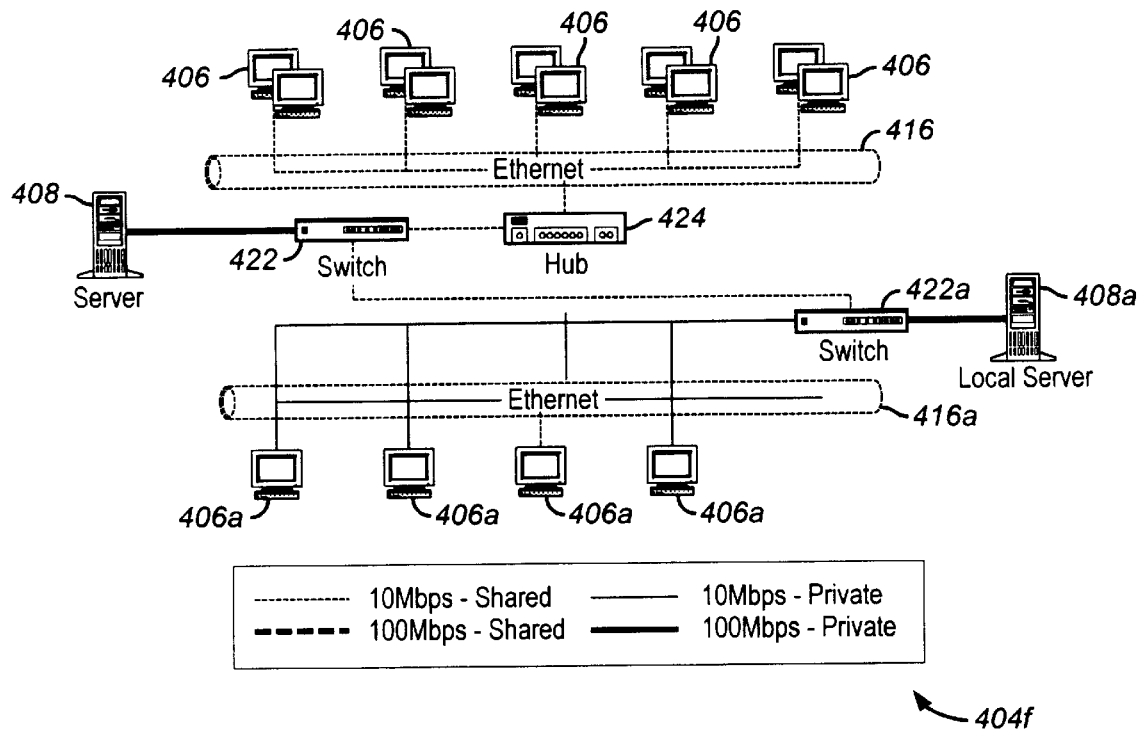
FIG. 37 shows higher performance workgroup.

With respect to FIG. 37, another workgroup 404f is shown. The Workgroup 404g of FIG. 37 shows a dual switch configuration in which each of the two switches 422 and 422a is connected to a server 408 and 408a, to a local segment composed of an ethernet 416 and 416a, and to the other switch 422 and 422a. As in FIGS. 24–27, a workgroup 404 of desktops 406 are coupled together over an ethernet 416, which is connected to a hub 424. Also, as in FIGS. 25–27, a server 408 is coupled to the hub 424 via a switch 422. A second group of desktops 406a are coupled together over an ethernet 416a, but the hub 424a is replaced with a second switch 422a, which is connected to the lower ethernet 416a, the first switch 422, and a local server 408a. Unlike FIG. 36 though, the local server 408a is no longer directly connected to the lower ethernet 416a. In other words, the lower hub 424a is replaced with a switch 422a, and the local server 408a is moved from the lower ethernet 416a to a direct connection to the lower switch 422a. Adding the other switch 422a should be configured by connecting the switches 422 rather than by connecting both switches 422 and 422a to the hub 424.

Figure 38:
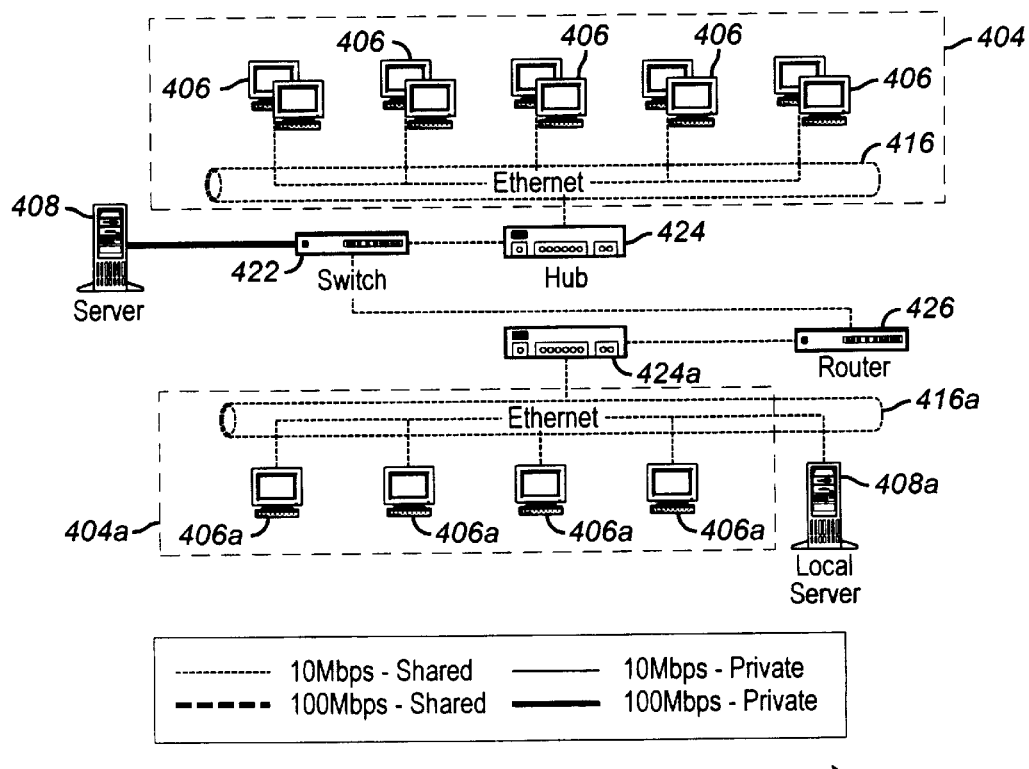
FIG. 38 shows high security workgroup.

With respect to FIG. 38, another workgroup 404g is shown. In the workgroup 404h of FIG. 39, strict security procedures can be implemented between segments by using a router 426. The network in FIG. 38 differs from the network in FIG. 36 only by the inclusion of a router 426 between the lower hub 424a and the switch 422. The upper workgroup 404 of desktops 406 are coupled together over an ethernet 416, which is connected to a hub 424, and the server 408 is coupled to the hub 424 via a switch 422. The second group of desktops 406a are coupled together over an ethernet 416a, which is connected to a hub 424a, and the two hubs 424 and 424a are connected together via a switch 422 and coupled also to a local server 408a on the lower ethernet 416a. However, a router 426, basically an intelligent switch, is inserted between the lower hub 424a and the switch 422.

A router 426 should not be recommended unless considerations other than performance are necessary, due to the large additional expense and complexity associated with routers 426. Routers 426 also introduce packet latency delays. FIG. 38 shows one possible implementation of a secure department having a local server 408a.

Figure 39:
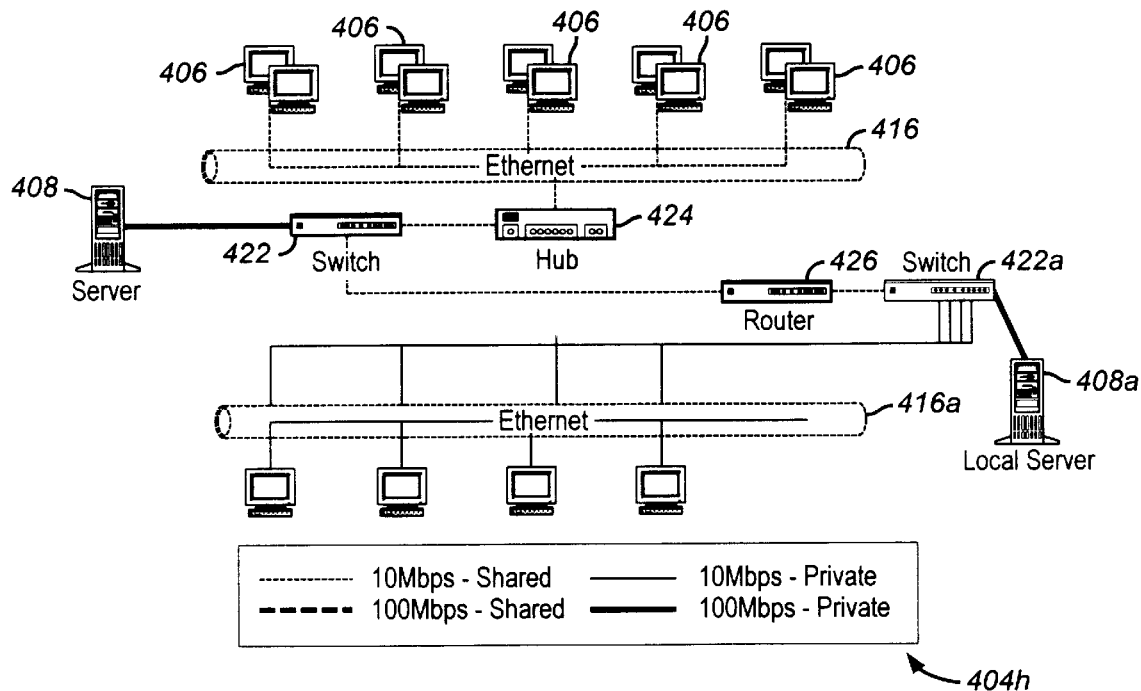
FIG. 39 shows high performance/secure workgroup.

Referring now to FIG. 39, another workgroup 404h is shown. With respect to the workgroup 404h a high performance server in a secure department is shown. As in FIG. 37, two switches 422 and 422a are used, each coupled directly to an ethernet 416 and 416a, and as in FIG. 38, a router 426 is used between the upper switch 422 and a lower device, in this case a switch 422a. The use of a switch 422 instead of a hub and a high-capacity bus between the second switch 422a and the lower ethernet 416a distinguishes FIG. 39.

The introduction of the second switch 422a connected directly to the router 426 allows greater bandwidth locally to the local servers 408a, since department traffic need not go through the router 426.

Figure 40:
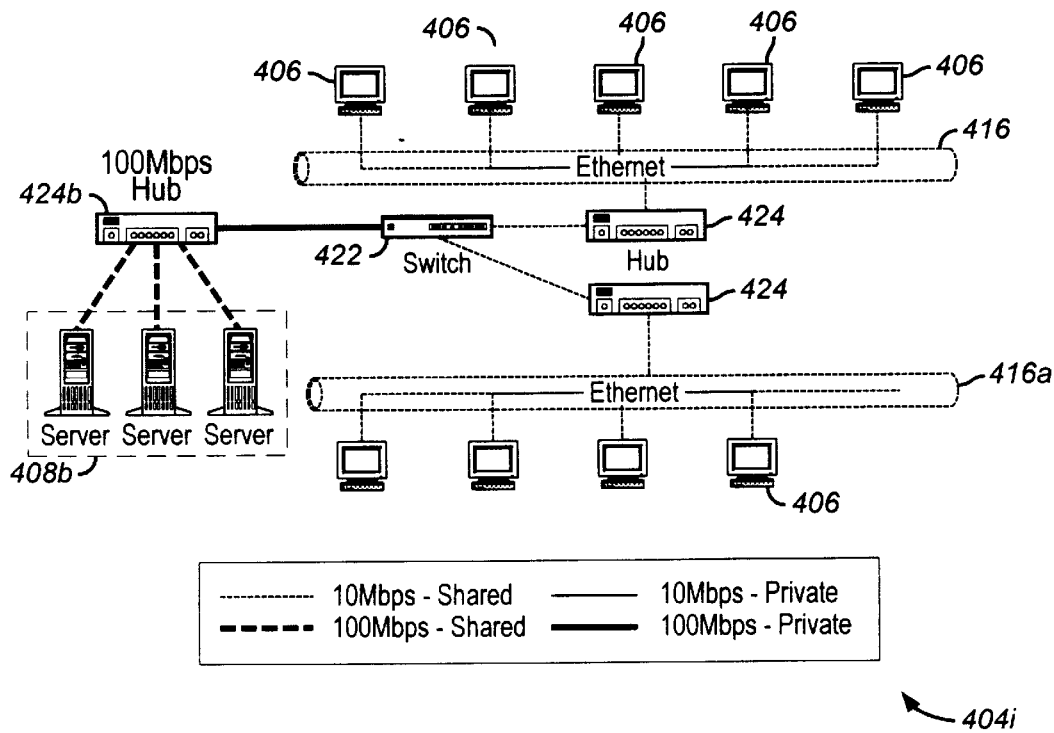
FIG. 40 shows server form workgroup.

With respect to FIG. 40, another workgroup 404i is shown. With respect to the workgroup 404i of FIG. 40, multiple servers form a server farm 408b, locally connected through a large 1100-megabyte-per-second hub 424b coupled to two local hubs 424 and 424a via a central switch 422. The server farm 408b and the large 100-megabyte-per-second hub 424b comprise a "server farm" in which security considerations are obviated and server traffic is limited to 100-megabytes-per-second.

Figure 41:
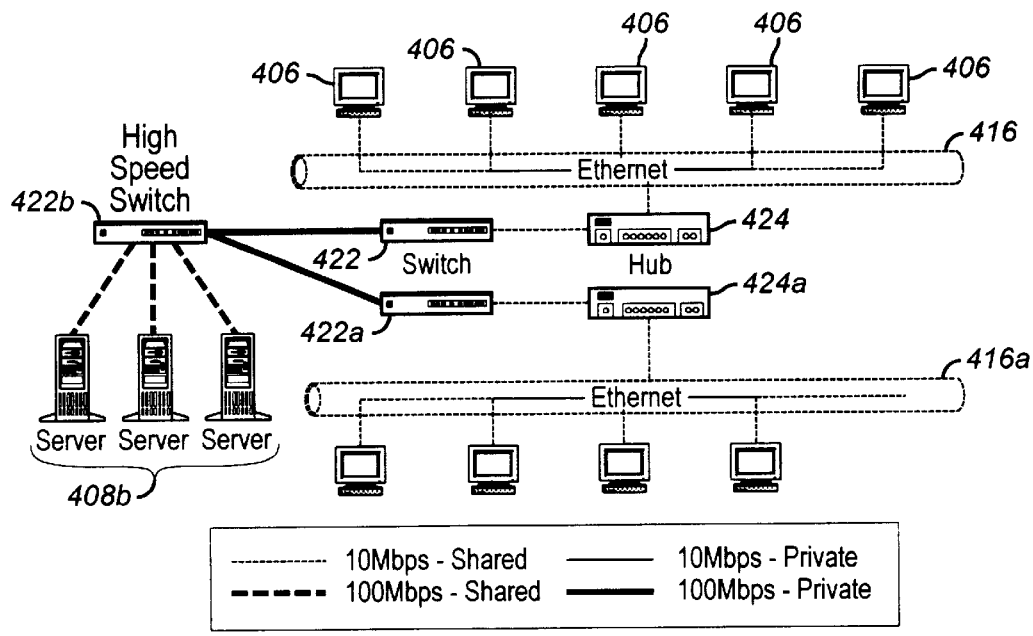
FIG. 41 shows high speed server form workgroup.

FIG. 41 adds a second switch 422a to the network 404j, between the first switch 422 and the lower hub 422a, and replaces hub 424b with a switch 422b. This multi-switch solution increases communication speed to the servers 408b by replacing the large hub 424b with a high speed switch 422b, having an even greater capacity, allowing several hundred megabytes per second communication between the two local hubs 424 and 424a and the server farm 408b.

Figure 42:
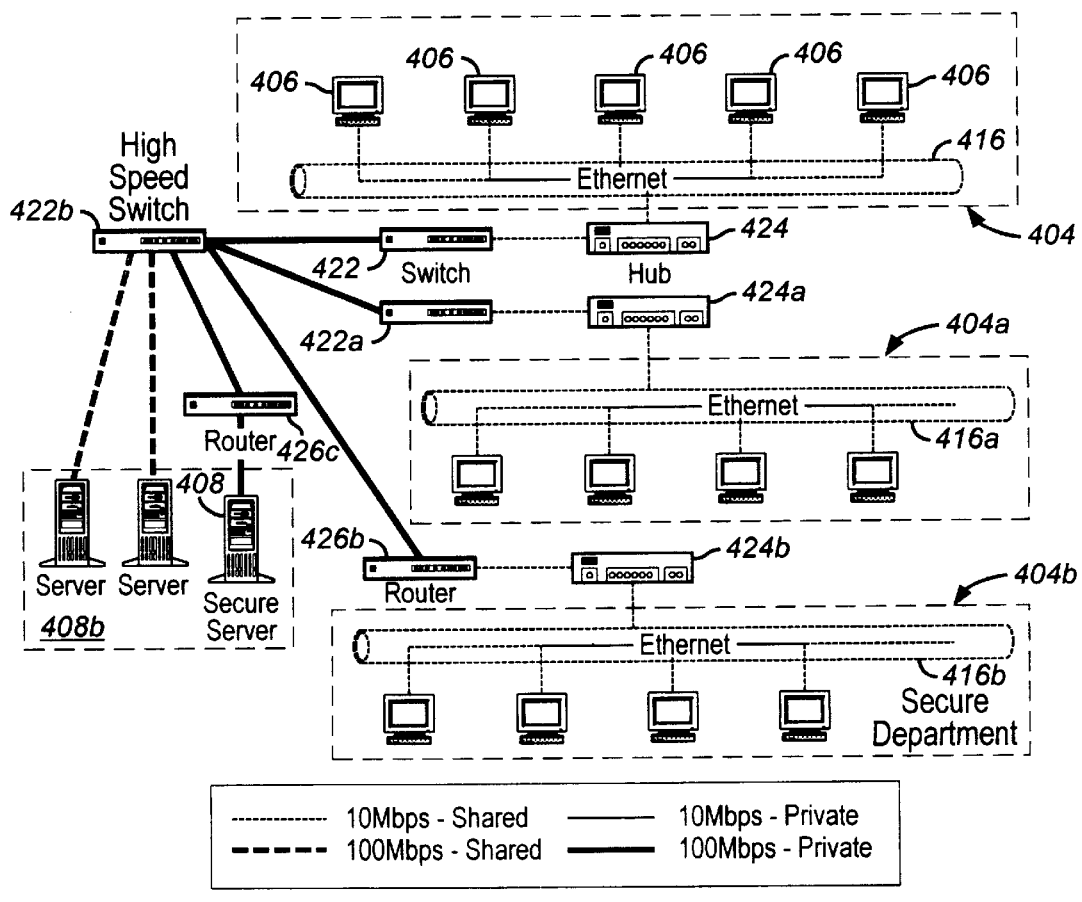
FIG. 42 shows high speed server form workgroup with secure department.

Referring now to a network 404k shown in FIG. 42, a third ethernet 416b, having a security router 426b between the hub 424b and the server farm's switch 422b, adds further complexity and cost but adds security and high-speed communication. Each of the three ethernets 416, 416a, and 416b is coupled to a workgroup 404, 404a, and 404b, respectively, comprising a number of desktops 406, 406a, and 406b, respectively. Each of the three ethernets 416, 416a, and 416b is also coupled to a hub 424, 424a, and 424b, respectively. The first two hubs, 424 and 424a, are coupled to switches 422 and 422a, respectively, while the third hub 424b is coupled to a router 426b. The first two switches 422 and 422a and the router 426b are connected to a high speed switch 422b, which is coupled to a server farm 408b having three servers. Two of the servers are connected directly to the high speed switch 422b, while the third server is connected to the high speed switch 422b via a second router 426c.

Reinjecting security considerations by reinserting two routers 426, one coupled to a local server 408 and the other coupled to a secure department, allows controlled access to and from the secure department and the secure server 408.

(9) WAN CONFIGURATION (PHASE III)

Figure 28:
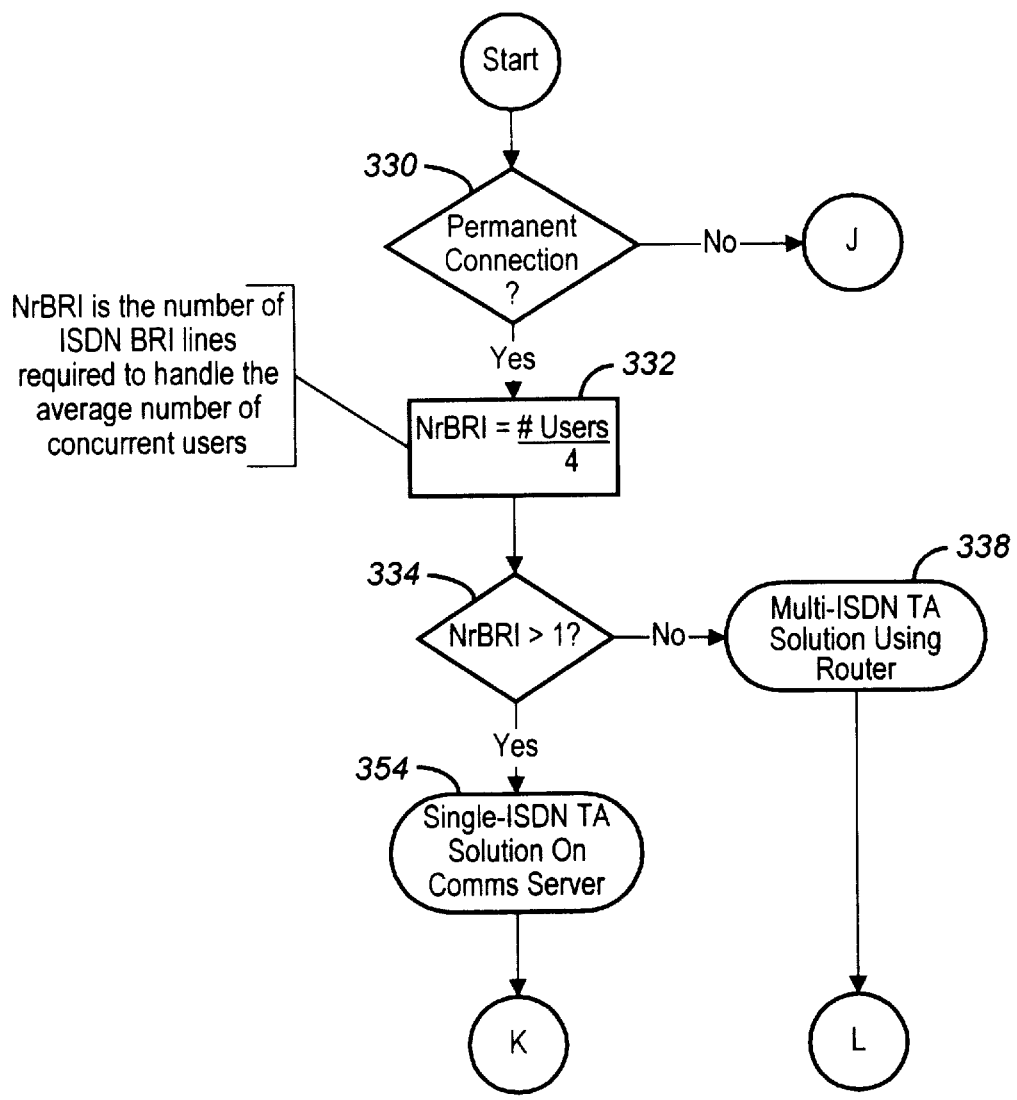
FIG. 28 shows dial-up versus permanent WAN.
Figure 29:
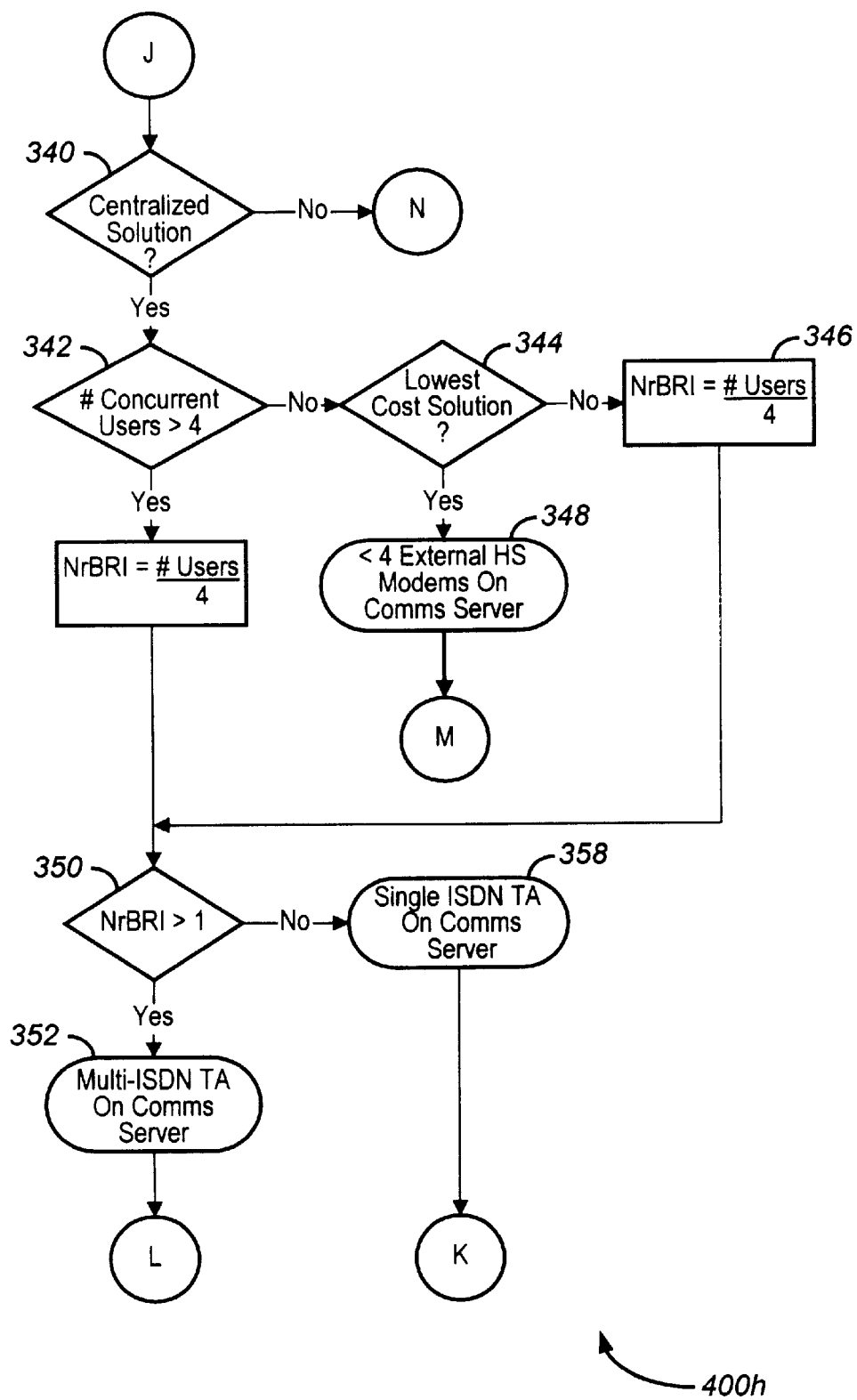
FIG. 29 shows centralized dial-up WAN.
Figure 30:
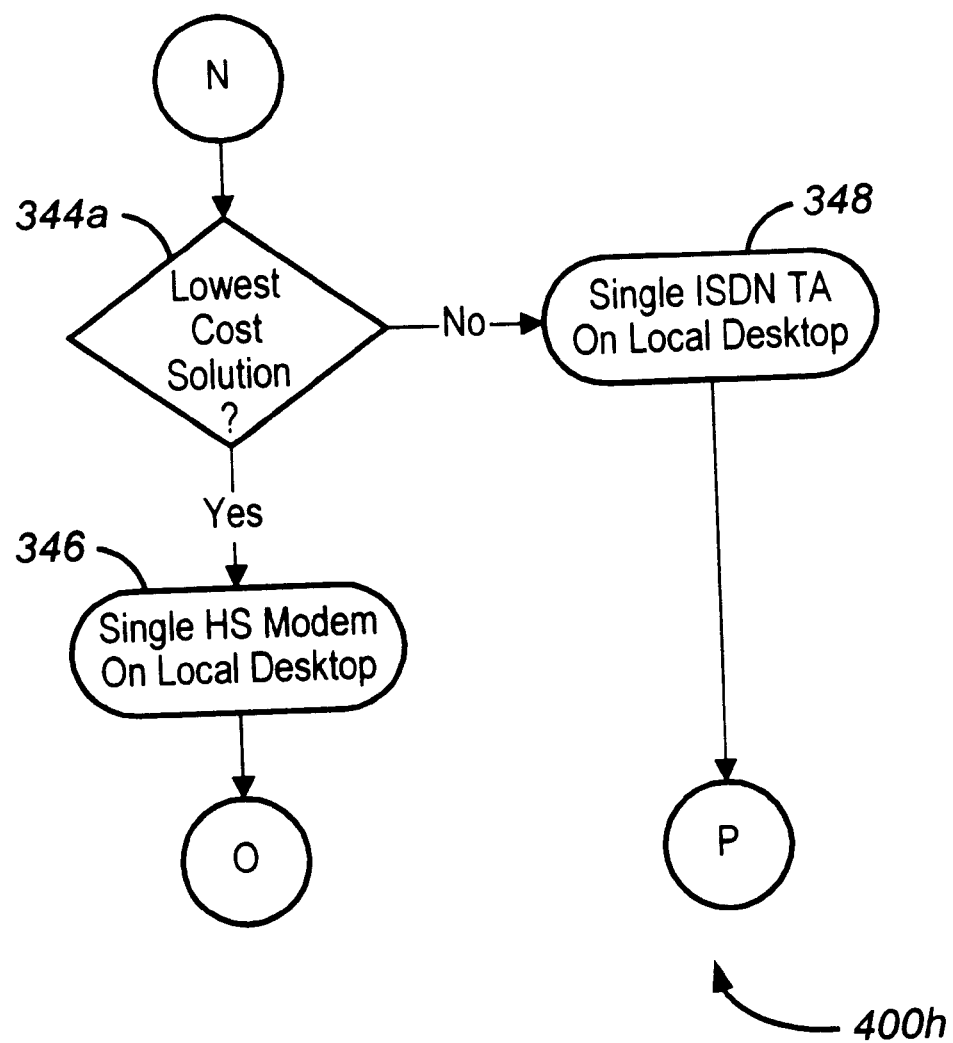

Similarly, various processes 400h of the Solutions Framework Base Class 400 identify each WAN 414 of the Solutions Framework Base Class 400, although connection to the WAN 414 of the Solutions Framework Base Class 400 and the inter-networking products are all that need be determined. Equipment, network security, and other features may also be determined. FIGS. 28–30 describe WAN 414 of the Solutions Framework Base Class 400 internetworking products and centralized dial-up WAN connection.

Referring now to FIGS. 28–30, the exemplary embodiment of the present invention determines whether a dial-up or a permanent WAN connection would better satisfy the answers the user provided in response to the question blocks. Initially, it should be determined whether a permanent connection and a centralized solution are desired. If a permanent connection is desired, control continues as indicated on FIG. 28. If a permanent connection is not desired, control continues as indicated on FIGS. 29 and 30.

Referring specifically to FIG. 28, at step 330, the exemplary embodiment of the present invention determines whether a permanent connection is preferred. If a permanent connection is preferred, control continues as indicated on FIG. 28. The process divides the number of users by 4 to determine the number of ISDN BRI lines required to handle the average number of concurrent users 332. If this number is greater than 1, at step 334, a single ISDN TA solution 354 on comms server 408 subclass of the Solutions Framework Base Class 400 is preferred. If the number of ISDN lines is not greater than 1, multi-ISDN TA solution using a router 426 is recommended 338.

Referring to FIG. 29, if no permanent connection is needed 330, the exemplary embodiment of the present invention determines whether a centralized solution is preferred 340. If a centralized solution is preferred 340, the number of concurrent users is greater 342 than 4, and the number of ISDN BRI lines required to handle the average number of concurrent users is greater 350 than 1, then a multi-ISDN TA on comms server 408 subclass of the Solutions Framework Base Class 400 is recommended 352. In other words, one ISDN BRI cable router 426, connected to the LAN, is recommended, but must have 'N' ISDN BRI ports or connect to an 'N' port ISDN BRI solution. A number N of ISDN BRI lines connect to the ISDN-BRI router 426, and the router 426 acts as a WAN gateway. The router 426 uses a static IP routing or dynamic routing, via RIP. In such a case, all desktops 406 must be running TCP/IP protocols.

If a permanent connection is not required 330 but a centralized solution is 340, and the number of concurrent users is no more than 4, then the exemplary embodiment of the present invention determines whether the lowest cost solution is needed 344. If so, fewer than 4 external HS modems on comms server 408 subclass of the Solutions Framework Base Class 400 are recommended 348. One to four external HS modems, connected to the comms server 408 subclass of a Solutions Framework Base Class 400, including 1 to 4 POTS lines, connected to the comms server 408 subclass of the Solutions Framework Base Class 400 modems, are recommended. The comms server 408 subclass of the Solutions Framework Base Class 400 should be running an NT server 408 subclass of a Solutions Framework Base Class 400, and acts as a WAN gateway. The comms server 408 subclass of the Solutions Framework Base Class 400 uses a static IP routing, with dial-up networking installed only on the comms server 408 subclass of a Solutions Framework Base Class 400. Again, all desktops 406 must be running a TCP/IP protocol.

If a permanent connection is not required 330 but a centralized solution is 340, but the lowest cost solution is not required 344, then the exemplary embodiment of the present invention defaults to the situation in which more than 4 concurrent users may be using the WAN connection simultaneously 346. In such a case, the centralized dial-up WAN connection recommends either the multi-ISDN TA 352 on the comms server 408 subclass of a Solutions Framework Base Class 400, or the single ISDN TA 354 on the comms server 408 subclass of a Solutions Framework Base Class 400, as described above for the case when the number of concurrent users is greater than 4.

The single ISDN TA 354 recommendation on the comms server 408 subclass of the Solutions Framework Base Class 400 includes either one ISDN BRI TA, connected to the comms server 408 subclass of a Solutions Framework Base Class 400. One ISDN BRI line, connected to the comms server 408 subclass of the Solutions Framework Base Class 400 modem, with the comms server 408 subclass of the Solutions Framework Base Class 400 running an NT server 408 subclass of the Solutions Framework Base Class 400 acts as a WAN gateway. Alternatively, the one ISDN BRI cable router 426, connected to a LAN, one ISDN BRI line, connected to an ISDN-BRI router 426, with the router 426 acting as the WAN gateway. In the former recommendation, the comms server 408 subclass of the Solutions Framework Base Class 400 uses a static IP routing, with dial-up networking installed only on the comms server 408 subclass of a Solutions Framework base class 400. All the desktops 406 must be running a TCP/IP protocol. In the latter, router 426 uses a static IP routing or a dynamic routing, via RIP. Again, however, all the desktops 406 must be running a TCP/IP protocol.

Referring now to FIG. 30, if a permanent connection is not required 330, but a centralized solution is not 340 (i.e., a non-centralized dial-up WAN connection is to be recommended), the number of concurrent users is less relevant. The only question is whether the lowest cost solution is desired. If the lowest cost solution is desired 344a, the tool recommends a single high-speed modem 346 on local desktops. If the lowest cost solution is not desired 344a, the tool recommends a single ISDN TA 348 on local desktops.

When a permanent connection is needed, and the number of ISDN BRI lines required to handle the average number of concurrent users is greater than one, either alternative will comply with the requirements.

(10) NETWORKING SELECTION

Phase III, the Internet 416 of the Solutions Framework Base Class 400 inter-networking selection phase, also includes networking selection. Networking selection is optimized for the number of users, the type of traffic, estimated traffic volume, performance requirements, scalability requirements, vendor preferences, workgroup 404 definitions, security considerations, and the level of WAN access required. The definition of local workgroups, however, can be requested of the user in the ordinary vernacular, for example by identifying individuals who must communicate with one another frequently.

Some overall considerations are also included. For example, steady state high network usage ordinarily suggests a switch 422 10-megabytes-per-second segment, to allow a desktop 406 to communicate with the outside world. On the other hand, bursty traffic patterns, which can exceed 10-megabytes-per-second, suggest a shared megabyte-per-second approach. A router 426 should be selected over a switch 422, if WAN connection, limited broadcast traffic, redundant network path support, or intelligent packet forwarding implementation for enhanced security is needed. Because a switch 422 is less expensive and has less packet latency delay, simple increases in network bandwidth can be accommodated through a switch 422. routers 426 should not be considered to limit broadcast traffic, and where broadcast traffic is a significant issue (more than 1 to 200 nodes), IP should be used in preference to IPX. Because the majority of traffic traverses one or more internetworking devices of the Solutions Framework Base Class 400 devices, switches 422 should be used in preference to routers 426 to reduce the latency delay across each inter-networking device of the Solutions Framework Base Class 400 device. The exemplary embodiment of the present invention also can recommend virtual LANs using switches 422, allowing partitioning of the network into irrespective of the cabling. Packets on a segment, other than broadcast packets, are forwarded only to other nodes on the same virtual segment. Routers 426 allow connection between the virtual LANs (VLANs), even if the VLANs are on the same physical wire. Because the recommendation places only 30 users per segment, while up to 200 users can in fact be connected to the segment, the recommended solution has room for growth.

d. THE RECIPE BASE CLASS

The Recipe Base Class (FIG. 3) is the other data structure comprising the eventual output of the session.

The subclasses of the Recipe Base Class each describe the installation, implementation, maintenance, upgrading, or connecting of a different product, or of a different network or subnetwork. The subclasses of the Recipe Base Class are written at a technical level, and in an appropriate spoken language, as indicated in response to the first question block. As each subclass of the Solutions Framework Base Class 400 is developed, describing a product, a corresponding subclass of the Recipe Base Class is likewise produced, describing the installation of the product. As each network connection is determined, another subclass of the Recipe Base Class is likewise produced, describing the connection of the network.

Although at login the Solutions Framework Base Class 400 and the Recipe Base Class (FIG. 3) each contain only a general structure subsequently extensible, the creation of the Solutions Framework Base Class 400 and the Recipe Base Class is necessary since memory must be reserved for each user and each session. Subsequent processes 400g provide extensions to these Base Classes.

A "recipe" allows a system administrator or technical consultant to obtain additional installation instruction specific to the solution configuration. The recipe (i.e., the set of implementation instructions), can be adapted to the particular installer's technical level. The set of implementation instructions is also customized to the solution determined by the exemplary embodiment of the present invention, as incrementally adjusted as the solution changes, and has features similar to World Wide Web bookmarks for obtaining additional information as needed. The set of implementation instructions and solution are specific to the user; other data structures within the database are universal and sharable by several simultaneous interactive users. These later structures include a large amount of information regarding products and services available around the world. Extensible data structures allow flexible maintenance of the database objects, as additional features, product classes, and products are introduced.

C. CONTROL FLOW THROUGH THE TOOL

Control flows through processes corresponding to the Question Blocks Base Class 100, the Client Base Class 120

(FIG. 3), the Answers Base Class 140 (FIG. 22B), the User Guidelines Base Class 160, the Requirements Base Class 180, the Products Requirements Base Class 200, the Requirements Translation Base Class 210, the Products Base Class 240, Collections Base Class 300, and the Solutions Framework Base Class 400. Because control flow is nonlinear, and because each process is driven by the availability and validity of the data to which it is linked, branching is not tree-like. The processes corresponding to the Question Blocks Base Class are linked to the Answers and Client Base Classes 120, and are driven by the unavailability or invalidity of the data in these base classes and obtain information from the user which is then stored in the Answers and Client Base Classes 120. The processes corresponding to the Client Base Class 120 search a main database within the tool to find a Client History subclass and copy the Client History subclass into the view. Other processes corresponding to the Client Base Class 120 write a revised Client History subclass to the main database within the tool so that subsequently the solution can be updated without having to be completely replaced. The processes corresponding to the Answers Base Class 140 provide a data structure for storing responses to questions in the question blocks, and link to other base classes as well. The processes corresponding to the User Guidelines link to the Answers Base Class 140, and provide a data structure for processes in the Solutions Framework Base Class 400 to operate on during Phase I. The processes corresponding to the Requirements Base Class 180, like the processes corresponding to the User Guidelines, link to the Answers Base Class 140 and provide a data structure for processes in the Solutions Framework Base Class 400 to operate on during Phase I. The processes corresponding to the Products Requirements Base Class 200 link to the Products, Collections, Requirements, and Requirements Translation Base Class 210, and provide a list requirements for products that are to be met in the recommended solution. The processes corresponding to the Requirements Translation link to the Requirements and the User guidelines Base Classes 160 (FIG. 6), and provide an Intermediate Results Base Class 510, containing resource requirements needed to satisfy the operating system, applications and other features, within the Solutions Framework Base Class 400. The processes corresponding to the Products Base Class 240 and the Collections Base Class 300 allow maintenance of a large database of products, addition of new products and removal of discontinued or unavailable products, and categorization of products by various properties. The processes corresponding to the Products Base Class 240 and the Collections Base Class 300 also allow additional fields (representing newly-specified product attributes) to be added to preexisting product lists. The processes corresponding to and the Solutions Framework Base Class reinvoke question blocks as necessary, invoke the user guidelines, requirements, and Products Requirements Base Classes to read from the Client and Answers Base Classes during Phase I and store the intermediate results. The Framework Base Class also invokes the calibration processes when the intermediate results are available, invokes the search and match step to identify a list of products, and invoke perform Internet 416 of the Solutions Framework Base Class 400 working analysis to connect the product together.

Referring now to FIG. 1, a high level flow diagram for the novice mode is shown. Initially, informational questions corresponding to the informational question blocks 102 are presented to the user, developing information for the Client Base Class 120. As explained below, the Client Base Class 120 is a data driven set of procedures corresponding to a data object created when the user initiates an interactive session. The informational questions corresponding to the informational question blocks 102 include questions pertaining to the general nature of the user's business, the client's name, office address, and other information for the client files. After asking the informational questions corresponding to the informational question blocks 102, novice mode then asks objective questions corresponding to the objective question blocks 104 pertaining to what the user intends to do with the exemplary embodiment of the present invention. For example, adding networks, server 408 subclass of the Solutions Framework Base Class 400, services, users, or net Internet 416 of the Solutions Framework Base Class 400 applications are objectives that many users would seek to accomplish through the exemplary embodiment of the present invention.

Base Classes set up by the tool specify the Products Base Class 240 (FIGS. 47–50), the various Question Blocks, the Calibration Base Class 280, the Client Base Class 120 (FIG. 3), answer Base Class, Solutions Framework Base Class 400, Recipe Base Class (FIG. 3), User Guidelines Base Class 160, Requirements Base Class 180, Products Requirements Base Class 200, and Requirements Translations Base Class.

1. PRELIMINARY PHASE

Execution begins when (a) memory (i.e., the "view") is dedicated to a client session, (b) a preliminary Question Block (or pointer or entry point to the Question Block) is copied into a queue within the view, (c) a processes associated with the queue is executed, the results are stored in the Client Base Class 120 and Answers Base Class 140 (FIG. 22B), and entry points to other question blocks that should be called are identified and the entry points put into the queue, and (d) control conditionally branches to other question blocks. Control proceeds according to whether other question blocks (or pointers or entry points to the Question Blocks) remain in a queue. If so, control continues among the question blocks within the queue. If not, control passes to the processes associated with other Base Classes, and Phase I begins.

Once the quantities and types of major products are determined, control flow proceeds to a product selection step. The Question Blocks seeking the information necessary to perform automatic product selection ask highly particular questions relating to product identification and selection, but prompts each question in ordinary non-technical vocabulary understandable by non-technical personnel.

a. Expert mode 400c

Figure 2:
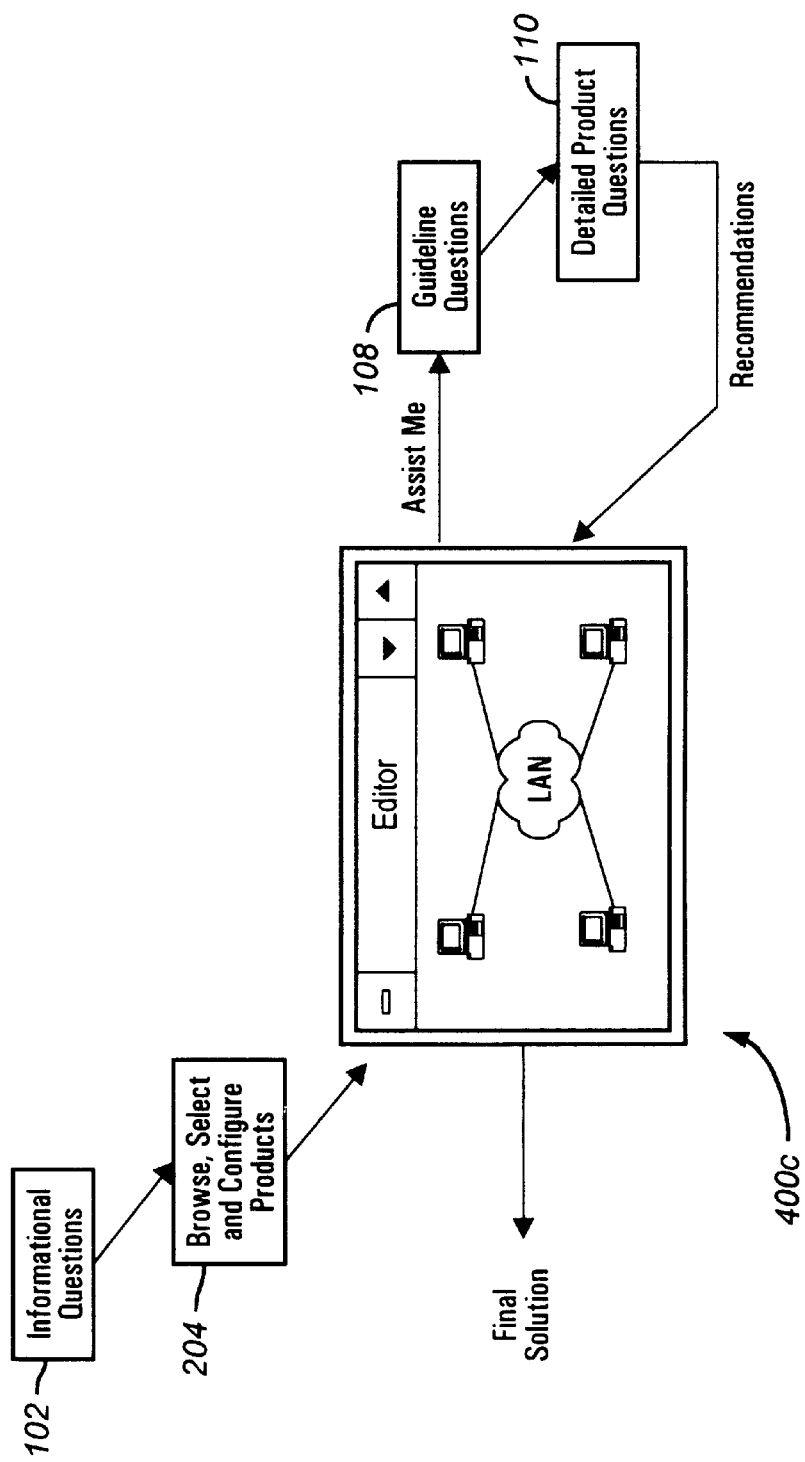
FIG. 2 shows the expert mode high level flow.

The exemplary embodiment of the present invention also includes an expert mode 400c. Referring now to FIG. 2, the expert mode 400c is shown. High level informational questions corresponding to the informational question blocks 202 call a browser/selector 204 for use by a technologically sophisticated user. Such a user configures a solution and then edits the solution according to the user's needs. An "Assist me" object allows slightly higher abstractions or use of some of the novice mode objects. The expert mode 400c allows the user to interrogate the database for highly specific product information. Thus, expert mode 400c allows a different, lower level and more explicit set of question blocks to determine detailed system requirements (in more technical vocabulary). The "Assist Me" feature allows a user who is more familiar with some aspects of technology than with others to use expert mode 400c where familiarity permits and novice mode objects where necessary.

b. IMPLEMENTATION OF THE TOOL IN VARIOUS EMBODIMENTS

As an online service, the exemplary embodiment of the present invention can further provide full product sales and marketing functionality, allowing a user to order products and services via the Internet 416 of the Solutions Framework Base Class 400, Email, or fax.

Although the exemplary embodiment of the present invention may be implemented on a stand-alone computer, the exemplary embodiment of the present invention is preferably implemented on a network of server 408 subclass of the Solutions Framework Base Class 400 at appropriate manufacturer locations worldwide, to facilitate updating of the database information while providing local connectivity. Hypertext markup language (HTML) pages and other web related features facilitate remote interactivity with the web server 408 subclass of the Solutions Framework Base Class 400 holding the database. Full interoperability across platforms and microprocessors is thus achieved, since only the queries and the final implementable solution are run at the client's site.

Analysis blocks spawned by the flow control procedure may or may not be associated with a question block. The analysis blocks evaluate answers and control logic flow based on the response.

c. PHASE 1: THE SOLUTION FRAMEWORK

During Phase I, the Solutions Framework Base Class 400 and the Recipe Base Class (FIG. 3) are established as skeletal structures in memory, and pointers to other areas of memory are inserted. Then, a cursory analysis of the Answers and Client Base Classes 120 provides product identification in various extensions of the base classes.

d. REQUIREMENTS TRANSLATION

In a related embodiment, "local" guidelines allow departure from the solution level Phase II user specified guidelines for a particular printer, processor, or server 408 subclass of a Solutions Framework Base Class 400. This is necessary for implementations requiring a small number of products departing from the system level standard. The local guidelines may be entered either in response to a question block, in an Assist Me procedure, or by using the Incremental Editor. The Incremental Editor allows a user to vary the responses to questions and determine, for example pre-purchase, how the final configuration will appear.

e. SUMMARY OF PHASE II ANALYSIS

Using information from the Calibration Base Class 280 and from the product object itself, a Search and Match process queries the product database for all products matching the resource requirements. Because each entry in the product database includes a ranking field and a network interconnectability field, the Search and Match process returns a list of appropriate products. The list of products returned by the Search and Match process is placed in a table or subclass, having entry point references that are placed in the objects in the solution framework 400, shown in FIG. 4.

D. FUZZY LOGIC

Several tools associated with the exemplary embodiment of the present invention use fuzzy logic to determine the appropriate output. The fuzzy logic approach is useful when several products are identical in their compliance with the stated criteria, or when no criteria are stated. Many manufacturers produce virtually identical products. Moreover, many manufacturers produce products that differ with respect to one or more properties, but the user may have left blank the questions that the exemplary embodiment of the present invention uses to distinguish between the products. In either case, several possible recommendations are equivalent, and the exemplary embodiment of the present invention must find a different way of determining the appropriate output.

In the complete absence of any distinguishing criteria, the exemplary embodiment of the present invention selects randomly from the among the products and inter-networking topologies that equally and best meet the stated criteria of the user. However, this happens only once; the exemplary embodiment of the present invention uses fuzzy logic to prevent the situation from ever recurring.

To implement the fuzzy logic, various distinct weights are associated with each parameter (property value) in the Products Base Class 240, with each networking topology in the Phase III analysis, and elsewhere in the exemplary embodiment of the present invention.

Moreover, each product and internetworking option also has a numerical degree-of-membership value corresponding to each property, requiring an additional column to be added to the weight matrix 582 table of process 502 shown in FIG. 55. Degree-of-membership values are typically chosen in the range between zero and one (inclusive). The maintainer of the exemplary embodiment of the present invention system can alternatively select as a degree-of-membership the ranking (identified in the Requirements Translation Base Class 210 shown in FIG. 7 and in the Calibration Base Class 280 shown in FIGS. 17A–17D, as well as FIG. 50) or the actual numerical values corresponding to the property.

The weights (i.e., the degree-of-membership values) are multiplied by the rankings. The weights are either positive or negative, depending on whether a larger or smaller value for the property is typically preferred. For example, the weighting corresponding to cost may be negative, while the weighting corresponding to speed may be positive. Alternately, the magnitude of the various degree-of-membership values may be complemented where lower values are preferred, such that weights may all be positive.

The exemplary embodiment of the present invention only defaults to random selection from among the group of possible recommendations when multiple possibilities all share the same inner-product, and the inner-product thus shared is greater than that of any other possible recommendation in the group. However, when the user eventually selects one of the products that are otherwise equivalent, either the degree-of-membership, or the weightings, are changed to make the finally-selected product slightly more likely to be recommended in the future. The exemplary embodiment of the present invention determines a property for which the selected solution has a degree-of-membership greater than the degree-of-membership corresponding to any other solution that might have recommended, and either increases the weighting corresponding to the property or increases the degree-of-membership for the eventually-selected solution corresponding to the property. The increase may be associated with a particular user, a particular group of users, or may be globally applied to all users. Over many instances of the exemplary embodiment of the present invention, as users begin to employ the exemplary embodiment of the present invention to develop actual solutions and implementation instructions and begin to override the exemplary embodiment of the present invention's initial recommendations, using the Incremental Editor and the Assist Me feature, weights and degrees-of-membership may be altered to increase the likelihood the finally selected products will be initially recommended in subsequent instances of the Solution Wizard.

Fuzzy logic need not be relegated to cases in which all other factors are equal. Instead, fuzzy logic can be the approach of choice for implementing the search and match step of the product selection (Phase II) analysis. The use of fuzzy-logic may even obviate the need to develop more question blocks to distinguish among products when users clearly prefer one product over the others in its class of products but are unable to articulate a clear criterion to explain the preference. Coupled with an expert system using crisp logic and sequential analysis, fuzzy logic can be used to enhance the Incremental Editor and the Assist Me feature, allowing the exemplary embodiment of the present invention to converge quickly to a preferred solution.

Fuzzy logic changes the weights corresponding to a property whenever, after a product is recommended, the user adds additional criteria to the selection process (using the Incremental Editor or the Assist Me feature). Whenever a user that a property is unimportant, and then, after Solution Wizard determines a group of possible recommendations that comply equally with the stated criteria, changes his/her mind and indicates the property is important after all, the weight corresponding to the particular property is generally increased.

E. THE INCREMENTAL EDITOR

The Incremental Editor that performs adjustment to the values provided in response to the questions is configured as a pop-up menu that allows "up" and "down" adjustment to the values provided, or outright of the values with other values that are used to replace the previously-entered values. Ranges of values may be included to limit such adjustment. Adjustment is always to the next available value; if no product exists for a particular entry, the next more-capable device is recommended. The pop-up window may be an ActiveX control or a drop-down list, or other interactive means.

Once a solution framework is obtained, as shown in FIG. 1, a user may then edit the solution or may reinvoke various question blocks to provide additional information to the exemplary embodiment of the present invention. Because the exemplary embodiment of the present invention is capable of operating in a limited information environment, solutions are obtainable based on a limited amount of information and can be refined by providing additional information to the exemplary embodiment of the present invention. The exemplary embodiment of the present invention suggests possible solutions where appropriate and allows the user to edit the suggested solution or volunteer additional information around which a more appropriate solution may be suggested. For example, if the exemplary embodiment of the present invention recommends a Deskpro 2000 desktop 406, with 16 megabytes of memory, but the user wants 2400 megabytes, then the user can select the Deskpro 2000 and incrementally edit the memory value.

"Memory up" and "memory down" buttons are provided in the preferred implementation, as part of a question block. The additional information is then used to recalculate a more appropriate solution according to the user's needs. Presentation of a solution to the user also allows the user to print it, save it, order it, or obtain information for installing it.

F. SUMMARY OF THE ANALYSIS

At step 256, an internetworking selections step prompts the user for networking related information. Finally, a global analysis determining system level or solution level parameters such as overall performance, security, and scalability provides a feedback to the user explaining the appropriateness of the solution. Although expressed in terms of four sequential steps, in the preferred embodiment the steps are interspersed with one another, as networking selections may require additional information of a general nature or revision of product selections (step 254). Because objects call other objects, and because in some implementations the objects are run in parallel and therefore prompt user questions out of order, control flow should not be understood to be limited to a sequential nature.

Figure 52:
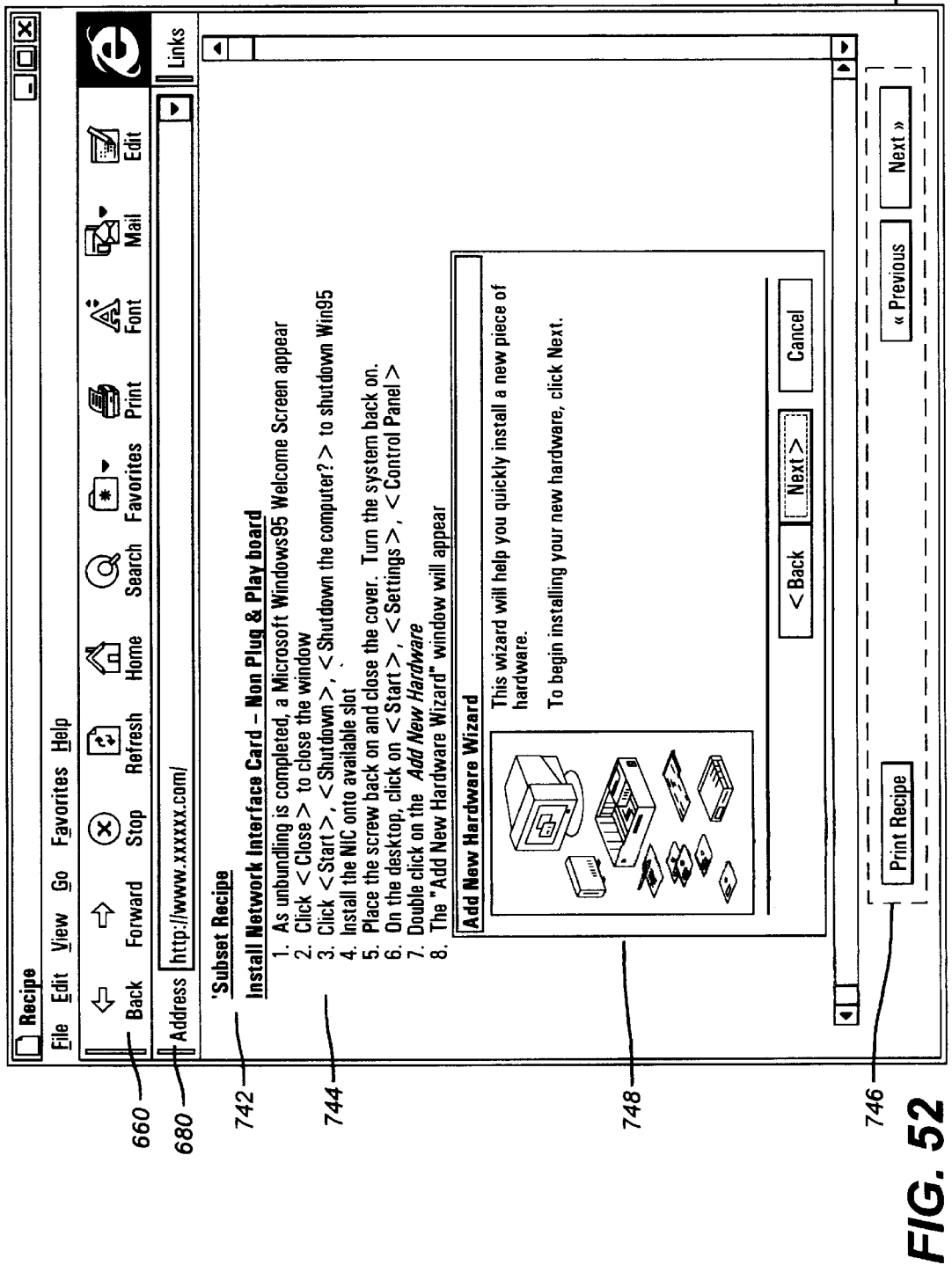
FIG. 52 shows a set of installation/implementation instructions.

Referring now to FIG. 52, a recipe screen 100*j* is shown. The recipe screen includes a title 742 of the task being explained. The task typically includes installing a card or other product, or configuring a card or device (e.g., setting a switch or jumper). The instructions are provided in more detail 744. Graphical windows 748 aid in the explanation. A set of radio buttons 746 allows printing page by page. A row of control buttons 660 and an Internet or web page URL or other address indicator 680 are placed at the top of the screen, to allow the user to control the entry of information more easily and to control how the information is presented.

Figure 53:
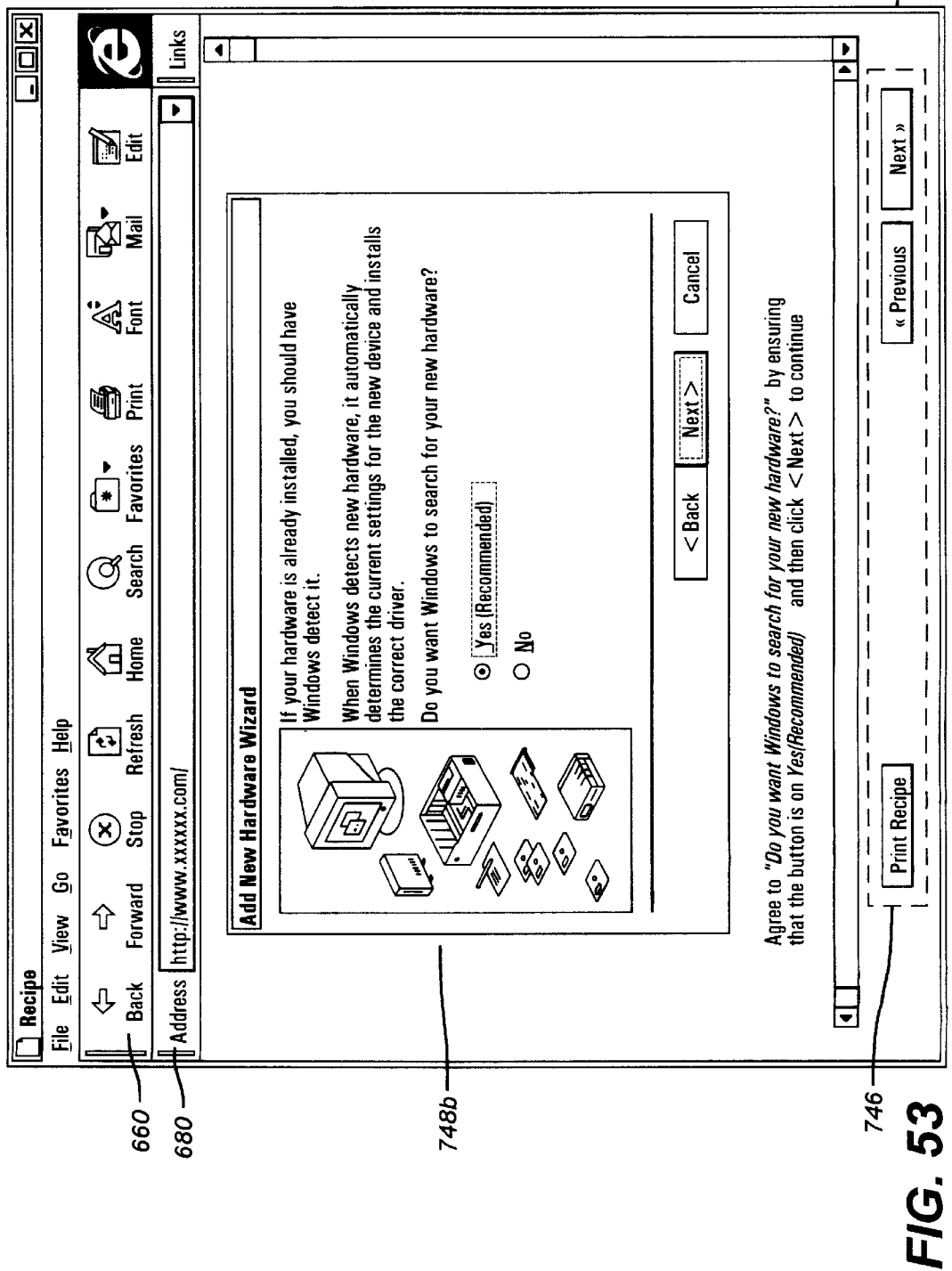
FIG. 53 shows a follow-up question block entry, following presentation of a set of installation/implementation instructions.

Referring now to FIG. 53, a second recipe screen 100*k* explaining adding new hardware to a system is shown. The recipe screen of FIG. 53 includes a revised graphical windows 748*b* to aid in the explanation. The revised graphical window allows step-by-step installation instructions to be presented to the user at a level of comprehension appropriate to the particular user. The user can request that the tool search the new hardware. A set of radio buttons 746 allows printing page by page. A row of control buttons 660 and an Internet or web page URL or other address indicator 680 are placed at the top of the screen, to allow the user to control the entry of information more easily and to control how the information is presented.

G. ADDITIONAL TOOLS

Maintenance is a highly complex set of processes, which are now described. Maintenance processes include updating the database to include new products, updating the database to include new features for pre-existing products, updating the list of questions as new computer technologies emerge and the exemplary embodiment of the present invention is updated to adapt thereto, updating questions designed to facilitate still more updating of the exemplary embodiment of the present invention, and updating higher order statistical correlation between recommended solutions and user input responses.

Referring now to FIG. 55, a manual maintenance methodology corresponding to one embodiment of the present invention is shown. The methodology is "closed loop" approach, in that the system maintenance administrator analyses finally recommended solutions and recipes to determine whether changes to the system are necessary. According to the normal operation of the tool, questions and answers 572 are posed to a user, and the tool then develops a recommended solution. The proposed solution 574 is recommended to the user, who edits 576 the recommended solution using either the Assist Me feature (in Expert mode 400*c*) or the Incremental Editor (in Novice or Expert mode 400*c*). The tool then generates a final recommended solution 578, and stores relevant information in the Client Base Class 120.

As stated above, in some embodiments, the Solutions Framework Base Class 400 includes a fifth set of processes to allows secondary considerations to narrow the list of products where the fourth set of processes returns more than one. Two types of information are used in the corresponding analysis: the value (e.g., "I need at least 100 characters per second") and the relative importance (e.g., "Price is more important to me than speed, and I can live with a slower speed.").

The example used to explain this fifth set of processes involved a User Guidelines Base Class 160 that indicated that the user places a premium on cost, and a somewhat less importance to performance, but has specified no other user specified guidelines. In that case, the search and match process 282 re-ranked the products in the product class according to the closeness-of-fit with the primary criteria, and selects the half of this number (but at least one) which conform most closely to the cost criteria. From this remaining number, the exemplary embodiment of the present invention considers and selects 50% of the number of products, selecting those which conform most closely to the performance criteria.

If the user has specified lowest cost, then the search and match process 282 collects the products with the lowest cost. However, if best value were selected as the cost criteria, then the mid-most 50% would be selected. (In other words, "best value" ranks each product according to its proximity to the median of the products in the class.) Every criteria entered by the user reduces by up to 50% the number of products placed in the Second Intermediate Results Base Class 540, although at least one product is always included. In some embodiments, if after all criteria are considered, more than one product remains, then the entire search and match process 282 is repeated, selecting from among the remaining list of products.

As shown in FIG. 55 a human-in-the-loop approach reduces the time necessary to converge on a solution, and reduces the number of times the tool must ask the user to define a preference. This is accomplished by applying a weight matrix 582 to the proposed solution 574 to help select a proposed solution 574 that requires only a few user edits 576. By studying the user edits 576 and the preferred final recommended solution 578, the system maintenance administrator 580 can determine an optimum or near-optimum weight matrix 582 that speeds the convergence of the proposed solution.

The weight matrices 582 can be used for marketing activities, as well. For example, new products 584 can be easily added to the database (i.e., the Products Base Class 240 and the Collections Base Class 300), and can be brought to the user's attention through the weight matrix 582 by increasing the likelihood such new products will be recommended in the proposed solution 574. The user can always substitute the more established products in the user edits 576 step, but will at least become aware that the new product are now available.

Also, existing objects are re-balanced 586 as necessary, as some products fall into disfavor with an industry or others promise additional compatibility with preexisting solutions, for example. The tool then performs an analysis of market needs 588, to determine whether certain products are more attractive to typical users, and the weight matrix 582 is adjusted appropriately. Many of the factors used by the system maintenance administrator 580 are determined by the database maintained by the manufacturers or third parties providing support to the Products Base Class 240, the Question Block Base Class 100, and the Calibration Base Class 280 (FIGS. 17A–17D). The system maintenance administrator 580 identifies and changes the weights corresponding to these data structures.

Referring to FIG. 56 a similar, though more highly automated, maintenance methodology 504 is shown. The automated methodology includes both an automated analyzer 590 to supplement the determination of changes to the weight matrix 582 that are necessary. The automated analyzer 590 compares the final recommended solution 578 and the proposed solution 574 (before the user edits 576), and determines what changes the user has made to the proposed solution 574 during the user edits 576. The comparison and other analysis 590 determines a set of changes to the weight matrices 582, as a closed-loop feedback control system. This automated control of the weight matrices 582 reduces the time necessary for the tool to converge on a solution, and reduces the number of times the tool must ask the user to define a preference. By comparing the proposed solution 574 and the preferred final recommended solution 578, the automated analyzer 590 can determine an optimum or near-optimum weight matrix 582 that speeds the convergence of the proposed solution.

Also shown in FIG. 56 the weight matrices 582 can be used for marketing activities, as well. Changes in the database maintained by the manufacturers and third parties may require changes in the weight matrix 582. A second automated analyzer 592 performs two processes, substantially in parallel: the second automated analyzer 592 re-balances 586 existing objects, and the second automated analyzer 592 also identifies new products 584 and new product classes to a system maintenance administrator 580 who changes the weights corresponding to these data structures as necessary. Of course, since market analysis has too many degrees of freedom to be successfully analyzed by the second automated analyzer 592, the system maintenance administrator 580 performs market needs analysis 588 as necessary, and makes further appropriate changes to the weight matrices 582.

Referring now to FIG. 57, an online purchase order form 1001 is shown. The purchase order form 1001 can be accessed over the Internet, and allows a user to contact the manufacturer, supplier, or distributer of all or some of the products that the user desires to purchase. The form 1001 can be used to access online information from the manufacturer, supplier, or distributer as well. Entire systems can be purchases easily. At the receiving end, the manufacturer, supplier, or distributer having appropriate software can electronically access files created by the online purchase form and provide direct electronic input to the accounting and process control software.

As shown in FIG. 57, a "from" section 790 provides information indicating the VAR or other user sending the purchase order to the particular manufacturer, supplier, or distributer. A "bill to" section 792 provides billing information, and generally can be used to access account information from a customer database at the receiver of the on-line purchase order. A summary of items 794 to be purchased is presented, conforming to the finally-determined solution and recipe. A set of radio buttons 796, including an "Edit Purchase Order" button, a "Submit Purchase Order" button, and a "View Recipe" button, allow the user to control the message before it is sent.

Figure 54:
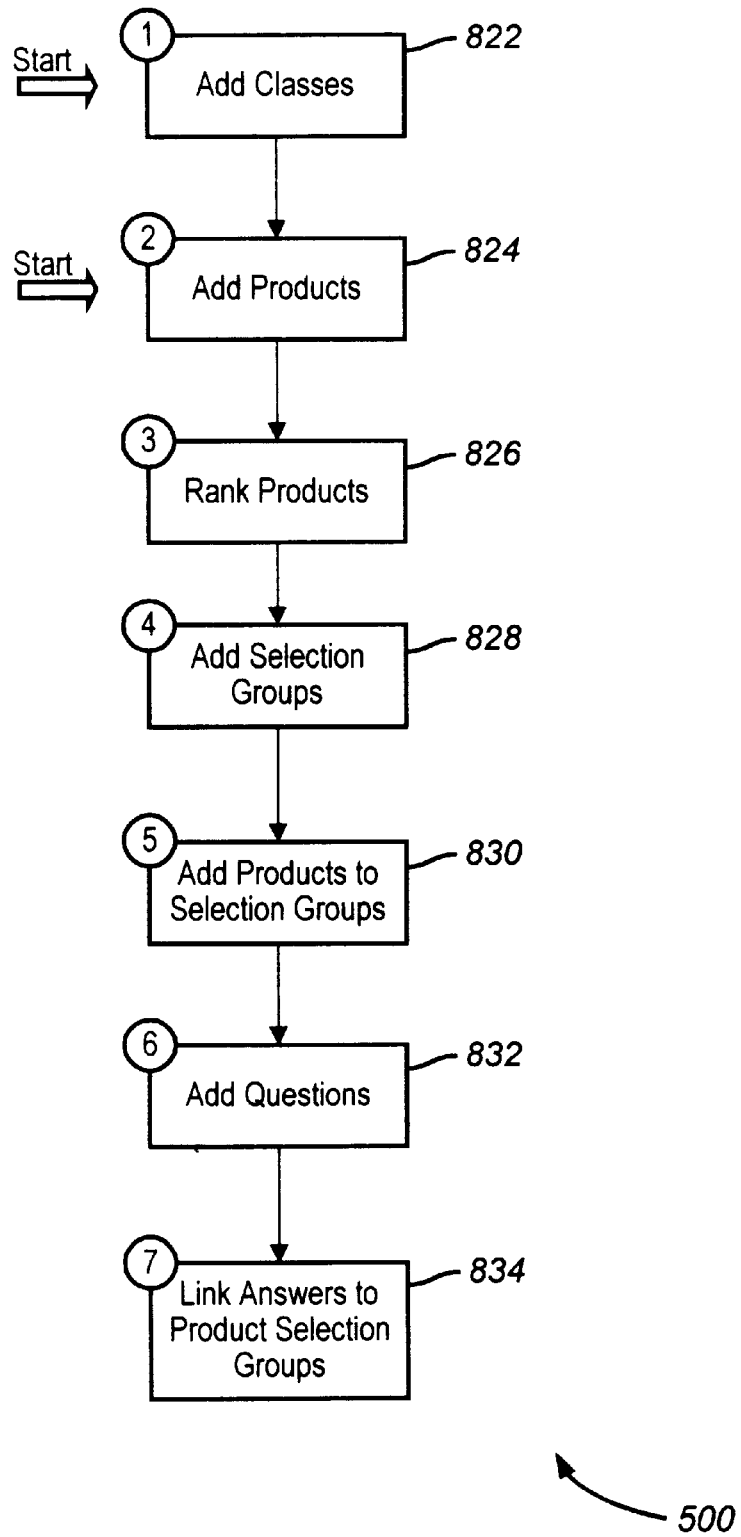
FIG. 54 shows a process of adding new products to the Base Classes, as part of a maintenance functionality.

Referring now to FIG. 54, a process 500 of adding new products to the Base Classes, as part of a maintenance functionality is shown. When a product is to be added to the database, various steps must be taken to ensure reliability of the overall tool. First, it must be determined whether the product fits within an existing class of products. If a new class is needed, a class name and class properties must be determined. The class name and class properties collectively are implemented as a subclass to the Products Base Class 240. Thus, it may be necessary to add classes 822. Once it has been determined either that the new class has been successfully added as a subclass to the Products Base Class 240, or that no new subclasses is needed, the product may be added 824. The added products are implemented as records within various subclasses (e.g,, within tables) of the Products Base Class 240.

The rank of all newly-added products is determined 826. Determining the rank of the newly added products may be accomplished by comparing the real-world values of each newly-added product to the products previously in the particular subclass of the Products Base Class 240. Selection groups are then added 828. The selection groups allow questions in the question blocks of the Question Block Base Class 100 and answers in the subclasses of the Answers Base Class 140 (FIG. 22B) to map to the newly-added products. Products are then added to the selection groups 830. Questions necessary to drive to the questions are then added to the question blocks of the Question Block Base Class 100. Finally, answers in the Answers Base Class 140 (FIG. 22B) are mapped (linked) to the product selection groups.

Although described in terms of a database interacting with a client browser using a SQL (sequential query language) database information language, it will be recognized upon reference to the description that the exemplary embodiment of the present invention is preferably implemented as a variety of database objects that can be used independently and in parallel to obtain rapidly an optimum solution. One set of database objects is used to store data in a user-friendly format, another set uses the data to obtain solutions as well as installation and implementation instructions, and still another examines the data stored in the first set of database objects and asks the user questions as necessary to fill in any necessary but missing data. Furthermore, although described in terms of an interactive database of questions, it will be recognized that preferably a number of question blocks obtain information from the user. Further, although described in terms of user database for storing answers provided by a user to questions prompted from the question blocks (i.e., abstract information relating what the user wants), the disclosed embodiment also includes database objects for storing present configuration data (i.e., what the user already possesses). The exemplary embodiment of the present invention is, in its most basic sense, four large groups of database objects and related software. Collectively, the database objects define the state of the instance of the exemplary embodiment of the present invention session.

The exemplary embodiment of the present invention has a variety of user modes, selectable by the user, that provide different levels of interactivity based upon the experience and technical knowledge of the user. Preferably, the exemplary embodiment of the present invention includes a novice and an expert mode 400c, the expert mode 400c being contained within the novice mode, in which the novice mode includes a higher level of abstraction and "user friendliness." Expert mode 400c allows the client to select products and services from lists of available products and services. Expert mode 400c therefore requires more familiarity with technology. Expert mode 400c run without an "Assist Me" feature allows standard tree-branching to identify particular products. Expert mode 400c and novice mode are not completely exclusive, however, since an expert user operating the exemplary embodiment of the present invention in the expert mode 400c can nevertheless access some of the procedures normally accessed through the novice mode. The "Assist Me" feature is of particular benefit to users who are more knowledgeable about one class of products or services than about another. When designing a system having both classes of products, such users can use the expert mode 400c to select products and services with which the user is familiar, and then use "Assist Me" features to obtain the guidance of the user-friendly, plain-English procedures normally accessed through the novice mode. In the "Assist Me" mode, a limited number of questions may be asked to enable the knowledge engine to begin analysis of a client's potential configuration and then note any recommendations.

In addition to Base Classes which drive all of the procedures in the exemplary embodiment of the present invention, an analysis step uses the Answers Base Class 140 (FIG. 22B) to calculate the solution. Each phase begins with a preliminary sub-phase, obtaining information from a user. The "user" could be an end user, i.e. a business manager or other purchasing executive at a business enterprise, but is more commonly a Value Added Reseller or technical consultant brought in by the manager or executive to determine the computer needs of the enterprise and how best to meet those needs, constrained by the budget, expertise of existing employees of the enterprise, and existing (legacy) products that were previously purchased.

Referring now to FIG. 1A, there are four general "phases" of operation for the exemplary embodiment of the present invention. In the first phase, once the Answers Base Class 140 (FIG. 22B) is complete, a solution framework is determined. The first phase isolates the overall solution framework. The solution framework identifies the most general network level or system level design. In the second phase, products are selected to "fill in" the solution. In the third phase, internetworking products are then selected to allow WAN or other connections. Finally, in the fourth phase, overall system configuration and verification ensures reliability and customer satisfaction.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A computer implemented system for selecting products, comprising:

a database with at least one class of products having physical performance parameters;

a calibration table coupled to the database, the calibration table providing a translation between physical and relative, logical performance parameters such that a product with a particular physical performance parameter is selected responsive to specification of the relative, logical performance curve parameters; and a user interface for specifying the class of product and the relative, logical performance parameter for the class of product, and for displaying a product with the corresponding physical performance parameter.

2. The computer implemented system of claim 1, wherein: the database resides within a memory within a server; and the user interface resides within a subsystem coupled to the server over a network.

3. The computer implemented system of claim 2, wherein the network is the Internet.

4. The computer implemented system of claim 1, wherein the database and the user interface reside on the same stand-alone computer, such that the database and the user interface are directly accessible by a processor.

5. The computer implemented system of claim 1, wherein: the products include computers.

6. The computer implemented system of claim 1, wherein: the products include computer network components.

7. The computer implemented system of claim 1, wherein: the products include computer peripherals.

8. The computer implemented system of claim 1, wherein:
the products include computers, computer network components, and computer peripherals.

9. The computer system of claim 1, wherein:
the user interface includes buttons.

10. The computer implemented system of claim 1, wherein:
the user interface allows a user to enter the increment and decrement inputs via a keyboard.

11. The system of claim 1, wherein:
the particular relative, logical parameter is within a sortable range of values, each value in the range of values translating to a distinct physical performance parameter.

12. The system of claim 1 wherein:
each physical performance parameter translates to a distinct subset of the class of products.

13. In a computer system having a database with at least one class of products having physical performance parameters, a method for selecting a subset of the class of products, the method comprising the steps of:

receiving a relative, logical performance parameter;

translating the relative, logical performance parameter to a physical performance parameter; and determining a subset of the class of products having the physical performance parameter.

14. The method of claim 13, wherein the step of translating includes a step of:

accessing a calibration table coupled to the database; and the calibration table providing a translation between physical performance parameters and the relative, logical performance parameters such that a set of products with a particular physical performance parameter is selected responsive to specification of the relative logical performance parameter.

* * * * *

UNITED STATES PATENT AND TRADEMARK OFFICE
CERTIFICATE OF CORRECTION

PATENT NO.    : 5,963,939
DATED         : October 5, 1999
INVENTOR(S)   : Paul H. McCann et al.

It is certified that error appears in the above-identified patent and that said Letters Patent is hereby corrected as shown below:

Title page,
Item [54], delete "METHOD AND APPARATUS FOR AN INCREMENTAL EDITOR TECHNOLOGY" and insert -- RELATIVE, LOGICAL PERFORMANCE PARAMETER USER INTERFACE FOR THE SPECIFICATION AND DISPLAY OF PRODUCT WITH CORRESPONDING PHYSICAL PERFORMANCE PARAMETERS --.

Column 3,
Lines 25-26, delete "; thereafter, as new equipment to obtain online information relating to new products and services".
Line 64, after "160" insert -- (Figures 5 and 6) --.

Column 4,
Line 6, after "400c" insert -- (Figure 2) --.

Column 5,
Between lines 30 and 31, insert -- Figure 30 shows a non-centralized dial-up WAN --.
Between lines 34 and 35, insert -- Figure 34 shows a small client/server workgroup --.
Lines 35, 36, 38 and 39, after "shows" insert -- a --.
Between lines 35 and 36, insert -- Figure 36 shows a client server workgroup --.
Lines 40, 41 and 42, after "shows" insert -- a --, delete "form" and insert -- farm --.
Line 44, after "shows" insert -- an --.

Column 6,
Line 14, after "and" delete ".".

Column 7,
Line 26, delete "meeds" and insert -- needs --.
Line 34, delete "data" and insert -- date --.
Line 52, after "400" insert -- (Figure 4) --.

Column 8,
Line 3, delete "400" insert -- 140 --.
Line 4, delete "22C" insert -- 22B --.
Line 61, delete "A row of radio buttons 682 allows the user to control the entry of information by allowing the user to branch to other question blocks within the question procedures.".

Column 9,
Line 5, after "buttons" insert -- 560 and 562 --.

UNITED STATES PATENT AND TRADEMARK OFFICE
CERTIFICATE OF CORRECTION

PATENT NO. : 5,963,939
DATED : October 5, 1999
INVENTOR(S) : Paul H. McCann et al.

It is certified that error appears in the above-identified patent and that said Letters Patent is hereby corrected as shown below:

Column 9 (cont'd),
Line 11, delete "A row of radio buttons 682 allows the user to control the entry of information by allowing the user to branch to other question blocks within the question procedures.".
Line 19, after "612" insert -- , among others, --.
Line 55, delete "656" and insert -- 658 --.

Column 10,
Line 54, after "derived" insert -- from --.

Column 11,
Line 67, delete "regard" and insert -- regarding --.

Column 12,
Line 18, after "210" insert -- (Figure 5) --.
Line 35, after "240" insert -- (Figure 22D) --.

Column 13,
Line 58, after "854" insert -- (Figure 9) --.
Line 58, delete ",," and insert -- , --.
Lines 63-64, delete both occurrences of "726" and insert -- 727--.
Line 65, delete "726" and insert -- 727 --.

Column 14,
Line 7, delete "726" and insert -- 727 --.
Line 59, after "300" insert -- (Figure 22A) --.

Column 15,
Line 62, delete "And" and insert -- At --.

Column 16,
Line 20, delete "Figures 47-50" and insert -- Figure 22D --.
Line 48, delete "218" and insert -- 854 --.

Column 17,
Lines 8 and 9, delete "214".
Line 17, delete "Figures 47-50" and insert -- Figure 22D --.
Lines 22 and 34, delete "218" and insert -- 854 --.
Line 44, before "of the Requirements" insert -- (Figure 10) --, delete "218" and insert -- 214 --.

UNITED STATES PATENT AND TRADEMARK OFFICE
CERTIFICATE OF CORRECTION

PATENT NO. : 5,963,939
DATED : October 5, 1999
INVENTOR(S) : Paul H. McCann et al.

It is certified that error appears in the above-identified patent and that said Letters Patent is hereby corrected as shown below:

Column 18,
Line 6, delete "50" and insert -- 22D --.
Line 10, after "282" insert -- (Figure 5) --.

Column 19,
Line 20, before "included" insert -- are -- delete "8E" and insert -- 8 --.
Line 38, after "110" insert -- (Figures 1 and 2) --.
Line 49, delete "281" and insert -- 854 --.
Line 54, delete "(Figures 47-50)".

Column 20,
Line 6, delete "71D" and insert -- 17D --.
Line 7, after "512" insert -- (Figure 5) --.
Lines 10 and 20, delete "214".
Lines 18 and 21, delete "212".
Line 20, delete "762" and insert -- 214 --.
Line 22, delete "218" and insert -- 258 --.
Line 31, delete "(Figures 47-50)".
Line 58, after "510" insert -- (Figure 5) --.

Column 21,
Lines 6 and 8, delete "212" and insert -- 258 --.
Line 7, delete "216" and insert -- 260 --.
Line 16, delete "214".
Lines 26 and 53, delete "(Figures 47-50)".

Column 22,
Line 22, delete "214".

Column 25,
Line 41, delete "1778" and insert -- 178 --.
Lines 54 and 63, after "102" insert -- (Figures 1 and 2) --.

Column 26,
Line 33, after "objects" insert -- (Figure 4) --.
Line 33, after "printer object" insert -- 412 --.
Line 38, after "600" insert -- (Figures 18A-18C) --.
Line 49, after "110" insert -- (Figures 1 and 2) --.
Line 57, after "210" insert -- (Figure 5) --.

UNITED STATES PATENT AND TRADEMARK OFFICE
CERTIFICATE OF CORRECTION

PATENT NO. : 5,963,939
DATED : October 5, 1999
INVENTOR(S) : Paul H. McCann et al.

It is certified that error appears in the above-identified patent and that said Letters Patent is hereby corrected as shown below:

Column 27,
Line 15, after "402" insert -- , Figure 4 --.

Column 31,
Lines 25 and 29, delete "218".

Column 32,
Line 65, delete "of 252".

Column 33,
Line 58, delete "534" and insert -- 282 --.
Line 67, delete "described" and insert -- illustrated --.
Line 67, delete "8" and insert -- 5 --.

Column 34,
Line 22, delete "(Figures 47-50)".
Line 48, delete "6" and insert -- 5 --.
Line 65, after "510" insert -- (Figure 5) --.

Column 35,
Line 23, delete "processes" and insert -- processed --.
Line 58, after "510" insert -- Figure 5) --.

Column 37,
Line 4, delete "214".
Line 17, after "400c" insert -- (Figure 2) --.

Column 38,
Lines 19 and 47, delete "214".
Line 32, after "510" insert -- (Figure 5) --.
Line 53, delete the first occurrence of "and" and insert -- are --.

Column 39,
Line 23, delete "212" and insert -- 252 --.
Line 25, delete "214" and insert -- 254 --.
Line 37, delete "216" and insert -- 256 --.
Line 38, delete "218" and insert -- 258 --.
Line 40, delete "220" and insert -- 260 --.

UNITED STATES PATENT AND TRADEMARK OFFICE
CERTIFICATE OF CORRECTION

PATENT NO. : 5,963,939
DATED : October 5, 1999
INVENTOR(S) : Paul H. McCann et al.

It is certified that error appears in the above-identified patent and that said Letters Patent is hereby corrected as shown below:

Column 39 (cont'd),
Lines 63-67, delete "Referring now to Figure 14, a Server Base Requirement Translation subclass of the Requirements Translation Base Class 210 is shown, in which each record identifies a product or products required to be connected to a server, all of the product or products having a common attribute.".

Column 40,
Line 1, delete "15" and insert -- 14 --.
Line 6, after "." insert -- Turning to Figure 15, an Operating System Products Requirement subclass of the Requirements Translation Base Class 210, is shown. --.
Line 32, delete "11-16" and insert -- 10-14 --.
Line 33, after "class field" insert -- 212 --.
Lines 34, 44, 51 and 61, delete "218" and insert -- 214 --.
Line 34, after "ranking field" insert -- 216 --.
Lines 35, 47, 49 and 53, delete "212" and insert -- 218 --.
Lines 35 and 56, delete "216" and insert -- 220 --.
Lines 37-40, delete "Each of these base classes include a number or records each having a class field, a Property Field 218, a ranking field, an internal representation field, and Further Notes Field 216.".
Line 41, delete "16" and insert -- 13 --.
Line 41, after "field" insert -- 212 --.
Lines 44, 51 and 61, after the second occurrence of "field" insert -- 216 --.
Line 59, delete "(Figures 47-50)".

Column 40, line 64 - Column 41, line 7,
Delete "The Internal Representation Field 212 may be regarded as a concatenation or merger of the property and ranking fields, and it is the Internal Representation Field 212 that actually maps to the Calibration Base Class 280. Although shown with only one Property Field 218, only one ranking field, and only one Internal Representation Field 212, in actuality the Base Classes is in the Requirements Translation Base Class 210 provide information for ranking and sorting products according to a variety of properties. The Further Notes Field 216 facilitates maintenance, by describing generally the product or products belonging to the record.".

Column 41,
Line 24, delete "214".

Column 42,
Line 9, after "102" insert -- (Figures 1 and 2) --.

UNITED STATES PATENT AND TRADEMARK OFFICE
CERTIFICATE OF CORRECTION

PATENT NO.    : 5,963,939
DATED         : October 5, 1999
INVENTOR(S)   : Paul H. McCann et al.

It is certified that error appears in the above-identified patent and that said Letters Patent is hereby corrected as shown below:

Column 43,
Line 47, after "290" insert -- (Figure 3) --.
Line 53, delete "22C".
Line 66, after "ClassID(PK)" insert -- 852 --.

Column 44,
Line 3, after "PropertyID(PK)" insert -- 854 --.
Line 7, after "140" insert -- (Figure 22B) --.

Column 45,
Lines 3 and 5, after "printer" insert -- 412 --.
Line 21, after "mode" insert -- (Figure 1) --.
Line 22, after "400c" insert -- (Figure 2) --.
Line 50, delete "400" and insert -- 402 --.
Line 51, after "connections" insert -- (Figure 4) --.
Line 58, after "424" insert -- (Figure 33) --.
Line 63, after "422" insert -- (Figure 35) --.

Column 46,
Line 26, after "catagories" insert -- (Figure 4) --.

Column 47,
Line 31, before "referenced" insert -- is --.
Line 34, after "400c" insert -- (Figure 2) --.

Column 48,
Line 25, delete "508" insert -- 502 --.
Lines 55, 57, 59 and 63, delete "214".

Column 49,
Line 41, delete "speed")" and insert -- speed.") --.

Column 50,
Line 8, after the first occurrence of "110" insert -- (Figures 1 and 2) --.

Column 51,
Line 8, delete "and" and insert -- an --.
Line 30, after "542" insert -- (Figure 5) --.
Line 33, delete "this" and insert -- thus --.
Line 43, after "devices" insert -- (Figures 38 and 39) --.

UNITED STATES PATENT AND TRADEMARK OFFICE
CERTIFICATE OF CORRECTION

PATENT NO. : 5,963,939
DATED : October 5, 1999
INVENTOR(S) : Paul H. McCann et al.

It is certified that error appears in the above-identified patent and that said Letters Patent is hereby corrected as shown below:

Column 51 (cont'd),
Lines 46-47, delete "collocated" and insert -- collected --.
Line 59, delete "server" and insert -- servers 408 --.

Column 52,
Line 1, after "104" insert -- (Figures 1 and 2) --.
Line 13, delete "400's" and insert -- 400 --.
Line 27, delete "526".

Column 53,
Line 17, after "determined" insert -- (Figure 34) --.

Column 54,
Line 35, delete "1100" and insert -- 100 --.
Line 58, after "426" insert -- (Figure 38) --.

Column 56,
Lines 12 and 18, delete "424b" and insert -- 424a --.
Line 16, delete "404f" and insert -- 404e --.
Line 17, delete "416" and insert -- 416a --.
Line 18, delete "24-26" and insert -- 33-35 --.
Line 21, delete "25-26" and insert -- 34-35 --.
Line 22, delete the second occurrence of "," and insert -- . --.
Line 22, delete "and as" and insert -- As --.
Line 37, after "36" insert -- may --.
Line 42, delete "404g" and insert -- 404f --.
Line 44, delete "," and insert -- . --.
Line 44, before the second occurrence of "to" insert -- The switch 422a is connected --.
Line 45, delete "416 and" and "and 422a".
Line 45, delete "24-27" and insert -- 33-36 --.
Line 49, delete "25-27" and insert -- 34-36 --.
Line 63, delete "404h" and insert -- 404g --.

Column 57,
Line 13, delete both occurrences of "routers" and insert -- router --.
Line 13, delete "introduce" and insert -- introduces --.
Line 19, delete "each" and insert -- where the switch 422a is --.
Line 20, delete "416".
Line 20, delete the first occurrence of "and".
Line 32, delete "1100" and insert -- 100 --.

UNITED STATES PATENT AND TRADEMARK OFFICE
CERTIFICATE OF CORRECTION

PATENT NO. : 5,963,939
DATED : October 5, 1999
INVENTOR(S) : Paul H. McCann et al.

It is certified that error appears in the above-identified patent and that said Letters Patent is hereby corrected as shown below:

Column 59,
Line 35, delete ",but" and insert -- and --.
Line 35, before "340" insert -- required --.

Column 60,
Line 5, delete "routers" and insert -- Routers --.
Line 45, after "400g" insert -- (Figure 25) --.
Line 48, delete "instruction" and insert -- instructions --.

Column 61,
Line 40, after "510" insert -- (Figure 5) --.
Line 60, delete "invoke perform" and insert -- invokes --.

Column 62,
Line 19, delete "(Figures 47-50)".
Line 55, delete "202" and insert -- 102 --.

Column 64,
Line 26, delete ", as well as Figure 50".

Column 65,
Line 50, delete "2400" and insert -- 24 --.
Line 59, delete "At step 256".
Line 59, delete "an" and insert -- An --.

Column 66,
Line 1, delete "(step 254)".
Line 11, delete "windows" and insert -- window --.
Line 11, delete "aid" and insert -- aids --.

Column 67,
Line 4, after "282" insert -- (Figure 5) --.

Column 68,
Line 17, delete "586".
Line 19, delete "584".

Column 70,
Line 43, before "physical" insert -- the --.
Line 43, after "physical" insert -- performance parameters --.

UNITED STATES PATENT AND TRADEMARK OFFICE
CERTIFICATE OF CORRECTION

PATENT NO. : 5,963,939
DATED : October 5, 1999
INVENTOR(S) : Paul H. McCann et al.

It is certified that error appears in the above-identified patent and that said Letters Patent is hereby corrected as shown below:

Column 70 (cont'd),
Line 45, after "specification of" delete "the" and insert -- a particular --.
Line 46, delete "curve parameters" and insert -- parameter --.
Line 49, delete "products, and for" and insert -- the usert interface also --.
Line 49, delete "a" and insert -- the --.
Line 49, delete "product" and insert -- products --.
Lines 50-51, delete "corresponding" and insert -- particular --.

Column 71,
Line 8, delete "enter the".

Column 72,
Line 10, delete "a" and insert -- the --.
Line 10, delete "step" and insert -- steps --.
Line 14, before "physical" insert -- the --.

Signed and Sealed this

Seventh Day of February, 2006

JON W. DUDAS
*Director of the United States Patent and Trademark Office*